(12) United States Patent
Chitalia et al.

(10) Patent No.: US 11,943,117 B2
(45) Date of Patent: *Mar. 26, 2024

(54) VIRTUALIZATION INFRASTRUCTURE UNDERLAY NETWORK PERFORMANCE MEASUREMENT AND MONITORING

(71) Applicant: Juniper Networks, Inc., Sunnyvale, CA (US)

(72) Inventors: Harshit Naresh Chitalia, Mountain View, CA (US); Travis Gregory Newhouse, Encinitas, CA (US); Weixu Zhuang, Sunnyvale, CA (US); Sumeet Singh, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/933,405

(22) Filed: Sep. 19, 2022

(65) Prior Publication Data

US 2023/0011736 A1 Jan. 12, 2023

Related U.S. Application Data

(63) Continuation of application No. 16/948,339, filed on Sep. 14, 2020, now Pat. No. 11,451,454, which is a
(Continued)

(51) Int. Cl.
*G06F 3/048* (2013.01)
*G06F 3/0481* (2022.01)
(Continued)

(52) U.S. Cl.
CPC ............ *H04L 41/22* (2013.01); *G06F 3/048* (2013.01); *G06F 3/0481* (2013.01); *G06T 11/206* (2013.01); *G06T 2200/24* (2013.01)

(58) Field of Classification Search
None
See application file for complete search history.

(56) References Cited

U.S. PATENT DOCUMENTS 6,211,887 B1    4/2001 Meier et al.
7,277,931 B1 * 10/2007 Booth .................... H04L 12/66
                                                                709/219
(Continued)

FOREIGN PATENT DOCUMENTS

CN       104780061 A  *  7/2015
EP         2854341 A2     4/2015
(Continued)

OTHER PUBLICATIONS

Second Office Action from counterpart Chinese Application No. 201910243336.3 dated Dec. 5, 2022, 15 pp.
(Continued)

*Primary Examiner* — Xuyang Xia
(74) *Attorney, Agent, or Firm* — Shumaker & Sieffert, P.A.

(57) ABSTRACT

A variety of different graphical user interfaces are generated that when displayed provide a visual and interactive representation of one or more performance metrics associated with the operation of a computer network. The graphical user interfaces may be used to monitor the underlay computer network for a virtualization infrastructure, as one example. Aspects include grouping the servers of a computer network into a plurality of aggregates, each aggregate comprising one or more servers. A set of probes are configured that are issued by an agent of a server in one aggregate and sent through the computer network to one or more agents in the server(s) of a different aggregate. Responses and other measurements taken based on the issuance of the probes is gathered and analyzed to generate
(Continued)

metrics that are then used to generate, at least in part, the information provided in the graphical user interfaces.

14 Claims, 18 Drawing Sheets

Related U.S. Application Data continuation of application No. 16/007,926, filed on Jun. 13, 2018, now Pat. No. 10,778,534.

(51) Int. Cl.
*G06T 11/20* (2006.01)
*H04L 41/22* (2022.01)

(56) References Cited

U.S. PATENT DOCUMENTS

| | | | |
|---|---|---|---|
| D566,722 S | 4/2008 | Jackson | |
| D693,829 S | 11/2013 | Edwards et al. | |
| D695,753 S | 12/2013 | Edwards et al. | |
| D705,240 S | 5/2014 | Edwards et al. | |
| D719,583 S | 12/2014 | Edwards et al. | |
| D741,888 S | 10/2015 | Sic et al. | |
| 9,258,195 B1* | 2/2016 | Pendleton | H04L 67/75 |
| D760,761 S | 7/2016 | Willis | |
| D765,672 S | 9/2016 | Raff et al. | |
| D782,515 S | 3/2017 | Dzjind et al. | |
| D783,046 S | 4/2017 | Dzjind et al. | |
| 9,641,435 B1 | 5/2017 | Sivaramakrishnan | |
| D792,894 S | 7/2017 | Dzjind et al. | |
| 9,729,414 B1 | 8/2017 | Oliveira et al. | |
| D808,994 S | 1/2018 | Mangold et al. | |
| 9,890,970 B2 | 2/2018 | Bruck et al. | |
| D836,120 S | 12/2018 | Dudey | |
| D854,565 S | 7/2019 | Mclaughlin et al. | |
| 10,437,845 B2 | 10/2019 | Anderson | |
| D881,904 S | 4/2020 | Angeles et al. | |
| 10,778,534 B2 | 9/2020 | Chitalia et al. | |
| D898,042 S | 10/2020 | Jenkins et al. | |
| D918,220 S | 5/2021 | Chitalia et al. | |
| 11,068,314 B2 | 7/2021 | Roy et al. | |
| 11,451,454 B2 | 9/2022 | Chitalia et al. | |
| 2009/0249213 A1 | 10/2009 | Murase et al. | |
| 2009/0319948 A1 | 12/2009 | Stannard et al. | |
| 2010/0002013 A1 | 1/2010 | Kagaya | |
| 2011/0047014 A1 | 2/2011 | De Angelo | |
| 2012/0226994 A1 | 9/2012 | Lee | |
| 2013/0111374 A1* | 5/2013 | Hamilton | H04L 41/12 715/763 |
| 2013/0194628 A1 | 8/2013 | Kamimoto | |
| 2013/0311832 A1* | 11/2013 | Lad | H04L 41/0631 714/37 |
| 2013/0339904 A1 | 12/2013 | Geithner | |
| 2014/0193047 A1 | 7/2014 | Grosz et al. | |
| 2014/0245139 A1 | 8/2014 | Lee et al. | |
| 2014/0282193 A1 | 9/2014 | Bann et al. | |
| 2014/0333551 A1 | 11/2014 | Kim et al. | |
| 2014/0349750 A1 | 11/2014 | Thompson et al. | |
| 2015/0295787 A1* | 10/2015 | Kakadia | H04L 41/22 370/236 |
| 2015/0358391 A1 | 12/2015 | Moon et al. | |
| 2016/0011925 A1 | 1/2016 | Kulkarni et al. | |
| 2016/0019352 A1 | 1/2016 | Cohen et al. | |
| 2016/0080101 A1* | 3/2016 | Naeini | H04J 11/0023 370/252 |
| 2016/0080202 A1 | 3/2016 | Zhang et al. | |
| 2016/0359592 A1 | 12/2016 | Kulshreshtha et al. | |
| 2016/0359711 A1* | 12/2016 | Deen | H04L 45/507 |
| 2018/0123903 A1 | 5/2018 | Holla et al. | |
| 2018/0125166 A1 | 10/2018 | Roy et al. | |
| 2018/0285166 A1 | 10/2018 | Roy et al. | |
| 2021/0006473 A1 | 1/2021 | Chitalia et al. | |

FOREIGN PATENT DOCUMENTS

| | | |
|---|---|---|
| EP | 3582441 A1 | 12/2019 |
| EP | 4084440 A1 | 11/2022 |
| WO | 2013184846 A1 | 12/2013 |
| WO | 2016111780 A1 | 7/2016 |

OTHER PUBLICATIONS

"Introduction to the Network Director 1.0 User Interface" Apr. 15, 2013, YouTube, site visited Mar. 24, 2020: https://www.youtube.com/watch?v=9NGteK8k8Vo (Year: 2013).

Examination Report from counterpart European Application No. 19165656.0, dated Nov. 5, 2020, 6 pp.

Extended Search Report from counterpart European Application No. 19165656.0, dated Aug. 7, 2019, 9 pp.

First Office Action and Search Report, and translation thereof, from counterpart Chinese Application No. 201910243336.3 dated May 6, 2022, 17 pp.

Hopps, "Analysis of an Equal-Cost Multi-Path Algorithm," RFC 2992, Network Working Group, Nov. 2000, 8 pp.

Notice of Intent to Grant and Text Intended to Grant from counterpart European Application No. 19165656.0 dated Feb. 9, 2022, 110 pp.

Pandey, "Google Fit Redesigned with New 'Move Minutes' and 'Heart Points' Activity Rings," Android Beat, Retrieved Mar. 24, 2020 from: https://www.androidbeat.com/2018/08/google-fit-redesigned-new-move-minutes-rings/, Aug. 21, 2018, 2 pp.

Prosecution History from U.S. Appl. No. 16/007,926, dated Aug. 13, 2019 through Jul. 15, 2020, 106 pp.

Prosecution History from U.S. Appl. No. 16/948,339, now issued U.S. Pat. No. 11,451,454, dated Sep. 24, 2021 through Jun. 15, 2022, 108 pp.

Prosecution History from U.S. Appl. No. 29/653,269, now issued U.S. Pat. No. D. 918,220, dated Mar. 27, 2020 through Feb. 10, 2021, 68 pp.

Response to Examination Report dated Nov. 5, 2020 from counterpart European Application No. 19165656.0, filed Mar. 4, 2021, 6 pp.

Response to Extended Search Report dated Aug. 7, 2019 from counterpart European Application No. 19165656.0, iled Jun. 16, 2020, 22 pp.

Response to Office Action dated May 6, 2022, from counterpart Chinese Application No. 201910243336.3 filed Sep. 21, 2022, 17 pp.

Sajassi et al. "BGP MPLS-Based Ethernet VPN" Internet Engineering Task Force, RFC 7432, Feb. 2015, 56 pp.

U.S. Appl. No. 29/782,015, filed May 3, 2021, naming inventors Chitalia et al.

Extended Search Report from counterpart European Application No. 22178457.2 dated Sep. 22, 2022, 10 pp.

Extended Search Report from counterpart European Application No. 22185836.8 dated Nov. 15, 2022, 10 pp.

Response to Extended Search Report dated Sep. 22, 2022, from counterpart European Application No. 22178457.2 filed May 2, 2023, 21 pp.

Response to Extended Search Report dated Nov. 15, 2022, from counterpart European Application No. 22185836.8 filed Jun. 13, 2023, 29 pp.

Communication pursuant to Article 94(3) EPC from counterpart European Application No. 22178457.2 dated Aug. 1, 2023, 8 pp.

Communication pursuant to Article 94(3) EPC from counterpart European Application No. 22185836.8 dated Aug. 11, 2023, 4 pp.

Response to Communication pursuant to Article 94(3) EPC dated Aug. 1, 2023, from counterpart European Application No. 22178457.2 filed Dec. 1, 2023, 16 pp.

Response to Communication pursuant to Article 94(3) EPC dated Aug. 1, 2023, from counterpart European Application No. 22185836.8 filed Dec. 8, 2023, 20 pp.

* cited by examiner

VIRTUALIZATION INFRASTRUCTURE UNDERLAY NETWORK PERFORMANCE MEASUREMENT AND MONITORING

This application is a continuation of U.S. patent application Ser. No. 16/948,339, filed 14 Sep. 2020, which is a continuation of U.S. patent application Ser. No. 16/007,926, filed 13 Jun. 2018, the entire content of each application is incorporated herein by reference.

TECHNICAL FIELD

The disclosure relates to monitoring and improving performance of cloud data centers and computer networks and, more particularly, to the generation and display of graphical user interfaces for monitoring parameters associated with computer networks.

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices. Virtualization with large scale data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the infrastructure. As physical computing resources become fungible resources, such as in a cloud-based computing environment, provisioning and management of the compute infrastructure becomes easier. Thus, enterprise IT staff often prefer virtualized compute clusters in data centers for their management advantages in addition to the efficiency and increased return on investment (ROI) that virtualization provides.

The data center may, for example, physically house all of the infrastructure equipment, such as networking and storage systems, redundant power supplies, and environmental controls. In a typical data center, clusters of storage systems and application servers are interconnected via a switch fabric provided by one or more tiers of physical network switches and routers. More sophisticated data centers provide infrastructure spread throughout the world with subscriber support equipment located in various physical hosting facilities. In many examples of data centers, the infrastructure may include a combination of the physical devices, which may be referred to as the "underlay resources," that are linked to and communicate with a variety of virtual resources such as virtual servers, agents, and/or policy controllers, which may be referred to as "overlay resources."

SUMMARY

This disclosure describes techniques for measuring performance of virtualization infrastructure underlay networks and leveraging performance metrics to generate graphical user interfaces for monitoring performance among workloads executing on the virtualization infrastructure. As described herein, a computing device may generate graphical user interfaces that provide visual representations of various performance parameters associated with the operations of the virtualization infrastructure and, more particularly in some example, the operation of the underlay computer network for the virtualization infrastructure. For example, a visual representation of the connectivity and/or the communication latencies between workloads that may communicate via the underlay computer network may be determined and graphically displayed in real-time or near real-time for a computer network being monitored.

The information provided by the graphical user interfaces generated using the techniques as described in this disclosure may allow full mesh underlay monitoring, which may provide faster troubleshooting of network problems related connectivity and/or latency issues related to monitored computer networks of any size. Use of these techniques as described in this disclosure allow monitoring of the computer network using a distributed analysis of the operations of various portions of the computer network for one or more predefined metrics. More detailed information, for example based on an aggregate to aggregate basis, on a server to server basis, and even on an agent to agent basis may be provided as part of one or more of the graphical user interfaces generated in response to the monitoring and analysis of metrics determined from the issuance of the probes throughout the computer. The specific details determined based on the issuance of the probes allows both high level graphical user interfaces (e.g., an visual depiction of the aggregates forming an entire computer network), and more detailed level graphical user interfaces (e.g., information related to connectivity and latency between one agent in a given aggregate and a plurality of other agents in a different aggregate), the level of detail selectable by a user based on inputs to the system providing the graphical user interfaces.

Aspects of the disclosure describe a controller that combines sets of servers within a computer network into a plurality of groupings referred to as "aggregates." In general, each aggregate may be configurable to include a set of servers and may represent an application, a workload, a project, or other logical or physical grouping. A server may host one or more instances that belong to a single aggregate, or to one or more aggregates. Where a server hosts instances belonging multiple aggregates, the server may belong to each of the multiple aggregates. A set of probes is generated for each agent of each server, the set of probes used to "ping" (e.g., send a message) to every other agent associated with a server that is grouped in a different aggregate relative to the aggregate where the agent issuing the probes is located. Various parameters associated with the return, or lack thereof, of the pinged messages are captured and analyzed to generate one or more metrics associated with real-time communications between the agents of different aggregates. Because the set of probes travel the same underlay paths as packets between application workloads executing on separate servers, performance metrics such as network latencies between pairs of aggregates, the performance metrics being obtained from the various parameters, correlate to performance metrics between applications executing on the pairs of aggregates and may be used by a computing device to generate a graphical user interface that provides a technical advantage of different feature elements for monitoring performance metrics between aggregates, servers of the aggregates, and (by extension) applications executing on the aggregates. The computing device may include the controller.

The various graphical user interfaces that may be generated based on the issuance of probes throughout a computer network include graphic symbols representing the plurality of aggregates. The graphic symbols may be linked by sets of lines extending between each aggregate and every other aggregate included in the computer network. The sets of lines may include one or more status indications associated with the real-time or a most recent status associated with one or more metrics measured or determined by issuing the probes as pinged messages between one or more of the agents in the different aggregates included in the computer network. In some aspects, the techniques include identifying a worst-case metric between any two servers of respective aggregates and generating a graphical user interface that includes an indication of the worst-case metric as representative of an overall metric for communication between the aggregates. The indication may be, for instance, a property (such as a size or color) of one of the set of lines between the aggregates. The graphical user interface may in this way provide a technical advantage of a full-mesh (or at least significant portions of the mesh) view of the underlay network connecting servers, which may run into the hundreds or even thousands, in a simplified form that distills performance metrics between aggregates into a simplified form for rapid and distributed analysis.

In some examples, the computing device may generate a graphical user interface that includes a two-dimensional grid having elements arranged in rows and columns. Each element of the two-dimensional grid, when selected based on a received user input, is configured to display additional status information related to one or more metrics associated with the communications between a first agent represented by a given row and a second agent represented by a given column at the intersection of the grid where the selected element is positioned.

As one example, the disclosure is directed to a method comprising receiving, by a computing device for monitoring a virtualization infrastructure, from each of a plurality of agents executing within corresponding servers of a computer network, result data for probes issued by each agent to at least one other agent, wherein each of the servers is a member of one or more aggregates, and wherein each of the aggregates comprises one or more of the servers, determining, by the computing device for each aggregate of the one or more aggregates, at least one status for communications between the aggregate and at least one other aggregate of the one or more aggregates, the at least one status for communications determined based on a selected metric and based on the result data associated with one or more probes issued by one or more agents of the plurality of agents that are grouped into the aggregate, the probes destined to the at least one other aggregate of the one or more aggregates, generating, by the computing device, a graphical user interface that includes respective graphical elements representing the one or more aggregates and also includes, for each aggregate of the aggregates, one or more graphical indicators that are indicative of the at the least one status determined for communications between the aggregate and at least one other aggregate of the one or more aggregates; and outputting, by the computing device, the graphical user interface for display at a display device.

In another example, the disclosure is directed to a system comprising a computing device for monitoring a virtualization infrastructure of a computer network, the computer network comprising a plurality of servers communicatively coupled by a plurality of network devices comprising a switch fabric and one or more agents configured to execute within corresponding servers of the computer network, wherein each of the servers is a member of one or more aggregates and each of the aggregates comprises one or more of the servers. The computing device is configured to receive result data for probes issued by each agent to at least one other agent of the one or more agents, determine for each aggregate of the one or more aggregates at least one status for communications between the aggregate and at least one other aggregate of the one or more aggregates, the at least one status for communications determined based on a selected metric and based on the result data associated with the one or more probes issued by the agents of the plurality of agents that are grouped into the respective aggregate, the probes destined to the at least one other aggregate of the one or more aggregates, generate a graphical user interface that includes respective graphical elements representing the one or more aggregates and also includes, for each aggregate of the aggregates, one or more graphical indicators that are indicative of the at least one status for communications between the aggregate and at least one other aggregate of the one or more aggregates, and output the graphical user interface for display at a display device.

As another example, the disclosure is directed to A system comprising a computing device for monitoring a virtualization infrastructure of a computer network, the computer network comprising a plurality of servers communicatively coupled by a plurality of network devices comprising a switch fabric and one or more agents configured to execute within corresponding servers of the computer network, wherein each of the servers is a member of one or more aggregates and each of the aggregates comprises one or more of the servers. The computing device is configured to receive result data for probes issued by each agent to at least one other agent of the one or more agents, determine a status for each issued probe, the status determined based on a selected metric and based on the result data associated with the each of the issued probes collected by the agent issuing the probe, generate a graphical user interface that includes a plurality of status blocks, the plurality of status blocks arranged in one or more columns having one or more rows of status blocks arranged under the one or more columns, each of the status blocks associated with a particular one of the agents issuing probes to a particular destination agent of the plurality of agents, wherein each of the status blocks is rendered in a respective color indicative of the status determined for the probes issued by the particular agent associated with the status block, and output the graphical user interface for display at a display device.

The details of one or more examples of this disclosure are set forth in the accompanying drawings and the description below. Other features, objects, and advantages of this disclosure will be apparent from the description and drawings, and from the claims.

The drawings and the description provided herein illustrate and describe various examples of the inventive methods, devices, and systems of the present disclosure. However, the methods, devices, and systems of the present disclosure are not limited to the specific examples as illustrated and described herein, and other examples and variations of the methods, devices, and systems of the present disclosure, as would be understood by one of ordinary skill in the art, are contemplated as being within the scope of the present application.

DETAILED DESCRIPTION

In general, the disclosure is directed to devices, systems, and methods for generating and displaying graphical user interfaces depicting statuses and/or metrics associated with the communications between various resources of virtualization infrastructure. In some examples, the resources depicted in the graphical user interfaces include the physical devices, such as servers (also referred to herein as "nodes," "compute nodes," and "hosts"), that communicate via an underlay computer network that transports communications among the resources. In some examples, one or more of the resources depicted in the graphical user interfaces include virtual resources, such as one or more virtual servers and/or one or more virtual routers. As described in this disclosure, a policy agent ("agent") associated with a server in the computer network may generate and transmit communication probes to one or more other agents located in other servers of the computer network. The agent issuing the communication probes, referred to as the source agent, issues each communication probe to a specific and different agent, referred to as the destination agent, and monitors the computer network for a reply to the issued probe returned by the destination agent.

One or more metrics may be measured and/or determined based on received responses, and/or a lack of a response, resulting from the issuance of each of the communication probes. The measured and/or determined metrics may be communicated from a source agent to a policy controller, or simply "controller," that uses the data and other information reported to the controller from the source agents to generate, for example through a dashboard, various versions of a user interface that depict statuses and/or values for the metrics that may be displayed on a display device, such as a display screen of a user interface device such as a computer.

Figure 1:
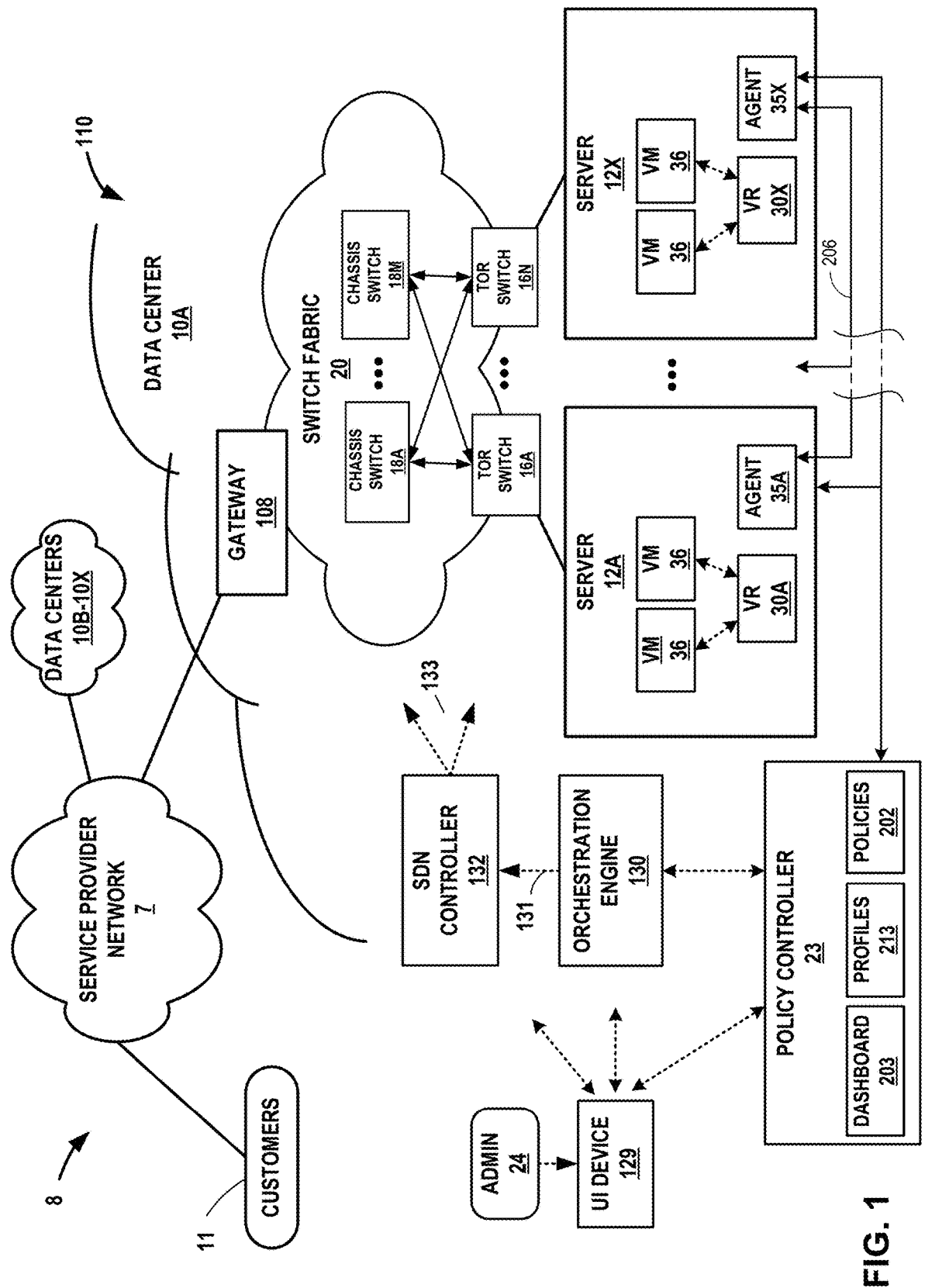
FIG. 1 is a block diagram illustrating an example computer network system in which examples of the techniques described herein may be implemented.

FIG. 1 is a block diagram illustrating an example computer network system 8 in which examples of the techniques described herein may be implemented. Computer network system 8 in the example of FIG. 1 includes data centers 10A-10X (collectively, "data centers 10") interconnected with one another and with customer networks associated with customers 11 via a service provider network 7. FIG. 1 illustrates one example implementation of computer network system 8 and a data center 10A that hosts one or more cloud-based computing networks, computing domains or projects, generally referred to herein as cloud computing cluster. The cloud-based computing clusters may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks and the like. Other implementations of computer network system 8 and data center 10A may be appropriate in other instances. Such implementations may include a subset of the components included in the example of FIG. 1 and/or may include additional components not shown in FIG. 1. Data centers 10B-10X may include the same or similar features and be configured to perform the same or similar functions as described herein with respect to data center 10A.

In the example shown in FIG. 1, data center 10A provides an operating environment for applications and services for customers 11 coupled to data center 10A by service provider network 7 through gateway 108. Although functions and operations described in connection with computer network system 8 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 10A hosts infrastructure equipment, such as networking and storage systems, redundant power supplies, and environmental controls. Service provider network 7 may be coupled to one or more networks administered by other providers, and may thus form part of a large-scale public network infrastructure, e.g., the Internet. In some examples, data center 10A may represent one of many geographically distributed network data centers. As illustrated in the example of FIG. 1, data center 10A is a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific, or super-computing, and so on. In some examples, data center 10A is an individual network server, a network peer, or otherwise.

In the example of FIG. 1, data center 10A includes a set of storage systems and application servers, including server 12A through server 12X (collectively "servers 12") interconnected via high-speed switch fabric 20 provided by one or more tiers of physical network switches and routers. Servers 12 function as physical compute nodes of the data center. For example, each of servers 12 may provide an operating environment for execution of one or more customer-specific virtual machines 36 ("VMs" in FIG. 1) or other virtualized instances, such as containers. Each of servers 12 may be alternatively referred to as a host computing device or, more simply, as a host. A server 12 may execute one or more virtualized instances, such as virtual machines, containers, or other virtual execution environment for running one or more services, such as virtualized network functions (VNFs).

Switch fabric 20 may include top-of-rack (TOR) switches 16A-16N coupled to a distribution layer of chassis switches 18A-18M, and data center 10A may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10A includes servers 12A-12X interconnected via the high-speed switch fabric 20 provided by one or more tiers of physical network switches and routers. Switch fabric 20 is provided by the set of interconnected top-of-rack (TOR) switches 18A-18M (collectively, "TOR switches 18") coupled to the distribution layer of chassis switches 18A-18M (collectively, "chassis switches 18"). Although not shown, data center 10A may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to gateway 108 and service provider network 7. Chassis switches 18 aggregate traffic flows and provide high-speed connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to gateway 108, which may perform layer 3 routing to route network traffic between data center 10A and customers 11 by service provider network 7.

Switch fabric 20 may perform layer 3 routing to route network traffic between data center 10A and customers 11 by service provider network 7. Gateway 108 acts to forward and receive packets between switch fabric 20 and service provider network 7. Data center 10A includes an overlay network that extends switch fabric 20 from physical switches 18, 16 to software or "virtual" switches. For example, virtual routers 30A-30X located in servers 12A-12X, respectively, may extend the switch fabric 20 by communicatively coupling with one or more of the physical switches located within the switch fabric 20. Virtual switches may dynamically create and manage one or more virtual networks usable for communication between application instances. In one example, virtual routers 30A-30X execute the virtual network as an overlay network, which provides the capability to decouple an application's virtual address from a physical address (e.g., IP address) of the one of servers 12A-12X on which the application is executing. Each virtual network may use its own addressing and security scheme and may be viewed as orthogonal from the physical network and its addressing scheme. Various techniques may be used to transport packets within and across virtual network(s) over the physical network.

Software-Defined Networking ("SDN") controller 132 provides a logically and in some cases physically centralized controller for facilitating operation of one or more virtual networks within data center 10A in accordance with one or more examples of this disclosure. The terms SDN controller and Virtual Network Controller ("VNC") may be used interchangeably throughout this disclosure. In some examples, SDN controller 132 operates in response to configuration input received from orchestration engine 130 via northbound API 131, which in turn operates in response to configuration input received from an administrator 24 operating user interface device 129. Additional information regarding SDN controller 132 operating in conjunction with other devices of data center 10A or other software-defined networks is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

User interface device 129 may be implemented as any suitable computing system, such as a mobile or non-mobile computing device operated by a user and/or by administrator 24. User interface device 129 may, for example, represent a workstation, a laptop or notebook computer, a desktop computer, a tablet computer, or any other computing device that may be operated by a user and/or present a user interface in accordance with one or more aspects of the present disclosure.

In some examples, orchestration engine 130 manages functions of data center 10A such as compute, storage, networking, and application resources. For example, orchestration engine 130 may create a virtual network for a tenant within data center 10A or across data centers. Orchestration engine 130 may attach virtual machines (VMs) to a tenant's virtual network. Orchestration engine 130 may connect a tenant's virtual network to an external network, e.g. the Internet or a VPN. Orchestration engine 130 may implement a security policy across a group of VMs or to the boundary of a tenant's network. Orchestration engine 130 may deploy a network service (e.g. a load balancer) in a tenant's virtual network.

In some examples, SDN controller 132 manages the network and networking services such load balancing, security, and allocate resources from servers 12 to various applications via southbound API 133. That is, southbound API 133 represents a set of communication protocols utilized by SDN controller 132 to make the actual state of the network equal to the desired state as specified by orchestration engine 130. For example, SDN controller 132 implements high-level requests from orchestration engine 130 by configuring physical switches, e.g. TOR switches 16, chassis switches 18, and switch fabric 20; physical routers; physical service nodes such as firewalls and load balancers; and virtual services such as virtual firewalls in a VM. SDN controller 132 maintains routing, networking, and configuration information within a state database.

Typically, the traffic between any two network devices, such as between network devices (not shown) within switch fabric 20 or between servers 12 and customers 11 or between servers 12, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port, and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

Virtual routers (virtual router 30A to virtual router 30X, collectively "virtual routers 30" in FIG. 1) execute multiple routing instances for corresponding virtual networks within data center 10A and routes the packets to appropriate virtual machines 36 executing within the operating environment provided by servers 12. Each of servers 12 may include a virtual router. Packets received by virtual router 30A of server 12A, for instance, from the underlying physical network fabric may include an outer header to allow the physical network fabric to tunnel the payload or "inner packet" to a physical network address for a network interface of server 12A. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In some aspects, the virtual router buffers and aggregates multiple tunneled packets received from the underlying physical network fabric prior to delivery to the appropriate routing instance for the packets. That is, a virtual router executing on one of servers 12 may receive inbound tunnel packets of a packet flow from one or more TOR switches 16 within switch fabric 20 and, prior to routing the tunnel packets to a locally executing virtual machine, process the tunnel packets to construct a single, aggregate tunnel packet for forwarding to the virtual machine. That is, the virtual router may buffer multiple inbound tunnel packets and construct the single, tunnel packet in which the payloads of the multiple tunnel packets are combined into a single payload and the outer/overlay headers on the tunnel packets are removed and replaced with a single header virtual network identifier. In this way, the aggregate tunnel packet can be forwarded by the virtual router to the virtual machine as if a single inbound tunnel packet was received from the virtual network. Moreover, to perform the aggregation operation, the virtual router may leverage a kernel-based offload engine that seamlessly and automatically directs the aggregation of tunnel packets. Further example techniques by which the virtual routers forward traffic to the customer-specific virtual machines executing on servers 12 are described in U.S. patent application Ser. No. 14/228,844, entitled "PACKET SEGMENTATION OFFLOAD FOR VIRTUAL NETWORKS," incorporated herein by reference.

In some example implementations, virtual routers 30 executing on servers 12 steer received inbound tunnel packets among multiple processor cores to facilitate packet processing load balancing among the cores when processing the packets for routing to one or more virtual and/or physical machines. As one example, server 12A includes multiple network interface cards and multiple processor cores to execute virtual router 30A, and steers received packets among multiple processor cores to facilitate packet processing load balancing among the cores. For instance, a particular network interface card of server 12A may be associated with a designated processor core to which the network interface card directs all received packets. The various processor cores, rather than processing each of the received packets, offload flows to one or more other processor cores, in accordance with a hash function applied to at least one of the inner and outer packet headers, for processing to take advantage of available work cycles of the other processor cores.

In the example of FIG. 1, data center 10A further includes a policy controller 23 that provides monitoring, scheduling, and performance management for data center 10A. Policy controller 23 interacts with policy agents 35A-35X (collectively "policy agents 35" or "agents 35"), which are deployed within at least some of the respective physical servers 12 for monitoring resource usage of the physical compute nodes as well as any virtualized host, such as VM 36, executing on the physical host. In this way, policy agents 35 provide distributed mechanisms for collecting a wide variety of usage metrics as well as for local enforcement of policies installed by policy controller 23. In example implementations, policy agents 35 run on the lowest level "compute nodes" of the infrastructure of data center 10A that provide computational resources to execute application workload. A compute node may, for example, be a bare-metal host of server 12, a virtual machine 36, a container or the like.

In addition, each agent within one of servers 12A-12X may be communicatively coupled to other policy agents located in the same server or in a different server. The policy agents may be configured to issue a communication "ping," also referred to as a "communication probe" or simply a "probe," to one or more different policy agents. The communication link between the policy agents is illustratively shown as line 206 in FIG. 1. The policy agent issuing the probe may direct the probe to another policy agent, for example a policy agent in a different server. The probe may be configured to be routed through the same devices within the switch fabric 20 that would be used for regular communications between the servers, for example the TOR switches 16 and chassis switches 18 of the switch fabric. The policy agent issuing the probe or probes may monitor and collect results related to responses, or lack thereof, received in reply to the issued probes. For example, a probe may not return, indicating non-connectivity between the server hosting the policy agent issuing the probe and the server hosting the policy agent that is a destination for the probe. A probe may return after a time, indicating a round-trip time (two-way latency). In some cases, a probe expected to be received by the policy agent that is a destination for the expected probe is not received within an expected time frame, indicating non-connectivity between the server hosting the policy agent issuing the probe and the server hosting the policy agent that is a destination for the probe. In some cases, policy agents may use the probes to determine one-way trip times between servers (latency). The monitored and collected results may include non-connectivity, round-trip times, and latencies among the servers.

Communication probes may conform to various protocols, such as Internet Configuration Management Protocol (ICMP), Transmission Control Protocol (TCP), User Datagram Protocol (UDP), and Hypertext Transfer Protocol (HTTP). For example, an issued probe may be an ICMP Echo Request message (also known as a Ping) or TCP SYN packet, while a returned probe may be an ICMP Echo Reply message or TCP ACK packet. Other example types of probes may include Operations, Administration, and Management (OAM) messages, such as those that conform to Y.1731 or IEEE 802.1ag.

The collected results may then be forward to policy controller 23 for further processing, including for example for use in generating graphical user interfaces depicting various metrics and/or determined statuses for communications, related to the current state of communication links that may exist between various servers 12 within data center 10A.

Policy controller 23 obtains the usage metrics and metrics related to communication links between servers 12 from policy agents 35, and constructs a dashboard 203 (e.g., a set of user interfaces) to provide visibility into operational performance and infrastructure resources of data center 10A. Policy controller 23 may, for example, communicate dashboard 203 to UI device 129 for display to administrator 24. In addition, policy controller 23 may apply analytics and machine learning to the collected metrics to provide real-time and historic monitoring, performance visibility and dynamic optimization to improve orchestration, security, accounting and planning within data center 10A.

As shown in the example of FIG. 1, policy controller 23 may define and maintain a rule base as a set of policies 202. Policy controller 23 may administer control of each of servers 12 based on the set of policies 202 maintained by policy controller 23. Policies 202 may be created or derived in response to input by administrator 24 and/or in response to operations performed by policy controller 23. Policy controller 23 may, for example, observe operations of data center 10A over time and apply machine learning techniques to generate one or more policies 202. Policy controller 23 may periodically, occasionally, or continually refine policies 202 as further observations about data center 10A are made.

Policy controller 23 (e.g., an analytics engine within policy controller 23) may determine how policies are deployed, implemented, and/or triggered at one or more of servers 12. For instance, policy controller 23 may be configured to push one or more policies 202 to one or more of the policy agents 35 executing on servers 12. Policy controller 23 may receive information about internal processor metrics from one or more of policy agents 35, and determine if conditions of a rule for the one or more metrics are met. Policy controller 23 may analyze the internal processor metrics received from policy agents 35, and based on the analysis, instruct or cause one or more policy agents 35 to perform one or more actions to modify the operation of the server associated with a policy agent. For example, policy controller 23 may push one or more policies including configurations for communication protocols to be used, intervals for issuing the communication probes, and/or metrics to be monitored for use in conjunction with the agents issuing the communication probes between agents. Information collected from the policy agents related to the issuance and monitoring of these communication probes may be used to generate a dashboard including graphical user interfaces that visually depict one or more status related to the metrics associated with and/or derived from the collected information and data associated with the issuance of the communication probes. In another example, policy controller 23 may be configured to gather information about the devices and arrangement of devices included in the switch fabric 20, and generate a set of graphical user interfaces that visually depict these devices and the interconnections between these devices based on a set of pre-defined and/or user selectable rules.

In some examples, policy controller 23 may be configured to determine and/or identify elements in the form of the virtual machines, containers, services, and/or applications executing on each of servers 12. As used herein, a resource generally refers to a consumable component of the virtualization infrastructure, i.e., a component that is used by the infrastructure, such as CPUs, memory, disk, disk I/O, network I/O, virtual CPUs, and Contrail vrouters. A resource may have one or more characteristics each associated with a metric that is analyzed by the policy agent 35 (and/or policy controller 23) and optionally reported.

In general, an infrastructure element, also referred to herein as an element, is a component of the infrastructure that includes or consumes consumable resources in order to operate. Example elements includes hosts, physical or virtual network devices, instances (e.g., virtual machines, containers, or other virtual operating environment instances), and services. In some cases, an entity may be a resource for another entity. Virtual network devices may include, e.g., virtual routers and switches, vRouters, vSwitches, Open Virtual Switches, and Virtual Tunnel Forwarders (VTFs). A metric may be a value that measures the amount of a resource, for a characteristic of the resource, that is consumed by an element.

Policy controller 23 may also analyze internal processor metrics received from policy agents 35, and classify one or more virtual machines 36 based on the extent to which each virtual machine uses shared resources of servers 12 (e.g., classifications could be CPU-bound, cache-bound, memory-bound). Policy controller 23 may interact with orchestration engine 130 to cause orchestration engine 130 to adjust, based on the classifications of virtual machines 36 executing on servers 12, the deployment of one or more virtual machines 36 on servers 12. Policy controller 23 may be further configured to report information about whether the conditions of a rule are met to a client interface associated with user interface device 129. Alternatively, or in addition, policy controller 23 may be further configured to report information about whether the conditions of a rule are met to one or more policy agents 35 and/or orchestration engine 130.

Policy controller 23 may be implemented as or within any suitable computing device, or across multiple computing devices. Policy controller 23, or components of policy controller 23, may be implemented as one or more modules of a computing device. In some examples, policy controller 23 may include a number of modules executing on a class of compute nodes (e.g., "infrastructure nodes") included within data center 10A. Such nodes may be OpenStack infrastructure service nodes or Kubernetes master nodes, and/or may be implemented as virtual machines. In some examples, policy controller 23 may have network connectivity to some or all other compute nodes within data center 10A, and may also have network connectivity to other infrastructure services that manage data center 10A.

One or more policies 202 may include instructions to cause one or more of policy agents 35 to issue communication probes to one or more different agents 35 of the computer network system 8, and to monitor for responses received in reply to issuing the communication probes. One or more policies 202 may include instructions to cause one or more policy agents 35 to monitor one or more metrics associated with servers 12. One or more policies 202 may include instructions to cause one or more policy agents 35 to analyze one or more metrics associated with servers 12 to determine if connectivity exists between the source and destination agents associated with a communication probe, and for example to measure latency associated with the time for transmission and reception of the issued communication probes. One or more policies 202 may alternatively, or in addition, include instructions to cause policy agents 35 to report one or more metrics to policy controller 23, including whether those metrics satisfy the conditions of a rule associated with one or more policies 202. The reported information may include raw data, summary data, and sampling data as specified or required by one or more policies 202.

Dashboard 203 may represent a collection of graphical user interfaces presenting information about metrics, alarms, notifications, reports, connectivity and latency related to communication connections between network devices, network topologies, and other information about data center 10A. Dashboard 203 may include one or more graphical user interfaces that are presented by user interface device 129. User interface device 129 may detect interactions with dashboard 203 as user input (e.g., from administrator 24). Dashboard 203 may, in response to user inputs, may cause configurations to be made to aspects of data center 10A or projects executing on one or more virtual machines 36 of data center 10A relating to network resources, data transfer limitations or costs, storage limitations or costs, and/or accounting reports. Various aspect of the graphical user interfaces and or related to the issuance of communication probes may be varied and/or changes in response to user inputs received at dashboard 203.

Dashboard 203 may include a graphical view that provides a quick, visual overview of resource utilization by instance using histograms. The bins of such histograms may represent the number of instances that used a given percentage of a resource, such CPU utilization. By presenting data using histograms, dashboard 203 presents information in a way that allows administrator 24, if dashboard 203 is presented at user interface device 129, to quickly identify patterns that indicate under-provisioned or over-provisioned instances. In some examples, dashboard 203 may highlight resource utilization by instances on a particular project or host, or total resource utilization across all hosts or projects, so that administrator 24 may understand the resource utilization in context of the entire infrastructure.

Dashboard 203 may include information relating to costs for use of compute, network, and/or storage resources, as well as costs incurred by a project. Dashboard 203 may also present information about the health and risk for one or more virtual machines 36 or other resources within data center 10A. In some examples, "health" may correspond to an indicator that reflects a current state of one or more virtual machines 36. For example, an example virtual machine that exhibits a health problem may be currently operating outside of user-specified performance policy. "Risk" may correspond to an indicator that reflects a predicted future state of one or more virtual machines 36, such that an example virtual machine that exhibits a risk problem may be may be unhealthy in the future. Health and risk indicators may be determined based on monitored metrics and/or alarms corresponding to those metrics. For example, if policy agent 35 is not receiving heartbeats from a host, then policy agent 35 may characterize that host and all of its instances as unhealthy. Policy controller 23 may update dashboard 203 to reflect the health of the relevant hosts, and may indicate that reason for the unhealthy state is one or more "missed heartbeats."

One or more policy agents 35 may execute on one or more of servers 12 to monitor some or all of the performance metrics associated with servers 12 and/or virtual machines 36 executing on servers 12. Policy agents 35 may analyze monitored information and/or metrics and generate operational information and/or intelligence associated with an operational state of servers 12 and/or one or more virtual machines 36 executing on such servers 12. Policy agents 35 may interact with a kernel operating one or more servers 12 to determine, extract, or receive internal processor metrics associated with use of shared resources by one or more processes and/or virtual machines 36 executing at servers 12. Policy agents 35 may perform monitoring and analysis locally at each of servers 12. In some examples, policy agents 35 may perform monitoring and/or analysis in a near and/or seemingly real-time manner.

In the example of FIG. 1, and in accordance with one or more aspects of the present disclosure, policy agents 35 may monitor servers 12. For example, policy agent 35A of server 12A may interact with components, modules, or other elements of server 12A and/or one or more virtual machines 36 executing on servers 12. Policy agent 35A may, as a result of such interactions, collect information about one or more metrics associated with servers 12 and/or virtual machines 36. Such metrics may be raw metrics, which may be based directly or read directly from servers 12, virtual machines 36, and/or other components of data center 10A. In other examples, one or more of such metrics may be calculated metrics, which include those derived from raw metrics. In some examples, metrics may correspond to a percentage of total capacity relating to a particular resource, such as a percentage of CPU utilization, or CPU consumption, or Level 3 cache usage. However, metrics may correspond to other types of measures, such as how frequent one or more virtual machines 36 are reading and writing to memory.

Policy controller 23 may configure policy agents 35 to monitor for conditions that trigger an alarm. For example, policy controller 23 may detect input from user interface device 129 that policy controller 23 determines corresponds to user input. Policy controller 23 may further determine that the user input corresponds to information sufficient to configure a user-specified alarm that is based on values for one or more metrics. Policy controller 23 may process the input and generate one or more policies 202 that implements the alarm settings. In some examples, such policies 202 may be configured so that the alarm is triggered when values of one or more metrics collected by policy agents 35 at servers 12 exceed a certain threshold. Policy controller 23 may communicate information about the generated policies 202 to one or more policy agents 35 executing on servers 12. Policy agents 35 may monitor servers 12 for conditions on which the alarm is based, as specified by the policies 202 received from policy controller 23.

For instance, policy agent 35A may monitor one or more metrics at server 12A. Such metrics may involve server 12A, all virtual machines 36 executing on server 12A, and/or specific instances of virtual machines 36. Policy agent 35A may determine, based on the monitored metrics, that one or more values exceed a threshold set by or more policies 202 received from policy controller 23. For instance, policy agent 35A may determine whether CPU usage exceeds a threshold set by a policy (e.g., server 12A CPU usage>50%). In other examples policy agent 35A may evaluate whether one or more metrics is less than a threshold value (e.g., if server 12A available disk space <20%, then raise an alert), or is equal to a threshold value (e.g., if the number of instances of virtual machines 36 equals 20, then raise an alert). If policy agent 35A determines that the monitored metric triggers the threshold value, policy agent 35A may raise an alarm condition and communicate information about the alarm to policy controller 23. Policy controller 23 and/or policy agent 35A may act on the alarm, such as by generating a notification. Policy controller 23 may update dashboard 203 to include the notification. Policy controller 23 may cause updated dashboard 203 to be presented at user interface device 129, thereby notifying administrator 24 of the alarm condition.

In some examples, policy controller 23 may generate policies and establish alarm conditions without user input. For example, policy controller 23 may apply analytics and machine learning to metrics collected by policy agents 35. Policy controller 23 may analyze the metrics collected by policy agents 35 over various time periods. Policy controller 23 may determine, based on such analysis, information sufficient to configure an alarm for one or more metrics. Policy controller 23 may process the information and generate one or more policies 202 that implements the alarm settings. Policy controller 23 may communicate information about the policy to one or more policy agents 35 executing on servers 12. Each of policy agents 35 may thereafter monitor conditions and respond to conditions that trigger an alarm pursuant to the corresponding policies 202 generated without user input.

In accordance with techniques described herein, policy controller 23 generates profiles 213 for elements of data center 10A. A profile is associated with an element or group of elements and is a collection of alarms to be evaluated against corresponding metrics for the alarms to determine whether the associated element or group of elements is "active" or "inactive."

For example, policy controller 23, in response to input received via UI device 129, may generate profiles 213 for respective hosts, instances (e.g., VMs 36), network devices, groups thereof, and resources thereof (e.g., CPU, memory, disk, network interface, etc.). Moreover, a user or administrator configures elements of data center 10A to be members of one or more groups of elements such that the elements and groups and have a "member-of" relationship. As examples, an OpenStack host (e.g., any of servers 12) can be a member of one or more "host aggregates" that are each groups of one or more hosts. A Kubernetes container can be a member of (1) a pod, (2) a replication controller, (3) a namespace, and (4) several different services. A virtual machine 36 can be configured as a member of one or more "instance aggregates" that are each groups of one or more instances. A network device can be configured as a member of one or more "network device aggregates" that are each groups of one or more network devices. In each of the above examples, a user or agent may define profiles 213 for each element and group of elements. The term "aggregate" as used herein may refer to a set of one or more hosts, a set of one or more network devices, or a set of one or more instances.

In general, the techniques make use of certain internal processor metrics relating to resources that are shared inside of a physical processor, such as metrics relating to an internal cache of the processor that is shared by software executing one or more cores within the processor or memory bus bandwidth that is consumed by the cores within the physical processor. Such metrics relating to resources shared inside a physical microprocessor may provide insights as to how virtual machines 36 (or processes within virtual machines 36) executing on each of servers 12 are contending for or otherwise using shared resources internal to the processors. Such information may be used to pinpoint bottlenecks, instances of resource contention, and performance issues that might not otherwise be apparent from other metrics, such as CPU utilization or CPU load metrics.

In some examples, the manner in which one or more virtual machines 36 operate and/or use such shared resources (such as a shared cache or memory bus) on a given server may adversely affect the operation of other virtual machines 36 on that same server. However, by monitoring only CPU usage, for example, it may be difficult to identify which particular virtual machine is causing performance problems for other virtual machines 36. Yet by monitoring metrics of resources internal to the processor of each of servers 12, it may be possible not only to identify which virtual machine may be causing performance problems for other virtual machines 36 on a given processor, but to also take steps to improve the policy control of all virtual machines 36 executing the processors of one or more servers 12. If appropriate policy control is applied across data center 10A, it may be possible to improve the operation, efficiency, and consistent performance of data center 10A in the aggregate, and more effectively comply with service level agreements and performance guarantees.

By monitoring internal processor metrics to identify resources shared within the processor of a server as consumed by elements including software processes executing on hardware cores internal to the processor, policy controller 23 of data center 10A may identify virtual machines 36, containers, and/or processes that are consuming shared resources in manner that may adversely affect the performance of other virtual machines 36, containers, and/or processes executing on that server. By identifying processes that may be adversely affecting the operation of other processes, policy controller 23 of data center 10A may take steps to address how such processes operate or use shared resources, and as a result, improve the aggregate performance of virtual machines, containers, and/or processes executing on any given server, and/or improve the operation of all servers 12 collectively. Accordingly, as a result of identifying processes adversely affecting the operation of other processes and taking appropriate responsive actions, virtual machines 36 may perform computing operations on servers 12 more efficiently, and more efficiently use shared resources of servers 12. By performing computing operations more efficiently and more efficiently using shared resources of servers 12, data center 10A may perform computing tasks more quickly and with less latency. Therefore, aspects of this disclosure may improve the function of servers 12 and data center 10A, because identifying and addressing any virtual machines 36 that are adversely affecting the operation of other virtual machines 36 may have the effect of enabling servers 12 and data center 10A to perform computing tasks more quickly and with less latency.

Further, assessment of metrics or conditions that may trigger an alarm may be implemented locally at each of servers 12 (e.g., by policy agents 35). By performing such assessments locally, performance metrics associated with the assessment can be accessed at a higher frequency, which can permit or otherwise facilitate performing the assessment faster. Implementing the assessment locally may, in some cases, avoid the transmission of information indicative of performance metrics associated with assessment to another computing device (e.g., policy controller 23) for analysis. As such, latency related to the transmission of such information can be mitigated or avoided entirely, which can result in substantial performance improvement in scenarios in which the number of performance metrics included in the assessment increases. In another example, the amount of information that is sent from the computing device can be significantly reduced when information indicative or otherwise representative of alarms and/or occurrence of an event is to be sent, as opposed to raw data obtained during the assessment of operational conditions. In yet another example, the time it takes to generate the alarm can be reduced in view of efficiency gains related to latency mitigation.

Various components, functional units, and/or modules illustrated in FIG. 1 (e.g., user interface device 129, orchestration engine 130, SDN controller 132, and policy controller 23, policy agent 35) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform.

In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

Alarms included in a profile 213, when triggered or 'active,' determine whether the profile 213 is active. In addition, alarms for groups of elements of which an element is a member may also determine whether the profile 213 for the element is active. Because an element may be a member of multiple groups that overlap at least with respect to the element, policy controller 23 that generates and in some cases distributes profiles 213 to policy agents 35 may allow users and administrators of virtualization infrastructure of data center 10A to express, with a profile 213, a combination of alarms to be applied to an element or group by configuring membership of the element or group in another group, without having to manually configure an overall profile 213 for the element or the group. Further, the techniques may dynamically account for changes in a group membership by evaluating the profile 213 for the group using the new set of elements that are members of a group without having to reconfigure the profile 213 for the group.

Policy controller 23 may distribute profiles 213 to policy agents 35 executing on computing devices, e.g., server 12 or network devices of data center 10A. A policy agent 35 evaluates each of the received profiles 213 based on the one or more alarms included therein and on metrics received by the policy agent 35 indicating a performance of the element and, at least in some cases where the element is a member of a group, one or more other elements that are also members of the group. Further example techniques by of policy of controller 23 are described in U.S. patent application Ser. No. 15/797,098, entitled "MICRO-LEVEL MONITORING, VISIBILITY AND CONTROL OF SHARED RESOURCES INTERNAL TO A PROCESSOR OF A HOST MACHINE FOR A VIRTUAL ENVIRONMENT," incorporated herein by reference in its entirety.

Figure 2:
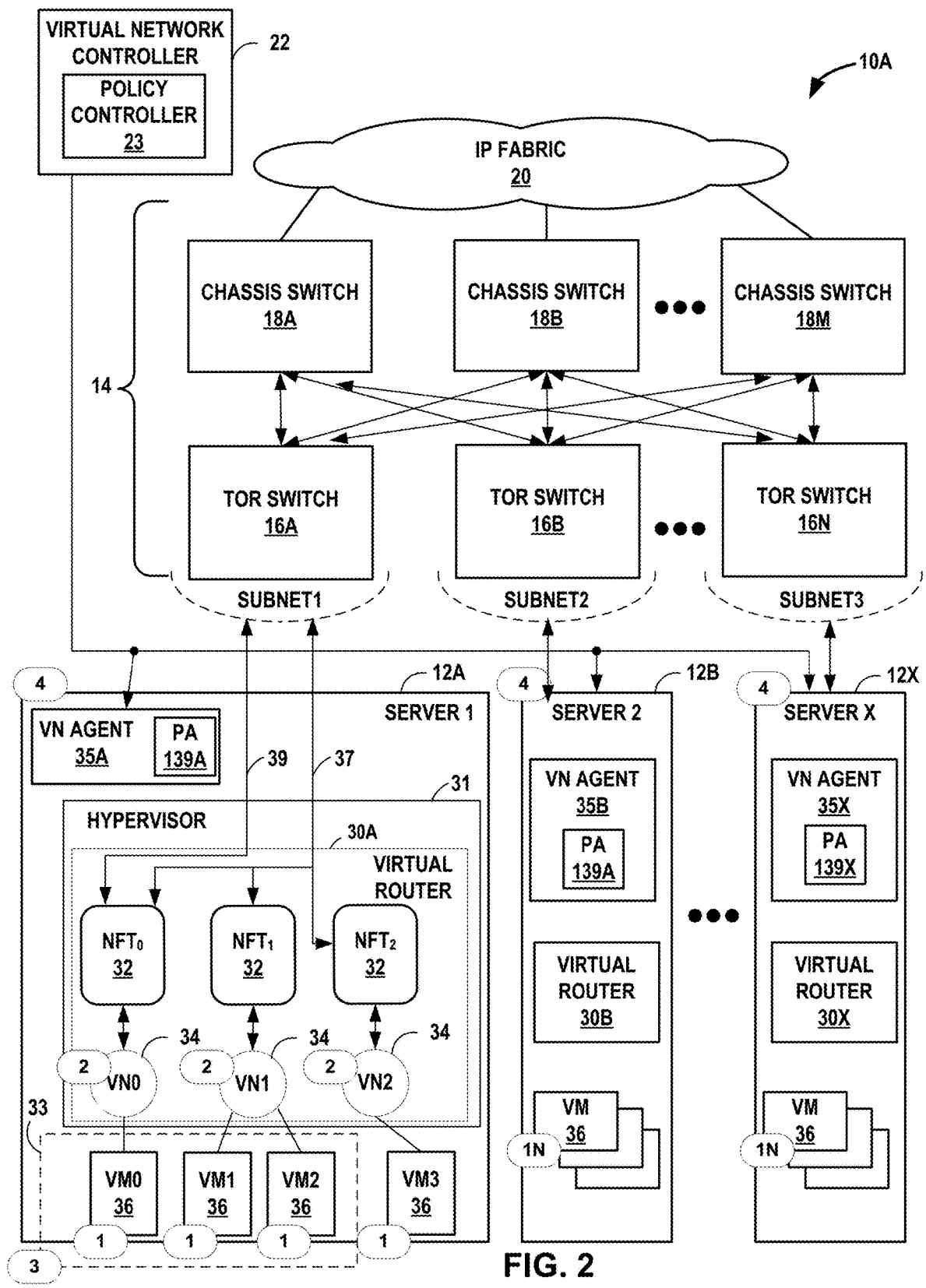
FIG. 2 is a block diagram illustrating an example implementation of a data center of FIG. 1 in further detail.

FIG. 2 is a block diagram illustrating an example implementation of data center 10A of FIG. 1 in further detail. In the example of FIG. 2, data center 10A includes an overlay network that extends switch fabric 20 from physical switches 16, 18 to software or "virtual" switches 30A-30X (again, collectively "virtual routers 30"). Virtual routers 30 dynamically create and manage one or more virtual networks 34 usable for communication between application instances. In one example, virtual routers 30 execute the virtual network as an overlay network, which provides the capability to decouple an application's virtual address from a physical address (e.g., IP address) of the one of servers 12A-12X ("servers 12") on which the application is executing. Each virtual network may use its own addressing and security scheme and may be viewed as orthogonal from the physical network and its addressing scheme. Various techniques may be used to transport packets within and across virtual networks 34 over the physical network. In some examples, the techniques described in this disclosure provide multicast service within virtual networks 34 without requiring multicast support in the underlying physical network.

Each virtual router 30 may execute within a hypervisor, a host operating system or other component of each of servers 12. Each of servers 12 may represent an x86 or other general-purpose or special-purpose server capable of executing virtual machines 36. In the example of FIG. 2, virtual router 30A executes within hypervisor 31, also often referred to as a virtual machine manager (VMM), which provides a virtualization platform that allows multiple operating systems to concurrently run on one of servers 12. In the example of FIG. 2, virtual router 30A manages virtual networks 34, each of which provides a network environment for execution of one or more virtual machines (VMs) 36 on top of the virtualization platform provided by hypervisor 31. Each VM 36 is associated with one of the virtual networks VN0-VN1 and may represent tenant VMs running customer applications such as Web servers, database servers, enterprise applications, or hosting virtualized services used to create service chains. In some cases, any one or more of servers 12 or another computing device may host customer applications directly, i.e., not as virtual machines. In some cases, some of VMs 36 may represent containers, another form of virtualized execution environment. That is, both virtual machines and container are examples of virtualized execution environments for executing workloads.

In general, each VM 36 may be any type of software application and may be assigned a virtual address for use within a corresponding virtual network 34, where each of the virtual networks may be a different virtual subnet provided by virtual router 30A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIG. 1 or 2.

In one implementation, each of servers 12 includes a corresponding one of virtual network (VN) agents 35A-35X (collectively, "VN agents 35") that controls the overlay of virtual networks 34 and that coordinates the routing of data packets within server 12. In general, each VN agent 35 communicates with virtual network controller 22, which generates commands to control routing of packets through data center 10A. VN agents 35 may operate as a proxy for control plane messages between virtual machines 36 and virtual network controller 22. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing. In accordance with the techniques of the disclosure, each VN agent 35 further includes a respective policy agent 139A-139X (collectively, policy agents 139") for applying one or more policies to one or more categories, as will described in more detail below.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10A to create one or more overlay networks. Besides IPinIP, other example tunneling protocols that may be used include IP over GRE, VxLAN, MPLS over GRE, MPLS over UDP, etc.

As noted above, virtual network controller 22 provides a logically centralized controller for facilitating operation of one or more virtual networks within data center 10A. Virtual network controller 22 may, for example, maintain a routing information base, e.g., one or more routing tables that store routing information for the physical network as well as one or more overlay networks of data center 10A. Similarly, switches 16, 18 and virtual routers 30 maintain routing information, such as one or more routing and/or forwarding tables. In one example implementation, virtual router 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

In accordance with the techniques of the disclosure, virtual network controller 22 further includes policy controller 23. Policy controller 23 is configured to tag a plurality of objects across a plurality of levels. In some examples, the plurality of levels includes a level of an object, such as a global environment level, a project level, a virtual network level, a virtual machine level, or an interface level of the object. In further examples, policy controller 23 tags the plurality of objects across a plurality of categories. In some examples, the plurality of categories include applications executing within VMs 36, deployments, application tiers, geographic sites, virtual networks, VMs 36, interfaces, projects, security requirements, quality requirements, users, or compliance requirements.

In some examples, policy controller 23 further distributes, to respective policy agents 139 of VN agents 35, a plurality of policies. Each policy of the plurality of policies includes one or more policy rules for controlling network traffic. Each of the plurality of policies may further include instructions for issuing communication probes from the agent to one or more different agents. Each policy rule of the plurality of policy rules specifies one or more tags, each tag further specifying one or more dimensions of the categories.

Upon receiving the plurality of policies, each policy agent 139 applies the one or more policy rules of each of the plurality of policies to tagged objects corresponding to tags of the one or more policy rules to control network traffic between the tagged objects. For example, policy agents 139 under the direction of policy controller 23 express the one or more policy rules at logical interfaces of VMs 36 that are tagged with tags corresponding to tags of the one or more policy rules. Policy agents 139 permit or block network traffic to and/or from the logical interfaces based on the one or more policy rules.

As an illustration of the above, in the example of FIG. 2, policy agent 139A under the direction of policy controller 23 has tagged virtual machines VM0 36, VM1 36, VM2 36, and VM3 36 as belonging to a category described by tag 1. Further, policy agent 139A has categorized virtual networks VN0 34, VN1 34, and VN2 34 in a category described by tag 2, respectively. Furthermore, virtual machines VM0 36, VM1 36, and VM2 36 belong to a first project 33, which policy agent 139A has categorized as belonging to a category described by tag 3. Still further, policy agent 139A has categorized server 1 12A as belonging to a category described by tag 4.

In some examples, the one or more policy rules describe security or firewall rules, and based on the one or more security or firewall rules, each policy agent 139 may allow or deny network traffic between categories described by the one or more tags. In other examples, each of the one or more policy rules describe one or more firewall, network, application, or global policy rules. Thus, by applying the policies as described herein, policy agents 139 may apply specific policy rules so as to enable workloads with specific dimensions. Accordingly, the techniques of the disclosure may allow for scalable deployment of policies across different environments within a plurality of data centers 10. Further, the techniques of the disclosure may reduce the complexity and simplify management of such policies within the plurality of data centers 10.

In some examples, policies are "inherited" in that policies applied to parent objects are likewise applied to objects that are children of the parent objects in a hierarchical fashion. As one example, policy agent 139A receives a first policy rule that includes tag 3 that is applied to project 33. Policy agent 139A applies the first policy rule to project 33. Policy agent 139A further applies the first policy rule to children of the first project, such as virtual networks, virtual machines, and interfaces within the first project, but not to virtual networks, virtual machines, and interfaces within a second project, so as to permit or deny network traffic to the first project and objects within the first project as specified by the first policy rule. In the example of FIG. 2, policy agent 139A applies the first policy rule to virtual machines VM0 36, VM1 36, and VM2 36 because virtual machines VM0 36, VM1 36, and VM2 36 are children of project 33. However, policy agent 139A does not apply the first policy rule to virtual machine VM3 36, which is not part of project 33.

Continuing the forgoing example, policy agent 139A receives a second policy rule that includes tag 1 that describes virtual machines 36. Policy agent 139A therefore applies both the first policy rule and the second policy rule to virtual machines VM0 36, VM1 36, and VM2 36. Further, policy agent 139A applies both the first policy rule and the second policy rule to interfaces of virtual machines VM0 36, VM1 36, and VM2 36 (not depicted), which are children objects of virtual machines 36. However, policy agent 139A does not apply the second policy rule to project 33 because project 33 is a parent, not a child, of virtual machines VM0 36, VM1 36, and VM2 36.

In some examples of the techniques of the disclosure, the policy framework implements complex regular expressions to apply tags for such policies to specific environments or infrastructure. For example, such policy rules include tag expressions to group and/or segment workloads. As a further example, policy agent 139A applies a match condition to match the tag expressions with tagged objects corresponding to the tag expressions. Thus, global policies may be distributed to a plurality of policy agents 139, and each policy agent 139 may selectively apply only those policy rules that include tag expressions that correspond to tagged objects.

In some examples, policy controller 23 distributes one or more policy rules via Border Gateway Protocol (BGP). Such a BGP message may include an action for a particular traffic flow, such as allowing or denying the flow and a list of one or more destination protocols and ports for application of the specified action. In such an example, the BGP message may further specify one or more tags for an object as an extended community for BGP. Additional information with respect to BGP is described in "BGP MPLS-Based Ethernet VPN," RFC 7432, Internet Engineering Task Force (IETF), February 2015, available at https://tools.ietf.org/html/rfc7432, the entire contents of which is incorporated herein by reference.

Figure 3:
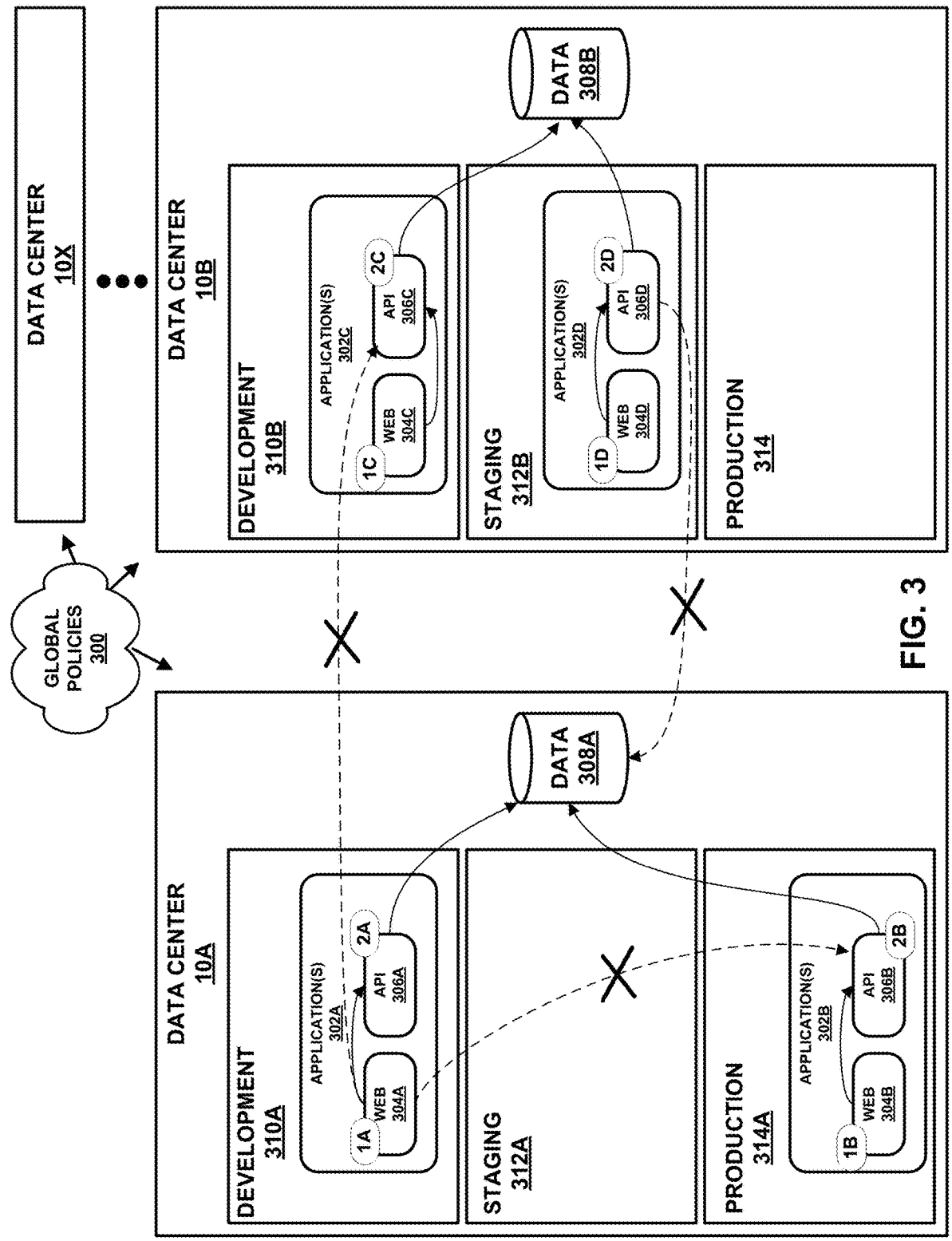
FIG. 3 is a block diagram illustrating an example of a plurality of data centers in which examples of the techniques described herein may be implemented.

FIG. 3 is a block diagram illustrating an example of a plurality of data centers 10 in which examples of the techniques described herein may be implemented. Each of data centers 10A-10X (collectively "datacenters 10") may operate in a substantially similar fashion to datacenters 10 of FIG. 1 and FIG. 2. In some examples, one or more of datacenters 10 implements a cloud environment executing Openstack, while in another example, one or more of data centers 10 is a cloud environment executing Kubernetes, while in yet another example, one or more of data centers 10 implements a cloud environment executing Amazon Web Services, while in yet another example, one or more of data centers 10 executes on "bare metal" infrastructure. In some examples, each of data centers 10 executes a different infrastructure than each other data center 10.

In the example of FIG. 3, each of data centers 10 comprises a database 308 and three different environments: a development environment 310, a staging environment 312, and a production environment 314. Each environment of each data center 10 is capable of executing one or more applications 302A-302D (collectively, "applications 302"), such as application 302A executing within development environment 310A of data center 10A, application 302B executing within production environment 314A of data center 10A, application 302C executing within development environment 310B of data center 10B, and application 302D executing within staging environment 312B of data center 10B. In one example, each application 302 is an instance of a finance application. Policies as described herein are robust and extensible for application in many different types of cloud environments described above.

Within an environment, each application may include a plurality of applications. In the example of FIG. 3, application 302A of development environment 310A executes web process 304A and Application Program Interface (API) process 306A. Further, application 302B of production environment 314A executes web process 304B and API process 306B. Application 302C of development environment 310B executes web process 304C and API process 306C. Still further, application 302D of staging environment 312B executes web process 304D and API process 306D. However, in other examples, each application 302 of a respective environment 310A, 312A, 314A, 310B, 312B, or 314B may execute additional or different processes than each other application 302. Furthermore, in some examples, the applications executed within each respective environment 310A, 310B, 312A, 312B, 314A, and 314B may be similar or different from the applications executed within each other environment 310A, 310B, 312A, 312B, 314A, and 314B.

It may be desirable to ensure that processes 304, 306 of each application 302 of a respective environment 310, 312, 314 does not exchange network traffic with processes 304, 306 of an application 302 within a different environment 310, 312, 314, while still permitting network traffic to flow between different processes 304, 306 within the same application 302. For example, an administrator may desire to allow network traffic between web process 304A and API process 306A because each of web process 304A and API process 306 operate within the same application 302A within development environment 310A. Further, the administrator may desire to prevent network traffic between web process 304A (e.g., operating within development environment 310A of data center 10A) and API process 306B (e.g., operating within production environment 314A of data center 10A) or between web process 304A (e.g., operating within development environment 310A of data center 10A) and API process 306C (e.g., operating within development environment 310B of data center 10B). Further, an administrator may desire to permit processes 304, 306 executing within an application 302 within the same data center 10 to access the same database 308, regardless of the specific environment 310, 312, or 314 within which the particular application 302 executes. For example, an administrator may desire to allow API process 306A executing within application 302A and API process 306B executing within application 302B to each access database 308A.

If the administrator were to independently manage network traffic policies for each process 304, 306 within each application 302 within each environment 312, 312, and 314 within each data center 10, the administrator may have difficulty ensuring that each network traffic policy meets security, reliability, and quality requirements. Furthermore, upgrading one or more of the policies across multiple data centers 10 may become cumbersome or unmanageable.

In accordance with the techniques of the disclosure, one or more tags specifying one or more categories are applied to each process 304, 306. As depicted in the example of FIG. 3, policy controller 23 of VNC 22 applies tag "1A" to web process 304A, which specifies that web process 304A belongs to development environment 310A. Similarly, policy controller 23 applies tag "2A" to API process 306A, which specifies that web process 304A belongs to development environment 310A. In contrast, policy controller 23 applies tag "1B" to web process 304B and tag "2B" to API process 306B, each of which specify that the respective application belongs to production environment 314A. Furthermore, tag "1C" is applied to web process 304C and tag "2C" is applied API process 306C, each of which specify that the respective application belongs to development environment 310B; and tag "1D" is applied to web process 304D and tag "2D" is applied to API process 306D, each of which specify that the respective application belongs to staging environment 312B.

In one example, a policy agent 139 of a VN agent 35 receives, from policy controller 23, one or more policies specifying one or more policy rules for allowing or blocking network traffic to and from applications 302. Each of the one or more policy rules specify one or more tags, each of the tags specifying one or more categories for application of the policy rules. Policy agent 139 applies, to each process 304, 306 of each application 302, only those policy rules that include tags matching tags applied to respective processes 304, 306.

For example, policy agent 139 may receive a first policy rule that permits network traffic destined for API process 306B and includes tag 1B. Policy agent 139 may examine tags for each of processes 304, 306, but apply the policy rule only to web process 304B because web process 304B is categorized within the same category as specified by tag 1B. VN agent 35 may subsequently permit network traffic flowing from an interface of a virtual machine executing web process 304B to an interface of a virtual machine executing API process 306B and block other traffic flowing to the interface of the virtual machine executing API process 306B, such as traffic flowing from an interface of a virtual machine executing web process 304A.

Similarly, policy agent 139 may receive a second policy rule that permits network traffic destined for database 308A and includes tags 2A and 2B. Policy agent 139 may examine categories applied to each of processes 304, 306. Policy agent 139 applies the policy rule only to API processes 306A and 306B because API processes 306A and 306B are categorized within the same category as specified by tags 2A and 2B, respectively. VN agent 35 may subsequently permit network traffic flowing from either an interface of a virtual machine executing API process 306A or the interface of the virtual machine executing API process 306B to an interface of database 308A and block other traffic flowing to the interface of database 308A, such as traffic flowing from a virtual machine executing API process 306D.

As depicted in the foregoing example, the second policy rule may specify tags 2A and 2B in a Boolean expression, e.g., (2A OR 2B). However, in accordance with the techniques of the disclosure, each policy rule may further include complex regular expressions that specify tags for one or more objects. For example, a policy rule may include one or more Boolean operators (e.g., AND, OR, NOT), mathematical operators (e.g., addition, subtraction, multiplication, division), bit-shifting operations, matrix operations, text parsing operators, or a combination of any of the foregoing.

In the foregoing examples, policy agent 139 implements whitelisting, in that all traffic between designated interfaces of virtual machines is preemptively blocked, and the one or more policy rules whitelist specific traffic flows (e.g., specify specific traffic flows between interfaces of virtual machines that are permitted). In alternate examples, policy agent 139 implements blacklisting, in that all traffic between interfaces of virtual machines is preemptively allowed, and the one or more policy rules blacklist specific traffic flows (e.g., specify specific traffic flows between interfaces of virtual machines that are blocked). In alternate examples, the one or more policy rules may include a combination of whitelisting or blacklisting specific traffic flows or groups of traffic flows between interfaces of virtual machines.

In the example of FIG. 3, policy agent 139 is depicted as receiving, from policy controller 23, tags specifying the specific environments to which processes 304, 306 belong. However, in other examples, policy agent 139 may receive tags that specify other categories for organizing processes 304, 306. For example, tags for processes 304, 306 may additionally, or alternatively, specify one or more application types, deployments, application tiers, geographic sites, virtual networks, virtual machines, interfaces, projects, security requirements, quality requirements, users, or compliance requirements.

For examples, one or more of data centers 10 implements a cloud environment executing OpenStack. In this example, the cloud environment supports three projects, each providing a finance application comprising three virtual networks. Within such a data center 10, policy controller 23 may assign one or more tags at a project level. For example, policy controller 23 may assign a tag comprising a key of "application" and a value of "finance" and a tag comprising a key of "deployment" and a value of "development" to a first project. Policy controller 23 may assign a tag comprising a key of "application" and a value of "finance" and a tag comprising a key of "deployment" and a value of "staging" to a second project. Policy controller 23 may assign a tag comprising a key of "application" and a value of "finance" and a tag comprising a key of "deployment" and a value of "production" to a third project. Further, within each project, policy controller 23 may assign tags to each of the three virtual networks. For example, policy controller 23 assigns a tag comprising a key of "tier" and a value of "web" to a first virtual network, a tag comprising a key of "tier" and a value of "application" to a second virtual network, and a tag comprising a key of "tier" and a value of "database" to a third virtual network. Policy controller 23 distributes one or more policy rules to policy agent 139, which applies the one or more policy rules to interfaces of virtual machines within the data center 10 based on the tags applied to the projects and virtual networks.

In some examples, one or more of data centers 10 is a cloud environment executing Kubernetes. In this example, the cloud environment supports two namespaces, each providing a finance application comprising three virtual networks. Within such a data center 10, policy controller 23 may assign one or more tags at a namespace level. For example, policy controller 23 may assign a tag comprising a key of "application" and a value of "finance," a tag comprising a key of "deployment" and a value of "development," and a tag comprising a key of "site" and a value of "US" to a first namespace. Policy controller 23 may assign a tag comprising a key of "application" and a value of "finance," a tag comprising a key of "deployment" and a value of "production," and a tag comprising a key of "site" and a value of "US" to a second namespace. Further, within each namespace, policy controller 23 may assign tags to each of the three virtual networks. For example, policy controller 23 assigns a tag comprising a key of "tier" and a value of "web" to a first virtual network, a tag comprising a key of "tier" and a value of "application" to a second virtual network, and a tag comprising a key of "tier" and a value of "database" to a third virtual network. Policy controller 23 distributes one or more policy rules to policy agent 139, which applies the one or more policy rules to interfaces of virtual machines within the data center 10 based on the tags applied to the projects and virtual networks.

In some examples, a first data center 10A implements a cloud environment executing Amazon Web Services and a second data center 10B executes on "bare metal" infrastructure." In this example, data center 10A supports a first finance application comprising three virtual networks and executing within a development deployment, while data center 10A supports a second finance application comprising three virtual networks and executing within a production deployment. In this example, policy controller 23 may assign one or more tags at an application level. For example, policy controller 23 may assign a tag comprising a key of "application" and a value of "finance," a tag comprising a key of "deployment" and a value of "development," and a tag comprising a key of "site" and a value of "US" to the first application executing within data center 10A. Policy controller 23 may further assign a tag comprising a key of "application" and a value of "finance," a tag comprising a key of "deployment" and a value of "production," and a tag comprising a key of "site" and a value of "US" to the second application executing within data center 10B. Further, within each application, policy controller 23 may assign tags to each of the three virtual networks. For example, policy controller 23 assigns a tag comprising a key of "tier" and a value of "web" to a first virtual network, a tag comprising a key of "tier" and a value of "application" to a second virtual network, and a tag comprising a key of "tier" and a value of "database" to a third virtual network. Policy controller 23 distributes one or more policy rules to policy agent 139, which applies the one or more policy rules to interfaces of virtual machines within the data center 10 based on the tags applied to the projects and virtual networks.

In the example of FIG. 3, policy controller 23 is described as distributing policy rules including tags for objects at a project level. However, policy controller 23 may additionally or alternatively distributing policy rules including tags specifying various different object levels, such as a global environment level, a project level, a virtual network level, a virtual machine level, or an interface level.

In an example implantation of the techniques of the disclosure, policy controller 23 uses a plurality of configuration objects to implement the one or more policies. As one example, policy controller 23 applies a first set of configuration objects at a global level. The first set configuration objects includes global application policy sets, global firewall policies, global firewall rules, and global tags across a plurality of levels and/or categories. Policy controller 23 distributes, to policy agents 139, the first set of configuration objects at the global level. Policy agents 139 match global tags associated with global application policy sets, global firewall policies, and global firewall rules to objects tagged with the global tags. Based on the global application policy sets, global firewall policies, and global firewall rules, policy agents 139 allow or block network traffic between interfaces of the objects tagged with the global tags.

Furthermore, policy controller 23 applies a second set of configuration objects at a project level. The second set of policy rules may include project-specific application policy sets, firewall policies, firewall rules, and tags across a plurality of levels. Policy controller 23 distributes, to policy agents 139, the second set of configuration objects at the project level. Policy agents 139 match project tags associated with project-specific application policy sets, firewall policies, and firewall rules to objects tagged with the project tags. Based on the project-specific application policy sets, firewall policies, and firewall rules, policy agents 139 allow or block network traffic between interfaces of the objects tagged with the project tags.

In further examples, policy controller 23 may specify lower-level configuration objects, such as application policy sets, firewall policies, firewall rules, and tags defined at a virtual network-specific level, a virtual machine-specific level, and/or an interface-specific level. By doing so, policy controller 23 may apply a hierarchical set of policies to a plurality of objects within one or more data centers 10. Thus, the techniques of the disclosure allow for distribution of simplified traffic policies that are scalable and robust across many different types of deployments and execution environments.

Figure 4:
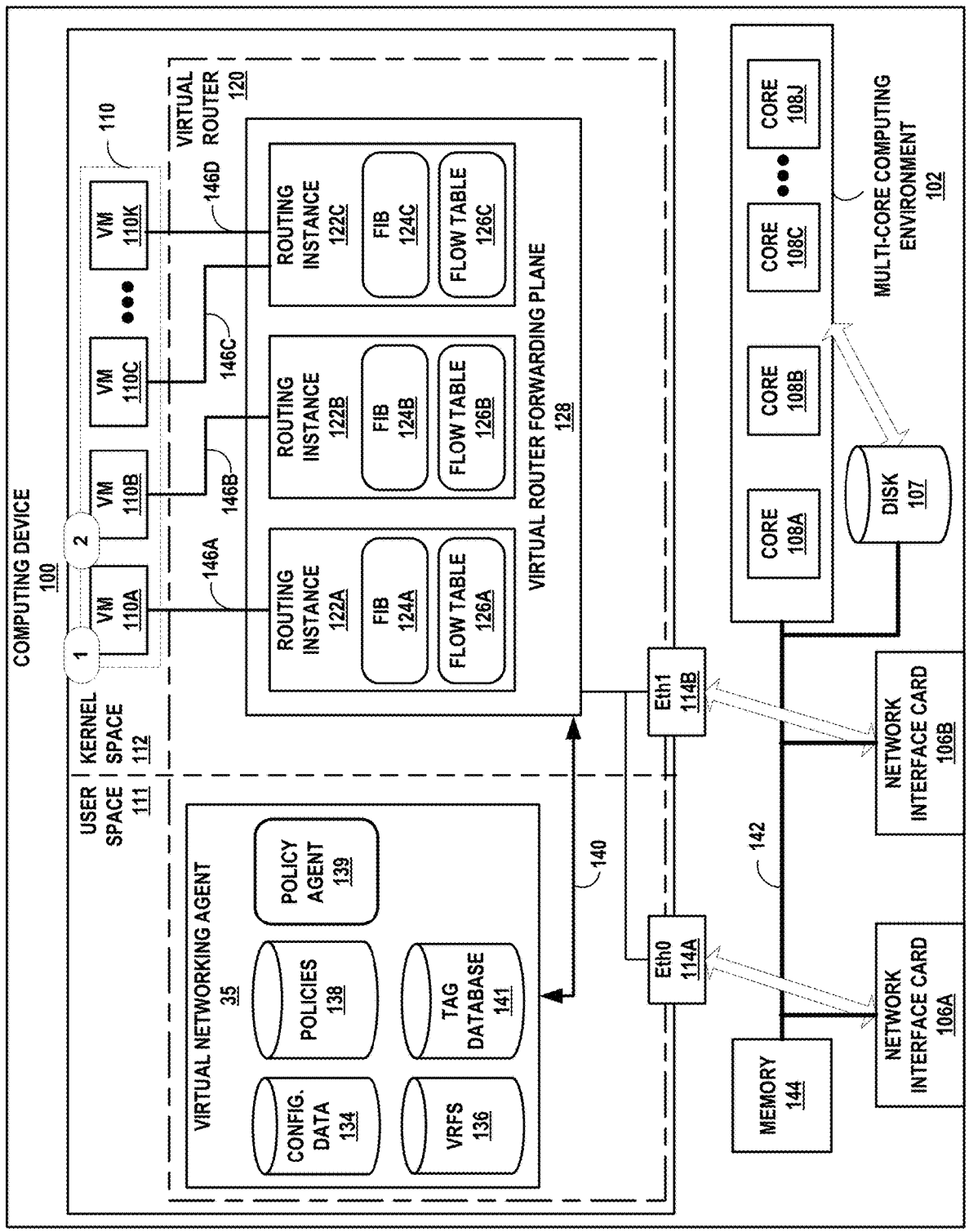
FIG. 4 is a block diagram illustrating an example computing device that executes a virtual router for virtual networks according to techniques described herein.

FIG. 4 is a block diagram illustrating an example computing device 100 that executes a virtual router 120 for virtual networks in accordance with one or more aspects of the present disclosure. Computing device 100 may represent any of servers 12 of FIGS. 1-3 or other device, such as any of TOR switches 16. Computing device 100 includes in this example a system bus 142 coupling hardware components of a computing device 100 hardware environment. System bus 142 couples memory 144, network interface cards (NICs) 106A-106B (collectively, "NICs 106"), storage disk 107, and multi-core computing environment 102 having a plurality of processing cores 108A-108J (collectively, "processing cores 108"). Network interface cards 106 include interfaces configured to exchange packets using links of an underlying physical network. Multi-core computing environment 102 may include any number of processors and any number of hardware cores from, for example, four to thousands. Each of processing cores 108 each includes an independent execution unit to perform instructions that conform to an instruction set architecture for the core. Processing cores 108 may each be implemented as separate integrated circuits (ICs) or may be combined within one or more multi-core processors (or "many-core" processors) that are each implemented using a single IC (i.e., a chip multiprocessor).

Disk 107 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by cores 108.

Main memory 144 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 144 provides a physical address space composed of addressable memory locations.

Memory 144 may in some examples present a non-uniform memory access (NUMA) architecture to multi-core computing environment 102. That is, cores 108 may not have equal memory access time to the various storage media that constitute memory 144. Cores 108 may be configured in some instances to use the portions of memory 144 that offer the lowest memory latency for the cores to reduce overall memory latency.

In some instances, a physical address space for a computer-readable storage medium may be shared among one or more cores 108 (i.e., a shared memory). For example, cores 108A, 108B may be connected via a memory bus (not shown) to one or more DRAM packages, modules, and/or chips (also not shown) that present a physical address space accessible by cores 108A, 108B. While this physical address space may offer the lowest memory access time to cores 108A, 108B of any of portions of memory 144, at least some of the remaining portions of memory 144 may be directly accessible to cores 108A, 108B. One or more of cores 108 may also include an L1/L2/L3 cache or a combination thereof. The respective caches for cores 108 offer the lowest-latency memory access of any of storage media for the cores 108.

Memory 144, network interface cards (NICs) 106A-106B (collectively, "NICs 106"), storage disk 107, and multi-core computing environment 102 provide an operating environment for a software stack that executes a virtual router 120 and one or more virtual machines 110A-110K (collectively, "virtual machines 110"). Virtual machines 110 may represent example instances of any of virtual machines 36 of FIG. 2. The computing device 100 partitions the virtual and/or physical address space provided by main memory 144 and in the case of virtual memory by disk 107 into user space 111, allocated for running user processes, and kernel space 112, which is protected and generally inaccessible by user processes. An operating system kernel (not shown in FIG. 4) may execute in kernel space and may include, for example, a Linux, Berkeley Software Distribution (BSD), another Unix-variant kernel, or a Windows server operating system kernel, available from Microsoft Corp. Computing device 100 may in some instances execute a hypervisor to manage virtual machines 110 (also not shown in FIG. 4). An example hypervisor 31 is illustrated in FIG. 2. Example hypervisors include Kernel-based Virtual Machine (KVM) for the Linux kernel, Xen, ESXi available from VMware, Windows Hyper-V available from Microsoft, and other open-source and proprietary hypervisors. In some examples, specialized hardware programmed with routing information such as FIBs 124 may execute the virtual router 120.

Eth0 114A and Eth1 114B represent devices according to a software device model and provide device driver software routines for handling packets for receipt/transmission by corresponding NICs 106. Packets received by NICs 106 from the underlying physical network fabric for the virtual networks may include an outer header to allow the physical network fabric to tunnel the payload or "inner packet" to a physical network address for one of NICs 106. The outer header may include not only the physical network address but also a virtual network identifier such as a VxLAN tag or Multiprotocol Label Switching (MPLS) label that identifies one of the virtual networks as well as the corresponding routing instance 122. An inner packet includes an inner header having a destination network address that conform to the virtual network addressing space for the virtual network identified by the virtual network identifier. For example, virtual router forwarding plane 128 may receive by Eth1 from NIC 106 a packet having an outer header than includes a VxLAN associated in virtual router forwarding plane 128 with routing instance 122A. The packet may have an inner header having a destination network address that is a destination address of VM 110A that taps, via tap interface 146A, into routing instance 122A.

Virtual router 120 in this example includes a kernel space 112 module: virtual router forwarding plane 128, as well as a user space 111 module: VN agent 35. Virtual router forwarding plane 128 executes the "forwarding plane" or packet forwarding functionality of the virtual router 120 and VN agent 35 executes the "control plane" functionality of the virtual router 120. VN agent 35 may represent an example instance of any of VN agents 35 of FIG. 2.

Virtual router forwarding plane 128 includes multiple routing instances 122A-122C (collectively, "routing instances 122") for corresponding virtual networks. Each of routing instances 122 includes a corresponding one of forwarding information bases (FIBs) 124A-124C (collectively, "FIBs 124") and flow tables 126A-126C (collectively, "flow tables 126"). Although illustrated as separate data structures, flow tables 126 may in some instances be logical tables implemented as a single table or other associative data structure in which entries for respective flow tables 126 are identifiable by the virtual network identifier (e.g., a VRF identifier such as VxLAN tag or MPLS label)). FIBs 124 include lookup tables that map destination addresses to destination next hops. The destination addresses may include layer 3 network prefixes or layer 2 MAC addresses. Flow tables 126 enable application of forwarding policies to flows. Each of flow tables 126 includes flow table entries that each match one or more flows that may traverse virtual router forwarding plane 128 and include a forwarding policy for application to matching flows. For example, virtual router forwarding plane 128 attempts to match packets processed by routing instance 122A to one of the flow table entries of flow table 126A. If a matching flow table entry exists for a given packet, virtual router forwarding plane 128 applies the flow actions specified in a policy to the packet. This may be referred to as "fast-path" packet processing. If a matching flow table entry does not exist for the packet, the packet may represent an initial packet for a new packet flow and virtual router forwarding plane 128 may request VN agent 35 to install a flow table entry in the flow table for the new packet flow. This may be referred to as "slow-path" packet processing for initial packets of packet flows and is represented in FIG. 4 by slow path 140.

In this example, VN agent 35 may be a user space 111 process executed by computing device 100. VN agent 35 includes configuration data 134, virtual routing and forwarding instances configurations 136 ("VRFs 136"), and policy table 138 ("policies 138"). VN agent 35 exchanges control information with one or more virtual network controllers (e.g., VNC 22 of FIGS. 1-2). Control information may include, virtual network routes, low-level configuration state such as routing instances and forwarding policy for installation to configuration data 134, VRFs 136, and policies 138. VN agent 35 may also report analytics state, install forwarding state to FIBs 124 of virtual router forwarding plane 128, discover VMs 110 and attributes thereof. As noted above, VN agent 35 further applies slow-path packet processing for the first (initial) packet of each new flow traversing virtual router forwarding plane 128 and installs corresponding flow entries to flow tables 126 for the new flows for fast path processing by virtual router forwarding plane 128 for subsequent packets of the flows.

In accordance with the techniques of the disclosure, VN agent 35 further includes tag database 141. As described above, policy controller 23 of VNC 22 assigns one or more tags specifying one or more levels and/or one or more categories for the objects. Policy controller 23 may apply tags to objects across a plurality of levels or categories, as well as apply the tags to objects across a plurality of data centers. Policy controller 23 distributes these tags to VN agent 35, which stores the assigned tags in tag database 141.

VN agent 35 further includes a policy agent 139. Policy agent 139 receives, from policy controller 23, one or more policies and stores such policies in policies 138. Each of policies 138 may include one or more policy rules that spec whether particular network traffic should be allowed or blocked. Further, each policy rule includes one or more policy tags that specify to which objects, such as applications executing on VMs 110, the policy rules apply. For example, policy agent 139 may cross reference the one or more tags of a policy rule with one or more tags in tag database 141 to determine one or more objects to which the policy rule should be applied. Upon determining the one or more objects to which the policy rule should be applied, policy agent 139 allows or blocks network traffic originating from or destined to the one or more objects in accordance with the policy rule. In some examples, policy agent 139 allows or blocks network traffic at an interface level of VMs 110. In this example, interfaces 146 inherit tags from parent objects, such as VMs 110, virtual networks, parent projects, or global policy sets. 10. Thus, policy agent 139 allows or blocks network traffic destined for or originating from interfaces 146 of VMs 110 by matching tags of one or more policy rules to tags applied to interfaces 146.

As one example, policy agent 139 receives, from policy controller 23, a first policy rule that permits network traffic originating from interface 146C and includes tag 1. Policy agent 139 may examine categories applied to interfaces 146, determine that a category of interface 146A matches tag 1 of the first policy rule, and apply the policy rule only to interface 146A. VN agent 35 may subsequently permit network traffic originating from interface 146C and destined for interface 146A.

As another example, policy agent 139 receives, from policy controller 23, a second policy rule that blocks network traffic originating from interface 146C and includes tag 2. Policy agent 139 may examine categories applied to interfaces 146, determine that the category of interface 146B matches tag 2 of the second policy rule, and apply the policy rule only to interface 146B. VN agent 35 may subsequently block network traffic originating from interface 146C and destined for interface 146B.

In addition, the policy agent 139 may receive from the policy controller 23 instructions related to communication probes to be issued by the policy agent 139. The policy controller 23 may include instructions regarding the communication protocol to be used in issuing the communication probes, the interval for issuing the probes, and what data and other information the policy agent 139 would monitor for and collect in conjunction with the issuance of the probes. The Policy controller 23 may also instruct the policy agent 139 on when and how to report any results related to the issuance of the communication probes back to the policy controller 23.

To update policies for a particular object or group of objects, an administrator may instruct policy controller 23 to distribute new policies to policy agents 139 of respective VN agents 35 of a plurality of data centers 10. In some examples, policy controller 23 distributes the new policies via a BGP message. In this fashion, an administrator may manage a scalable, multi-dimensional policy framework for a plurality of data centers. Further, each policy agent 139 may automatically apply the relevant policies without requiring the administrator to individually manage or update policies for each VN agent 35. Thus, the techniques of the disclosure may greatly reduce the complexity and simplify management of such policies across the plurality of data centers 10.

Figure 5:
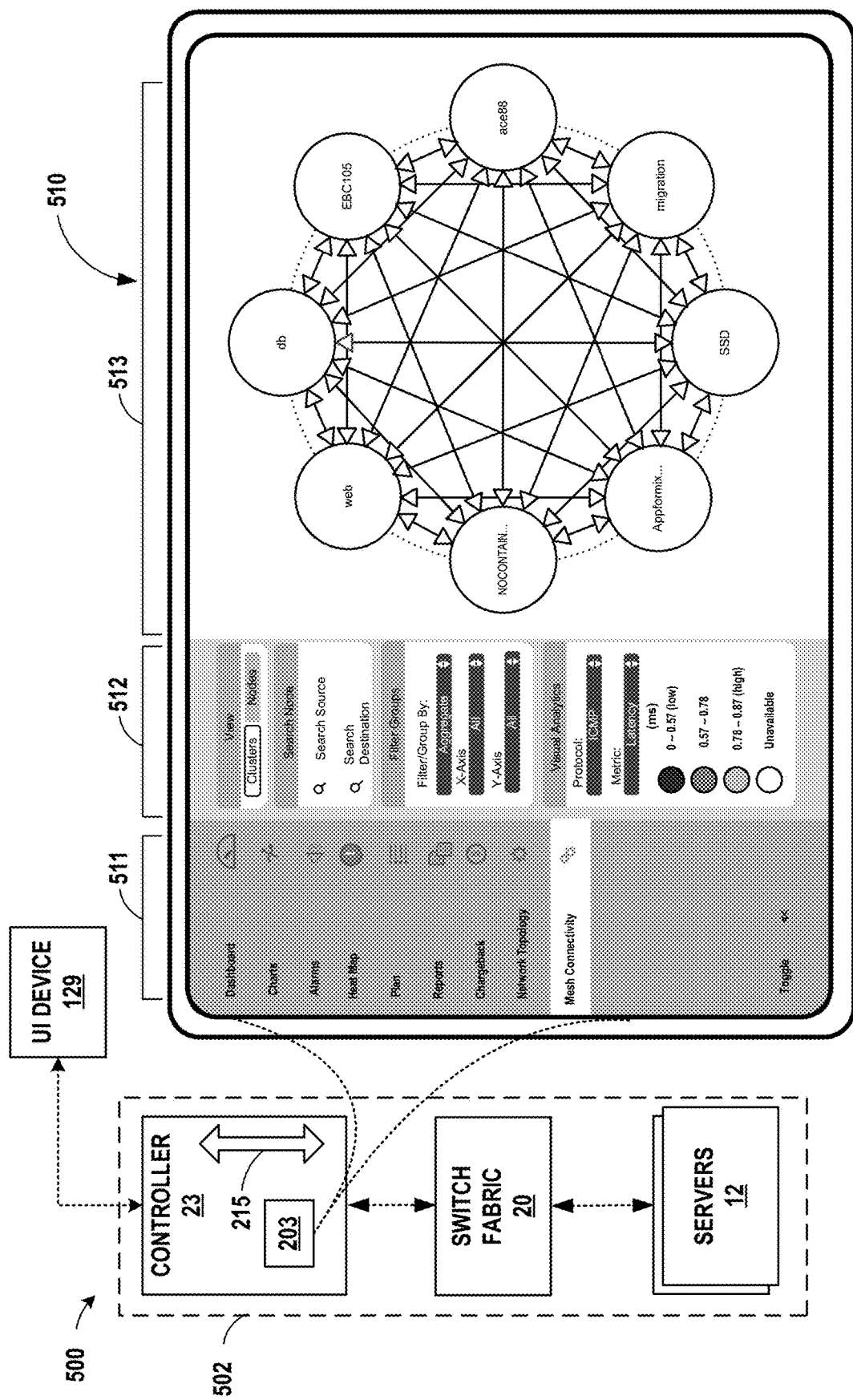
FIG. 5 is a block diagram of an example network in which a controller manages servers or compute nodes and provides a visualization of various metrics associated with the performance of a computer network through a dashboard according to techniques described herein.

FIG. 5 is a block diagram of an example network 500 in which a controller 23 manages servers or compute nodes and provides a visualization of various metrics associated with the performance of a computer network through a dashboard 203 in accordance with one or more aspects of the present disclosure. In the example illustrated in FIG. 5, controller 23 is shown as part of cluster 502. In other examples, however, controller 23 is not part of cluster 502, and in such an example, "cluster 502" refers to the compute nodes but not the controller. Cluster 502 of FIG. 5 may represent a cloud-based computing network and/or a computing domain or project, or other types of computing clusters. Where cluster 502 of FIG. 5 represents a cloud environment, such a cloud environment may be an OpenStack cloud environment or a Kubernetes cloud environment. Cluster 502 may be distributed across multiple environments, such as different data centers.

Controller 23 may operate in the manner described and illustrated in connection with FIGS. 1-4. For instance, in some examples controller 23 may interact with monitoring or policy agents (not shown in FIG. 5, but e.g. policy agents 35A-35X, FIG. 1), which are deployed within one or more of servers 12 (i.e., hosts or compute nodes) for monitoring resource usage and other performance metrics related to the operations of the servers or physical compute nodes as well as any virtualized host or instance, such as VMs or containers, implemented on one or more compute nodes. As described herein, the agents within cluster 502 may gather and publish information on message bus 215 about various performance parameters and/or metrics associated with the performance of a computer network, which may include physical devices included in switch fabric 20 and additional virtual devices that couple servers 12. The monitoring/policy agents may provide distributed mechanisms for collecting a wide variety of information related to the computer network coupling servers 12, and provide the information to controller 23.

For example, the policy agents may issue communication probes, in some examples at some predetermined intervals, the probes directed to other policy agents on a same or a different server within the computer network. Various parameters, such as the receipt of a response at the policy agent that was the destination of an issued probe, and a measured time lapse between the time of issuance of the probe and the time of receipt of a response from the destination agent at the source agent, may be measured and recorded for each communication probe that is issued. Various metrics and performance statuses may be measured and/or calculated/determined based on the issuance of the probes and/or based on the information reported to controller 23 by the policy agents issuing the probes and monitoring the responses to the issued probes.

Further, controller 23 may issue polices and rules, for example saved as polices 202 (FIG. 1), which are communicated to one or more of the policy agents issuing probes. The policies and rules may be used to control the issuance of the probes and/or to provide rules related to the gathering of information related to the issuance of the probes. For example, the format for a communication protocol to be used for the issued probes and/or the time interval for issuing the probes may be defined by the policies provided to one or more of the policy agents by controller 23. Further, the policies issued to the policy agents by controller 23 may define what types of data and/or other information is to be collected by the policy agents based on the issuance of the probes, and how and when to report the collected data or other information to the controller 23.

Dashboard 203 may be implemented in the manner described and illustrated in connection with FIGS. 1-4. As described in connection with FIG. 1, dashboard 203 may be created, updated, and/or maintained primarily by controller 23 and/or by a dashboard module executing on policy controller 23. In some examples, a computing device separate from controller 23 may generate dashboard 203. As illustrated in FIG. 5, controller 23 may generate dashboard 203, which may represent a collection of graphical user interfaces (e.g., including user interface 510) that provide information about topology, structure, hierarchy, utilization, and/or performance statuses and metrics associated with infrastructure elements. Controller 23 generates and outputs a graphical user interface screen, e.g., user interface 510, for display by UI device 129. In the example of FIG. 5, user interface 510 includes a set of application icons arranged in an application selection area 511, a view control area 512, and a main display area 513. A graphical representation of a set of aggregates displayed within the main display area 513 corresponds to aggregates of policy agents located on servers 12, and grouped together to form the individual aggregates shown as the interconnected circles in user interface 510.

To form aggregates, controller 23 may use tag information configured for servers 12 and referenced in policies applies by controller 23. Such tag information may identify each of servers 12 as hosting one or more instances each tagged with a label for an aggregate (e.g., "web", "db", "EBC105", etc.). A server 12 that hosts instances tagged with different labels for aggregates inherits the labels, in which case the server 12 may belong to multiple aggregates. Controller 23 associates results data from the policy agents for the servers 12 with aggregates that include the servers, such as by the servers hosting instances that belong to the aggregates.

In addition, one or more of infrastructure element representations provided in main display area 513 may include an indicator (e.g., a color or other visual indicator) that provides information about utilization, metrics, health, condition, and/or other status information relating to infrastructure of network 500. For instance, a graphical indicator, such as an arrowhead, which is associated with an aggregate that is being visually represented in main display area 513 may be rendered in a particular color that represents a status associated with a status or a metric selected for the current display being rendered as user interface 510. For example, a metric associated with a graphical display may relate to latency rates for communications sent from and returned to a particular agent or set of agents within a same aggregate of the computer network.

Different colors may be rendered for a graphical indicator associated with the particular agent or set of agents associated with a same aggregate based on a status determined for the agent or set of agents and based on a measurement of the selected metric, e.g., the measured latency for communication probes issued by the agent or set of agents to another agent or set of agents. A red color indicator might represent a latency rate having a measured time value that exceeds a first threshold value, a yellow color indicator might represent a latency rate that falls within a middle range of threshold time values, and a green color indicator might represent a latency rate that less than a threshold time value. A color indicator different from the colors used to indicate a status value for a measured latency value may be used for example when the communication link being indicated by the graphical indicator is considered to be "unavailable."

In some examples, controller 23 may, in response to inputs from a user (e.g., interactions with view control area 512 within user interface 510), generate or update the graphical user interfaces within dashboard 203 so that infrastructure elements are filtered by devices type, interconnections, health, risk, aggregate, project, network (virtual or physical), type, and/or in other ways. In such examples, a filter may cause some infrastructure elements to be hidden within dashboard 203 or a user interface of dashboard 203, while presenting other infrastructure elements within dashboard 203. Filters may be applied using functional paradigms. For example, each filter may correspond to a function, so that for a given set of "x" resources, elements, or other items to be filtered, and filter functions "f" and "g," application of the filter may compute f(g(x)). Where filters follow functional paradigms, applying filters in a different order (e.g., g(f(x))) will have the same result. In some examples, some or all of filter functions are pure, so that no state information outside of the function's context is changed. Every time a filter value (or other user interface component) is changed, controller 23 may apply an appropriate filter to all the resources in a resource hash table, and then reassign the resource array to the resultant array. Filters may be applied and/or reapplied when an interaction with user interface 510 is detected, when one or more infrastructure element representations within main display area 513 are selected or changed, when metric data is received by controller 23, and/or in other situations.

In some examples, as part of generating user interface 510 the controller 23 provides a visual display of aggregates as a set of interconnected circles, which may be referred to as the "clusters view," and which may be displayed as a default version of the user interface provided by dashboard 203. The "clusters view" of the graphical user interface may also be displayed based on receiving an input to dashboard 203 of the selection of the "Clusters" button included in the view control area 512, as further illustrated and described below with respect to FIG. 6. In other examples, controller 23 provides an arrangement of a set of status blocks arranged in a grid of one or more columns and one or more rows, as further illustrated and described with respect to FIGS. 7-17. Various user inputs may be provided to the user interface being displayed at any given time by dashboard 203 to allow for more or less detail related to a specific aggregate, a specific agent, or a specific set of agents to be rendered as the user interface being displayed by dashboard 203. In addition, user inputs may be used to control the communication protocols used by the agents to issue and receive communication probes, the time intervals for issuing the probes, and the metric(s) to be measured and/or displayed as part of the graphical display being provided at any particular time as the user interface being generated by controller 23 and provided through dashboard 203.

The systems, devices and methods as described in this disclosure allow the generation of these graphical user interfaces that depict, in real-time or near real-time, various metrics associated with the operation of the devices providing communications within a computer network being monitored. In addition, the graphical user interfaces allow display of status associated with a selected metric, such as communication times between agents, at a high or overall level, or at various levels of detail, based on user selectable inputs. Further, inputs to the system generating the graphical user interfaces allow a user to quickly select and change between different communication protocols for generating and transmitting the communication probes between agents and/or serves within the computer network, and to select for display values for various metrics that were measured and/or calculated based on the issuance of these communication probes.

Although the graphic symbols as described throughout this disclosure may relate to physical devices comprising the computer network being modeled by the graphical user interfaces, the representations included in the examples of graphic user interfaces are not limited to only physical devices. Graphic symbols as described in this disclosure may also include graphic symbols representing virtual entities, such as virtual servers, virtual router, and/or virtual instance of other computer/software entities that may have connections to one or more physical devices and/or to other virtual entities that may be graphically rendered and visually represented in a graphical user interface according to any of the examples described in this disclosure.

The graphical user interfaces described in this disclosure, and any equivalents thereof that may be generated and displayed using the systems, devices, and methods described herein, provide a visual tool that may allow a user, such as an information technology (IT) professional or a technician, to quickly and efficiently model, visualize, and locate issues associated with the performance of a computer network in real or near real-time. The user interfaces as described in this disclosure allow a user to view a variety of performance statuses and metrics associated with the operation of a computer network at a high overall level, and to quickly move to more a detailed-level user interface that provides a visual representation of a more specific portion or portions of the computer network based on simple inputs to the system generating the user interfaces, such as inputs to user interface 129 coupled to controller 23.

Figure 6:
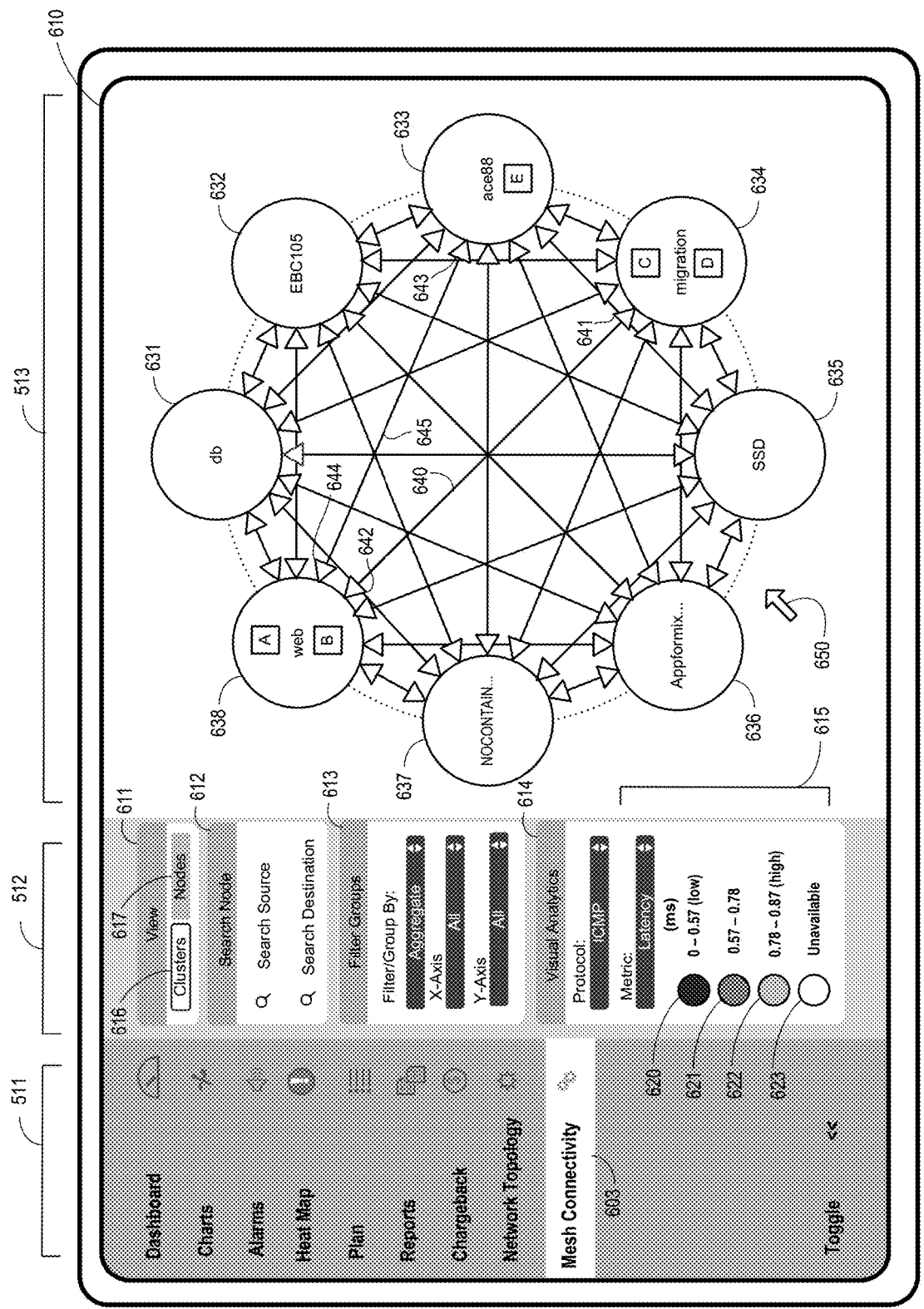
FIG. 6 illustrates an example graphical user interface output by a computing device that presents a cluster view of aggregates, according to techniques described herein.

FIG. 6 illustrates an example graphical user interface 610 output by a computing device that presents a cluster view of aggregates configured for a computer network in accordance with one or more aspects of the present disclosure. The illustration of user interface 610 includes features that remain the same or similar to corresponding features illustrated and described with respect to user interface 510 and FIG. 5. These corresponding features as shown in FIG. 6 in conjunction with user interface 610 retain the same reference numbers, and may provide the same or similar features and perform the same or similar functions as was described above with respect to user interface 510. Such corresponding features may include application selection area 511, view control area 512, and the portion of the user interface indicated as the main display area 513. Examples of differences between user interface 510 of FIG. 5 and user interface 610 as illustrated and described with respect to FIG. 6 are further described below.

User interface 610 as shown in FIG. 6 includes application selection area 511, view control area 512, and a main display area 513 which may be the same or similar to the corresponding areas as described above with respect to FIG. 5. As shown FIG. 6, application selection area 511 includes a plurality of user selectable applications, such as "Dashboard," "Charts," "Alarms," "Heat Map," "Plan," "Reports," "Chargeback," "Network Topology," and "Mesh Connectivity," with a graphical icon associated with each of the user selectable applications. When a user interacts with the user interface 610, for example by positioning a cursor (e.g., cursor 650) in the area where one of the selectable applications is located and indicates a selection of the particular selectable application, one or more applications may be launched, and various graphical displays associated with the selected application(s) may be presented in the view control area 512 and/or main display area 513 of user interface 610. Selection of the text or the icon associated with "Mesh Connectivity" in area 511 as shown in FIG. 6 may be used to launch the application(s) used to generate and display the graphical user interfaces associated with monitoring computer networks as described throughout this disclosure.

The user interface 610 as illustrated in FIG. 6 may appear as a default display when area 603 associated with the "Mesh Connectivity" text or the associated icon is first selected from within the application selection area 511, and the application(s) used to generate the graphical user interfaces associated with monitoring a computer network is not already launched. In other examples, a display of the same or similar user interface to that illustrated in FIG. 6 may be provided when the application(s) used to generate the graphical user interfaces associated with monitoring a computer network is already launched and the user selectable "Clusters" button 616 provided within the "View" box 611 is selected. When an example of the "clusters view" as shown in FIG. 6 is being provided as the user interface begin output from dashboard 203, the view control area 512 may include a plurality of boxes, including a "View" box 611, a "Search Node" box 612, a "Filter Groups" box 613, and a "Visual Analytics" box 614.

When the "clusters view" is being provided, the main display area 513 as shown in FIG. 6 may include a plurality graphic symbols representing aggregates, such as aggregates 631-638, illustratively shown as circles arranged generally in a circular arrangement relative to one another. Each circle representing one of the aggregates 631-638 includes a text label included within the circle, the text label indicative of a name assigned to that particular aggregate. As described above, each aggregate is a grouping together of a predefined number of agents that are included in a set of servers included in a computer network being monitored and modeled by the mesh connectivity application(s). Main display area 513 further includes a graphic depiction of a set of lines, each line of the set of lines extending between one of the circles representing an aggregate and another one of the circles representing a different aggregate. Each line of the set of lines in main display area 513 represents one or more communication interconnections between policy agent(s) included in the aggregates that the lines, respectively, extend between.

For example, line 640 as shown in main display area 513 extends between the "web" aggregate 638 and the "migration" aggregate 634. Line 640 has a first end that includes a first graphical indicator 641 and a second end that is opposite the first end and that includes a second graphical indicator 642. Aggregate 638 may be referred to as a source aggregate and aggregate 634 a destination aggregate. First graphical indicator 641 and second graphical indicator 642 as illustrated in user interface 610 appear as arrowheads located on the respective ends of line 640. However, the graphical indicators 641 and 642 are not limited to any particular shape, and may include shapes other than an arrowhead, such as a dot, a square, an ellipse, or some other graphical shape or symbol.

First graphical indicator 641 is positioned at the end of line 640 proximate to the "migration" aggregate 634, and the second graphical indicator 642 is positioned at the end of line 640 proximate to the "web" aggregate 638. First graphical indicator 641 may provide a visual indication of a status determined based on at least one metric associated with communications originating from the one or more policy agents of nodes grouped into aggregate 638 and having a destination or destinations associated with one or a plurality of agents of nodes grouped into aggregate 634. For the purpose of illustration, an example of the "web" aggregate 638 as illustrated in user interface 610 includes two agents shown as square shapes labeled "A" and "B" and positioned within the circle representing the "web" aggregate 638, and the "migration" aggregate 634 includes two agents shown as square shapes labeled "C" and "D" and positioned within the circle representing "migration" aggregate 634. Communication probes originating from aggregate 638 may be generated from agent "A" as the source, and directed to both agent "C" and to agent "D" of aggregate 634 as the destinations for these probes. Probes originating from aggregate 638 may also be generated by agent "B" as the source, and directed to both agent "C" and to agent "D" of aggregate 634 as the destinations for these probes. One or more metrics may be collected as a set of results ("results data") based on the issuance of the communication probes having an agent of aggregate 638 as the source and an agent of aggregate 634 as the destination for the probes. A status that may be determined based on an analysis of the set of results, and the visual indication of that status, may be provided by first graphical indicator 641, for example on an updated and real-time or near real-time basis.

The visual indication of the status provided by first graphical indicator 641 in some examples may be provided by rendering the graphic symbol associated with first graphical indicator 641 in one of a plurality of colors, each of the plurality of colors indicative of a particular status associated with the analysis of the set of results that were collected based on probes originating from the agent(s) of the "web" aggregate 638 and directed to agent(s) of the "migration" aggregate 634. Continuing with the illustrative example described above, a described above a set of probes may be configured to generate communication probes originating from agent "A" and directed to each of agents "C" and "D" of aggregate 634, along with communication probes originating from agent "B" and directed to each of the agents "C" and "D" of aggregate 634. The communication probes are configured to instruct the destination agents (i.e., agents "C" and "D") to respond to the source agent (i.e., agents "A" and "B"), respectively, with a response communication acknowledging receipt of the respective probes if and when the communication probes are received at the destination agent(s). At least one metric that may be collected with respect to the issuance of these communication probes concerns the availability or unavailability of a communication connection between the source agent and the destination agent. At least one metric that may be collected with respect to these communication probes includes a latency time measured between the time of issuance of the probe from the source agent and the time when a response to the issued probe is received back from the destination agent at the source agent. In some examples, when a response is not received back at the source agent within a predetermined amount of time following the issuance of a probe, the particular communication link between the source agent and the destination agent may be labeled as having an "unavailable" status.

The measured time for each response issued as a communication probe from the agent or agents in a given aggregate may be collected as a set of results associated with the communication probes issued by the agent(s) of that particular aggregate. For example, the measured times for each of the probes issued by any of the agents in a particular aggregate to agent in another particular aggregate may be individually compared to various ranges of threshold values, and a status assigned to each of the probes based on the response time measured for each issued probes that results in a response from the destination agent. In other examples, further analysis of the set of results may be performed to determine one or more overall statuses associated with the communication probes issued by the agent or agents in one aggregate to the agent or agents in another aggregate.

For example, if any of the communication probes issued by the agent(s) of a given aggregate to agent(s) of another aggregate was/were determined to be "unavailable," an overall status for a set of results associated with the probes may be determined as "unavailable." In another example, if at least one probe originating from each of the agents included in an aggregate (such as aggregate 638) and directed to at least one agent in another aggregate (such as aggregate 634) was determined to be "unavailable," an overall status for the set of results associated with the probes may be determined as "unavailable." In another example, all of the probes originating from agents of aggregate 638 may have been responded to by the destination agents in aggregate 634. In such instances, the analysis of the set of results associated with the probes may include determining which of the probes resulted in the slowest response time, i.e., which probe had the largest latency. The measured response time for the slowest response may then be compared to the ranges of threshold values for response times, and any overall status indicator for a graphic indicator associated with the source agent(s) may then be determined based on the particular range of time for the slowest communication probe. Setting of an overall status for an indicator associated with a status determined for an aggregate is not limited to the above-described examples, and may be based on other parameters and/or determinations based on the set of results or the analysis thereof associated with a set of communication probes issued by a particular agent or set of agents including in a particular aggregate. For example, an average and/or a median value for the latency times measured for a set of communication probes issued by agent(s) of an aggregate, (such as the agents of aggregate 638 and directed to agent(s) of aggregate 634) may be calculated, and the calculated values used to determine an overall status associated with the communication probes being issued by the source aggregate, e.g. agents of aggregate 638.

Each of the communication probe may be configured as a probe based on a policy. The policy may dictate for example a communication protocol to be used for the formatting and transmission of the probe. In some examples, the communication protocol may be a user selectable protocol that a system user may provide as an input to the controller of the computer system being used to generate the probes. As shown in user interface 610, the visual analytics box 614 includes a pull-down menu labeled "Protocol." Using the selections available from this pull-down menu, a user may select a protocol, such as the "ICMP" protocol, (i.e., the "Internet Control Message Protocol"), which is then to be used by the system to configure the probes that are to be issued by the agents of the computer network being monitored through the issuance of the probes. In some examples, once a user selection of a particular protocol using the pull-down protocol menu has been received, any probes issued within the computer network being monitored will be configured using the selected communication protocol.

In addition, the policy may also determine the rate or interval for issuing the probes within the computer network being monitored through the use of the communication probes. For example, the policy may dictate that communication probes are to be issued by agents of each aggregate, such as the "web" aggregate 638, at some predefined interval of time. By way of example, at each time interval determined by the policy, the agent(s) included in the "web" aggregate 638 issues a set of communication probes to each agent included in the "migration" aggregate 634. The responses and/or lack of responses received by the agents of the "web" aggregate 638 are collected as a set of results associated with that particular round of probes. Based on rules determined by the policy, an overall status is determined for the set of results associated with the particular round of probes, and a visual indication for first graphical indicator 641 may be rendered to provide a visual indication, such as a particular color indication, based on the determined overall status.

The visual indication for first graphical indicator 641 may be updated in real-time as soon as the set of results for the next and latest set of probes has been analyzed. The visual indication for first graphical indicator 641 may be maintained until the next set of probes is issued by the agents of aggregate 638, and a new set of results is collected and analyzed to determine a new overall status for first graphical indicator 641. As such, the visual indication of the overall status for the communications provided by first indictor 641 includes a real-time or near real-time representation of at least a status or a metric defined by the policy and having agent(s) of the "web" aggregate 638 as the source and having agents of the "'migration" aggregate 634 as the destination.

The above described examples have illustratively described communication probes issued by agents in the "web" aggregate 638 to agents in the "migration" aggregate 634. Examples of the computer network monitoring systems may also include a set of communication probes issued from agents with each of the aggregates 631-638 to other agents located in different ones of aggregates 631-638, and displaying a visual indicator based on the set of results associated with each of the source aggregates for the issued probes. Again referring to the "web" aggregate 638 and the "migration" aggregate 634 as shown in user interface 610, each of the agents "C" and "D" of aggregate 634 may be configured to issue probes to each of the agents "A" and "B" of aggregate 638. The probes issued by the agents of the "migration" aggregate 634 may be configured for example based on rules included in the policy and/or based on user selections as described for the probes issued by the agents of the "web" aggregate 638. For example, the policy or a user selection may be used to set a communication protocol that is then used to configure and transmit the probes issued by the agents included in "migration" aggregate 634 to agents of the "web" aggregate 638. The interval for issuing set of probes from the agents included in aggregate 634 may also be determined by rules included in the policy.

In a manner similar to any of the examples described above with respect to probes issued by the "web" aggregate 638, the probes issued by the "migration" aggrege 634 may be monitored for various aspects, such as response or lack of response and/or for measured response times. The policies and rules provided to each individual agent or set of agents within an aggregate does not necessarily need to be a same set of policies or rules dictated by controller 23 to other aggregates of the computer network. For example, the time intervals at which the agent(s) of one aggregate or the agents within a given aggregate are instructed to issue probes over may be a different time interval, for example a shorter interval or a longer time interval, than the agent(s) of a different aggregate are instructed to issues their communication probes over. Further, the policies or rules provided by controller 23 to an aggregate may include an indication of which agent or agents are to issue probes, and for examples which agent or agents within an aggregate are not to issue probes. The policies or rules provided by controller 23 to a particular aggregate may include an indication of which other agent or agents the source agent in the particular aggregate is to issue probes to, and/or which agents or agents the source probe is not to issues probes to as a destination agent. In various examples, the polices or rules issued by controller 23 to an aggregate may include an indication of what metrics and/or performance parameters the agent issuing the probes is required to collect data or other information for, and how this data and/or other information is to be reported to the controller 23.

The measurements made based on monitoring the probes issued by the agents included in "migration" aggregate 634 may be collected as a set of results associated with the issuance of these probes, and analyzed to determine at least one metric and/or an overall status for the set of results associated with the issuance of the probes. In a manner similar to that described above with respect to any of the examples related to first graphical indictor 641, the second graphical indicator 642 may be located at the second end of line 640 and proximate to the circle representing the "web" aggregate 638, and may be rendered to include a visual indication, for example a particular color of one of a plurality of colors, that represents the determined status associated with the set of results collected for the latest probes issued by the agents of aggregate 634.

Based on the setting of the visual indications provided by the first graphical indicator 641 and the second graphical indicator 642, a real-time or near real-time visual representation of statuses associated with both the commutations originating from and directed to, respectively, the "web" aggregate 638 and the "migration" aggregate 634 may be provided as part of user interface 610. As further illustrated in FIG. 6, each of the circles representing aggregates 631-638 includes an individual line connecting each aggregate to one other respective aggregate, each line having a first graphical indicator included at a first end of the line proximate to one aggregate and a second graphical indicator included at a second end of the line opposite the first end of the line and proximate to a second aggregate that the line extends to. In some examples, the first graphical indicator and the second graphical indicator for each line may be rendered to provide a visual indication of the status determined for communication probes sourced from the respective agents of the aggregate pointed to or otherwise indicated by the graphical indicator in the user interface 610 and directed to the agent(s) of the aggregate at the opposite end of the line extending between the two aggregates. As such, a communication status for each and every aggregate with every other aggregate included within a computer network being monitored by the use of the probes may be visually provided in a single display, such as the graphical user interface 610 illustrated by FIG. 6. Thus, examples of the "clusters view" as illustratively shown by user interface 610 may be used to provide a visual representation of a set of overall and/or high-level statuses in real-time or near real-time associated with a group of aggregates forming a computer network that is being monitored by the issuance of communication probes over the network structure used to communicatively couple a plurality of servers forming at least a portion of the computer network.

Additional portions of view control area 512 and/or portions of the main display area 513 may provide user selectable areas, for example areas selectable by a cursor such as cursor 650. The display being provide by dashboard 203 as user interface 610 may be manipulated and/or changed based on user inputs to control and change the visual aspects of the user interface 610 being displayed and/or the parameters used to control the issuance of the probes being used to collect the sets of results being analyzed to provide the displayed results. For example, based on user inputs, the "Nodes" button 617 in the "View" box 611 may be selected to provide a more detailed view of the monitored computer network that includes only certain aggregates of the available aggregates, e.g., communications between a selected pair of aggreges of aggregates 631-638.

The aggregates to be including in the more detailed view may be chosen based on user inputs provided to the "X-Axis" and the "Y-Axis" pull-down menus provided in the "Filter Groups" box 613. These inputs used to request a more detailed view may result in different examples of a graphical user interface currently being provided as an output by a computer system, such as the computer system generating the graphical user interface 610. In other examples, selecting one of the graphical indicators (e.g., first graphical indictor 641, second graphical indicator 642), which are associated with one of the lines extending between the circles representing aggregates 631-638 may cause the graphical user interface to be generated that displays a more detailed view of the agents of the selected source aggregate and the agents of the destination agents in the aggregate coupled to the source aggregate by the line associated with the selected graphical indicator. Examples of these more detailed views are further illustrated and described below with respect to FIGS. 7-17.

The example graphical user interface 610 as shown in FIG. 6 provides an efficient display of the overall statuses that may be associated with an entire computer network being monitored though the use of the probes issued by the agents of the computer network. As such, a user such as an IT specialist or technician, may easily monitor and spot trouble or potential trouble with respect to the communication couplings between the servers within the monitored computer network on a real-time or a near real-time basis. This includes providing graphical user interfaces as described herein for computer networks that may be large and expansive, and/or may include computing devices that may be located in different physical locations, such as different geographical locations, but presented together in simple to understood graphical user interfaces.

In addition, features of the graphical user interface 610 allow a user to drill down into portions of the monitored computer network to obtain a more detailed view, and thus a better perspective of specific portions and/or devices within the monitored computer network that for example may be experiencing issues with communications between servers. The detailed views may be generated and provided based on one or a small number of user provided inputs, thus allowing speed and efficiency in maneuvering around the displays illustrative of the various portions of the computer network being monitored.

Figure 7:
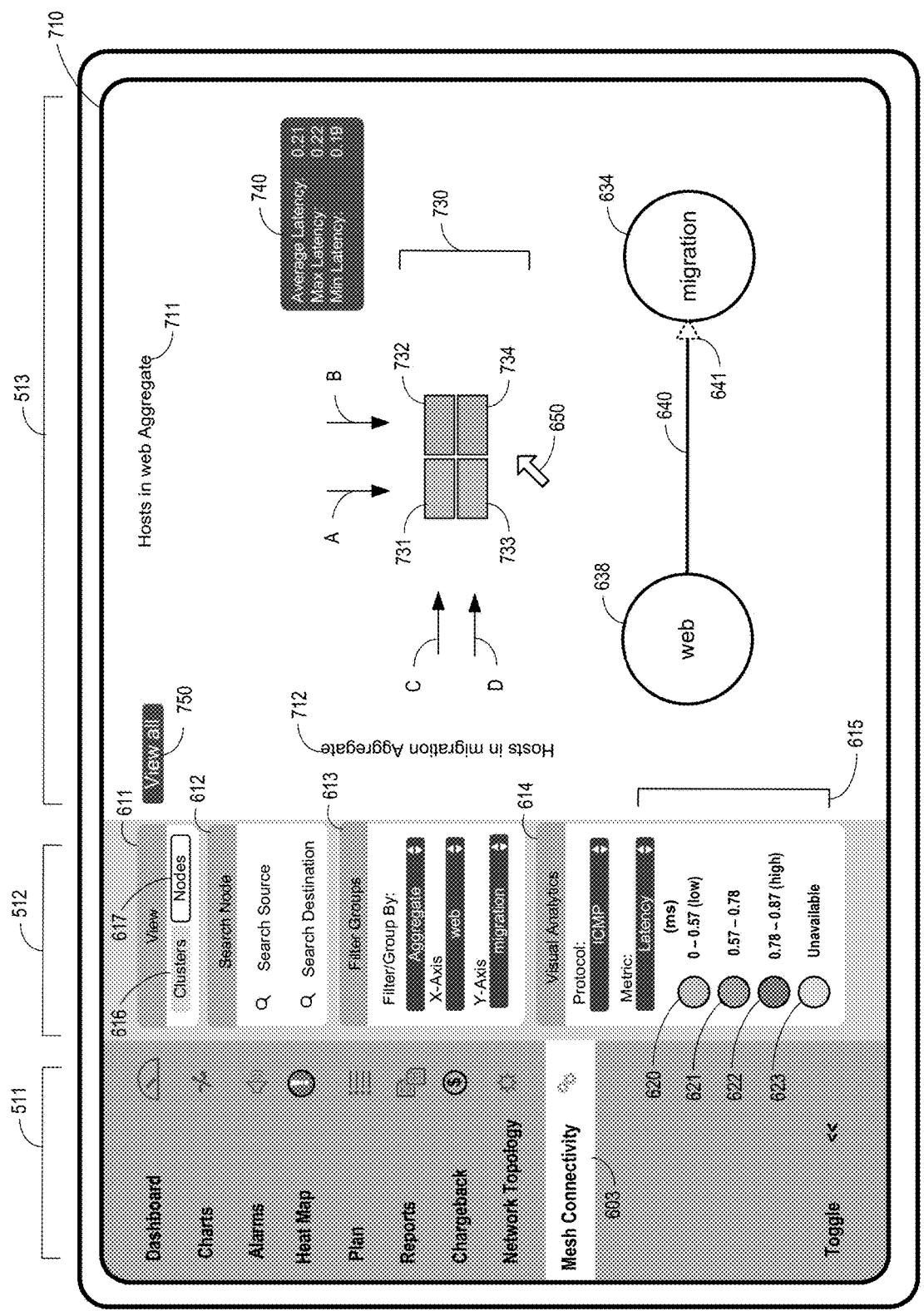
FIG. 7 illustrates an example graphical user interface output by a computing device that presents a detailed view of aggregates, in accordance with one or more aspects of the present disclosure.

FIG. 7 illustrates an example graphical user interface 710 output by a computing device that presents a detailed view of aggregates configured for a computer network in accordance with one or more aspects of the present disclosure. The illustration of user interface 710 includes features that remain the same as or similar to corresponding features illustrated and described with respect to user interface 510 in FIG. 5 and user interface 610 in FIG. 6. These corresponding features as shown in FIG. 7 in conjunction with user interface 710 retain the same reference numbers, and may provide the same or similar features and perform the same or similar functions as were described above with respect to user interfaces 510 and 610. Such corresponding features may include application selection area 511, view control area 512, and main display area 513. Examples of differences between user interface 510 of FIG. 5, user interface 610 of FIG. 6, and user interface 710 as illustrated and described with respect to FIG. 7 are further described below.

The main display area 513 of user interface 710 as shown in FIG. 7 may be generated in response to a user input selecting the "Nodes" button 617 in the "View" box 611, and specifying the aggregates to be displayed by providing inputs to the "X-axis" and the "Y-axis" menu selections made using the pull-down menus in the "Filter Groups" box 613. For example, user inputs may be received indicative of a selection of a particular aggregate, for example the "web" aggregate, in the "X-axis" menu of the "Filter Groups" box 613, along with user inputs indicative of a selection of another and different aggregate, for example the "migration" aggregate 634, in the "Y-axis" menu of the Filter Groups" box 613. As shown in user interface 710, the "X-axis" menu displays the word "web" and the "Y-axis" menu displays the work "migration" in the pull-down menus, respectively, included in the "Filter Groups" box 613. These selections may result in a display as shown in the main display area 513 of user interface 710. In other examples, main display area 513 of user interface 710 as shown in FIG. 7 may be generated in response to a user input selecting the first graphical indicator 641 in the user interface 610 illustrated in FIG. 6, for example by using cursor 650 to select (e.g., click on) the area of the user interface 610 of FIG. 6 that is displaying the first graphical indicator 641.

As shown in FIG. 7, user interface 710 includes a graphic depiction of a circle representing the "web" aggregate 638 coupled by line 640 to a circle representing the "migration" aggregate 634. The graphical representation of aggregate 638 and aggregate 634 coupled by line 640 may be positioned across a lower portion, for example within a lower third of main display area 513, with line 640 extending in a horizontal orientation between the circles representing aggregates 638 and 634. As shown in FIG. 7, the circle representing the "web" aggregate 638 is positioned toward the lower left-hand side of the main display area 513, with the circle representing the "migration" aggregate 634 is positioned toward the lower right-hand side of the main display area. The first graphical indicator 641 may be illustrated as part of user interface 710, and if illustrated, may be positioned at a first end of line 640 proximate to the circle representing the "migration" aggregate 634. In some examples of user interface 710, the first indictor 641 may be rendered, for example using a particular color, that is indicative of the overall status determined for probes issued by the agents of the "web" aggregate 638 to the agents of the "migration" aggregate 634. In other examples, line 640 may be rendered, for example using a particular color, that is indicative of the overall status determined for probes issued by the agents of the "web" aggregate 638 to the agents of the "migration" aggregate 634. The layout of the circles representing the aggregates coupled by the horizontal line may be referred to as a "dumbbell configuration," in view of a shape similar to an exercise dumbbell.

User interface 710 also includes a group of status blocks 731-734 positioned above the graphical depictions of aggregates 638, 634 and line 640, the status blocks generally indicated by bracket 730 (also referred to as "status blocks 730"). Status blocks 730 may be positioned approximately in the middle portion of main display area 513. The individual status blocks 731-734 may each comprise a rectangular shape, and having each rectangular shape arranged in a grid pattern including two columns and two rows of status blocks. The number of columns included in the grid may correspond to the number of agents included in the source aggregate that is issuing communication probes to other (destination) agents, and the number of rows included in the grid may correspond to the number of destination agents to which communication probes are being sent to in a different aggregate.

Using user interface 710 as shown in FIG. 7 as an illustrative example, the agents of the "web" aggregate 638 has been selected to be the source of the communication probes, and the "migration" aggregate 634 has been selected to be the aggregate where the destination agent(s) for the communication probes have been grouped. Again for illustrative purposes, the "web" aggregate 638 includes two agents "A" and "B" that have issued communication probes to the two agents "C" and "D" grouped in the "migration" aggregate 634. Because the "web" aggregate 638 includes two agents issuing communication probes, status blocks 730 includes two columns, the left-side column indicated by arrow "A," and the right-side column indicated by the arrow "B". In addition, because the "migration" aggregate 634 includes two destination agents for the communication probes being issued by agents "A" and "B," status blocks 730 includes two rows, the upper row indicated by arrow "C," and the lower row indicated by arrow "D." Each of the individual status blocks 731-734 may be rendered, respectively, for example using a particular color, which is indicative of a status associated with the issuance of communication probe(s) from one particular agent in the "web" aggregate 638 to one particular destination agent in the "migration" aggregate 634.

In the example user interface 710, status block 731 may be rendered in a particular color, for example in red, yellow, or green, to represent a status measured or determined for a selected metric associated with the communication probe(s) issued by agent "A" of the "web" aggregate 638 to agent "C" of the "migration" aggregate 634 as the destination agent. As shown in user interface 710, the selected metric is the "Latency" value, measured in milliseconds, as illustrated by the "Metric" menu in the "Visual Analytics" box 614 shown in the view control area 512. The "Visual Analytics" box 614 also includes a legend, generally indicated by bracket 615 (referred to as "legend 615"), which includes a key showing colored circles 620, 621, 622, and 623 representing the colors used to depict various statuses determined for each of the status blocks 730.

For example, in legend 615 a first circle 620 may be green in color, and indicates a status for latency associated with the issuance of a communication probe having a measured value between zero and 0.57 milliseconds. A second circle 621 may be yellow in color, and indicates a status for latency associated with the issuance of communication probes having a measured values between 0.57 and 0.78 milliseconds. A third circle 622 may be red in color, and indicated a status for latency associated with the issuance of communication probes having a measured value of 0.78 to 0.87 milliseconds. In some examples, a fourth circle 623 may be a color, such as grey, that indicates an "unavailable" status associated with the latency of communication probes. The status of "unavailable" in some examples may indicate a latency value that exceeds 0.87 milliseconds for an issued communication probe, and/or that the issued probes was never responded to by the destination agent.

The above described example of legend 615 and the use of colors as the status indicators for the latency is intended to be a non-limiting example, and examples of user interfaces as described in this disclosure are not limited to use of color or to any particular range of values associates with statuses that may be determined for a particular metric. In some example, another form of visual indication, such as different patterns (e.g., cross-hatch, vertical, horizontal, and diagonal lines) may be used instead of or in conjunction with color to represent a particular status associated with a selected metric. In addition, different metrics may have a different number, for example, two, three, four or more different statuses that may be associated with a measured value for the metric. As such, legend 615 may change from the illustrative example shown by user interface 710 to display a number of different statuses and associated text explaining a range or ranges of values associated with the different statuses based on the selected metric being displayed by the status indication being provided by the user interface. In some examples, the number and range of values associated with a measured or determined value for a metric may be predefined as part of the policy being used to generate a user display such as user interface 710 that provides a visual indication of one or more statuses associated with the communication probes issued within a computer network.

Returning to the example of individual status blocks, status block 731 may be rendered in one of the colors depicted by legend 615 based for example on the latest measured latency time for a communication probe issued by agent "A" to agent "C" as the destination for the probe. The color of status block 731 may be updated to represent the latest latency value measured from the last probe issued by agent "A" to agent "C,' and thus is updated in real-time or near real-time depict the latest status associated with latency for these communication probes. In other examples, an average value, for example over some pre-determined number of the most recently issued probes issued by agent "A" to agent "C," may be calculated a value used to determine the current status for the latency metric associated probes issued by agent "A" to agent "C" and thus to determine the color to be used to render graphic block 731 in user interface 710.

In a similar manner, a status may be determined for each of status blocks 732, 733, and 734, and these blocks may be rendered, respectively, in user interface 710 to depict the current status determined for each of these blocks. For example, a current status related to latency may be determined for communication probe(s) issued by agent "B" to agent "C," and block 732, which is positioned in column "B" and row "C," may be rendered for example in a color indicative of the determined status for these probes. A current status related to latency may be determined for communication probe(s) issued by agent "A" to agent "D," and block 733, which is positioned in column "A" and row "D," may be rendered, for example in a color, which indicates the determined status for these particular probe(s). A current status related to latency may be determined for communication probe(s) issued by agent "B" to agent "D," and block 734, which is positioned in column "B" and row "D," may be rendered, for example in a color, which indicates the determined status for these particular probe(s).

Thus, a status for each set of communication probes being issued by the agents in a particular aggregate, such as "web" aggregate 638, to each of the individual agents grouped in another aggregate, such as "migration" aggregate 634, may be displayed at one time in a compact format provided by the status blocks 730. The number of columns and the number of rows provide within the status block 730 may be varied based on the selection of a new source aggregate and/or a new destination aggregate for display as part of user interface 710. For example, if a new and different aggregate is selected for display as the aggregate having the source agents issuing the communication probes, example using the "Search Source" field in the "Search Node" box 612, a number of columns included in status blocks 720 may be reset based on the number of agents located in the newly selected aggregate that is/are issuing communication probes. In another example, a new and different aggregate may be selected for display as the aggregate having the destination nodes for receiving the communication probes, for example using the "Search Destination" field in the "Search Node" box 612. A number of rows included in the status blocks 720 may be reset based on the number of destination agents located in the newly selected aggregate that includes the destination agents. The status visually depicted by the reconfigured status blocks 730 are updated based on the determined status values for the selected metric measured or determined for the newly selected source and/or destination agents. The selection of a new source and/or destination agent may also be made in some examples by providing inputs to the "X-axis" and/or the "Y-axis" menus provided in the "Filter Groups" box 613. As such, user interface 710 may provide a quick and convenient way to visually display the status associated with a selected metric for all agents issuing communication probes between any two aggregates within a computer network, and to quickly and conveniently move between different source aggregates and/or different destination aggregates.

User interface 710 may provide one or more additional forms of graphical information that may be helpful to a user viewing the user interface. For example, user interface 710 may include headers 711 and 712. Header 711 may include text extending in a horizontal orientation and above the position of the status blocks within main display area 513. Header 711 may include an indication of the agent(s) included in a particular aggregate that includes the agents operating as the source of the communication probe(s) for which statuses are being displayed as part of user interface 710. By way of example, header 711 as shown in user interface 710 includes text "Hosts in web Aggregate," indicating that the columns included as status blocks 730 represent agents within the "web" aggregate of the computer network. Header 712 may include text extending in a vertical orientation and located to the left-hand side of the position of the status blocks 730 within main display area 513. Header 712 may include an indication of the agents included in a particular aggregate that are the destination agents for the communication probes being issued by the agents represented by the columns of the status blocks 730. By way of example, header 712 as shown in user interface 710 includes text stating, "Hosts in migration Aggregate," indicating that the rows included as status blocks 730 represent agents within the "migration" aggregate of the computer network. Each of these header may be automatically updated when a new source aggregate and/or a new destination aggregate is selected for display as part of user interface 710.

In other examples, user interface 710 includes a general status box 740. General status box 740 is not limited to having any particular format, and may include any type of text and/or graphical elements, such as graphical symbols, that may appear somewhere in the main display area 513. As shown in FIG. 7, general status box 740 includes a listing of text and associated numerical values, including text related to "Average latency," "Max Latency," and "Min Latency." Each of these text listings is associated with a numerical value that may be a measured or determined value associated with the text, respectively. For example, as illustrated the selected metric associated with user interface 710 is "latency." The information provided in the general status box 740 is associated with an average value, a maximum value, and a minimum value measured or determined for latency associated with the communication probes being issued by agents "A" and "B" to destination agents "C" and "D." The average latency value of 0.21 illustrated in box 740 may be the average latency value calculated based on latency values associated with each of status blocks 731-734. The maximum latency value of 0.22 illustrated in general status box 740 may be the highest measured latency for any of the communication probes associated with one of status block 731-734, and a value of 0.19 illustrated in the general status box 740 may be the lowest measured latency value for any of the communication probes associated with one of the status blacks 731-734 compared to the other latency values for blocks 731-734.

Different levels of information, and information related to different aggregates at a same level of detail within the computer network, may be made in response to user inputs to change user interface 710 to a different user interface displaying a different graphical display. For example, a user input indicating a selection of the "Cluster" button 616 may cause the user interface being provided by dashboard 203 to return to a view like user interface 610 shown in FIG. 6 and displaying all of the aggregates of a computer network interconnected with graphical lines and status indications, such as graphical indicator 641, 642, 643, and 644 as shown in FIG. 6. In some examples, a cluster and an aggregate may refer to a same entity, e.g., a grouping a servers. A user input (e.g., via cursor 650) indicating a selection of any one of the graphical status indicators may return the user interface to a display similar to user interface 710 as shown in FIG. 7, but with the aggregates displayed in the "dumbbell" configuration and the associated status blocks for the source and destination aggregates associated with the selected graphical status indicator being displayed. As such, a user of the graphical user interfaces as described herein may toggle back and forth between a "Clusters view" similar to that shown as interface 610 in FIG. 6 and a user interface including a "dumbbell" configuration and status blocks showing more details related to agents grouped into a particular pair of source/destination aggregates.

In another example, a user input indicating a selection of the "View all" button 750 in user interface 710 as shown in FIG. 7 may cause the user interface to be rendered to provide a grid of status blocks representing a status for each agent issuing communication probes to any other agent in the computer network. An example of such a user interface is further illustrated and described below with resect to FIGS. 14-17.

In a further example, user input indicating a selection of any of the status blocks 731-733 included in status blocks 730 of user interface 710 as shown in FIG. 7, or any status block displayed as part of a user interface for any of the agents included in the computer network, may result in additional details being displayed with respect to the communication probes and/or metrics and status information associated with the selected status block. Examples of these additional details being provided as part of a user interface are further illustrated and described below with respect to FIGS. 8, 10, 11, 13 and 15.

Figure 8:
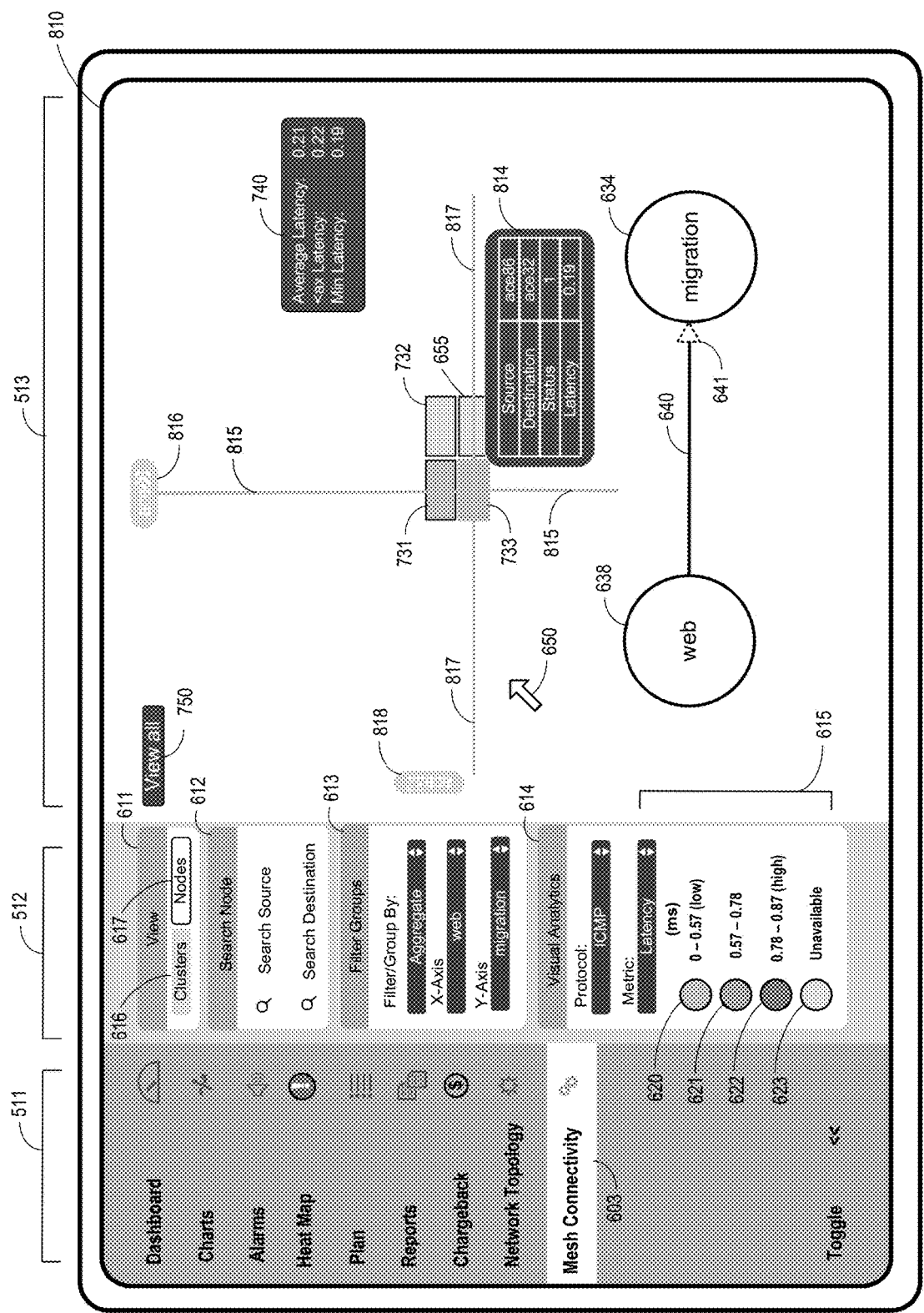
FIG. 8 illustrates an example graphical user interface output by a computing device that presents a detailed view of aggregates, in accordance with one or more aspects of the present disclosure.

FIG. 8 illustrates an example graphical user interface 810 output by a computing device that presents a detailed view of aggregates configured for a computer in accordance with one or more aspects of the present disclosure. The illustration of user interface 810 includes features that remain the same as or similar to corresponding features illustrated and described with respect to user interface 510 in FIG. 5 and user interface 610 in FIG. 6. These corresponding features as shown in FIG. 8 in conjunction with user interface 810 retain the same reference numbers, and may provide the same or similar features and may perform the same or similar functions as were described above with respect to user interfaces 510 and 610. Such corresponding features may include application selection area 511, view control area 512, and main display area 513. Examples of differences between user interface 510 of FIG. 5, user interface 610 of FIG. 6, and user interface 810 are further described below. In addition, features such as the general status box 740, the "View all" button 750, and status blocks 731-734 as illustrated and described with respect to user interface 710 and FIG. 7 may also be provided as part of user interface 810, and may provide the same or similar features and perform the same or similar functions in user interface 810 as described with respect to user interface 710.

As shown in user interface 810 of FIG. 8, status block 733 is highlighted for example after being selected based on user inputs. Status block 733 may be selected based on user inputs made by positioning cursor 650 so that the cursor either hovers over status block 733 for some amount of time, such as one second, or is positioned over status block 733 within user interface 810, and a selection input, such as an input from a computer mouse button, is received. Once selected, status block 733 may be highlighted for example by displaying a heavier and/or a different color line extending around the perimeter of the block. In addition or in the alternative, extension lines, such as extension lines 815 and 817, may be generated that extend in vertical and horizontal directions, respectively, from status block 733. The extension lines may be a particular color, such as a blue color, that further distinguish the extension lines 815 and 817 from the other objects being displayed in main display area 513 of user interface 810.

Extension line 815 may extend away from block 733 in at least one direction and terminate in a text tag 816. Text tag 816 may include text displayed within the perimeter of a shape, such as an oval as shown in user interface 810. Text tag 816 may display the name of an agent associated with column where status block 733 is located. For example, as shown in user interface 810, text tag 816 includes the text "ace86," indicating that the policy agent associated with the column where status block 733 is located is associated with the "ace86" policy agent located in the "web" aggregate 638. Similarly, extension line 817 extends away from status block 733, but in a horizontal direction. Text tag 818 is located near a termination point of extension line 817. Text tag 818 may include text displayed within the perimeter of a shape, such as an oval as shown in user interface 810. Text tag 818 may display the name of a policy agent associated with the row where status block 733 is located. For example, as shown in user interface 810, text tag 818 includes the text "ace32," indicating that the policy agent associated with the row where status block 733 is located is associated with the "ace32" policy agent located in the "migration" aggregate 634. The shape used for text tags 816 and 818 are not limited to any particular shape or to including an oval shape, and may be other shapes, such as rectangles, circles, triangles, or squares. Further the type of line and/or the color used to display extension lines 815 and 817 and the outlining used to highlight status block 733 are not limited to a particular type of line or to a particular color of line, and may include other types of lines, such as dashed or centerline configuration, in one or more colors including black, that may be used to depict the extensions lines and text tags as depicted by user interface 810.

In addition to or instead of generating the extension lines and text tags, selection of status block 733 may cause a pop-up box 814 to be displayed as part of user interface 810. As shown in FIG. 8, pop-up box 814 displays a table with data enclosed within the boarder of the pop-up box. In this illustrative example, pop-up box 814 may include a row labeled "Source," a row labeled "Destination," a row labeled "Status," and a row labeled "Latency." An associated entry for the "Source" row of pop-up box 814 indicates that the source agent issuing probes used in determining a status associated with a selected metric being depicted for status block 733 as part of user interface 810 is the agent named "ace86," and any entry for the "Destination" row of pop-up box 814 indicates that "ace 32, was the destination agent, which also corresponds to the labels displayed in text tag 816 and 818, respectively. The "status" row of pop-up box 814 indicates a status rating or ranking having a value of "1." The determined latency, which is the selected metric being used in user interface 810 to determine a status associated with communication probes issued by agent "ace86" and directed to agent "ace32," has a value of 0.19 (milliseconds) as indicated in the "Latency" row of pop-up box 814. Similar but corresponding information, including extension lines and a pop-up text block that includes information related to any selected one of status blocks 731-734 may be displayed when the respective block is selected within the main display area 513.

As such, user interface 810 is configured to quickly and efficiency display more detailed level information related to any of the status blocks being displayed within the main display area 513 for a status associated with and/or measured values for a selected metric for a selected pair of source/destination aggregates when status blocks 731-734 or similar are provide as part of a graphical user interface.

Figure 9:
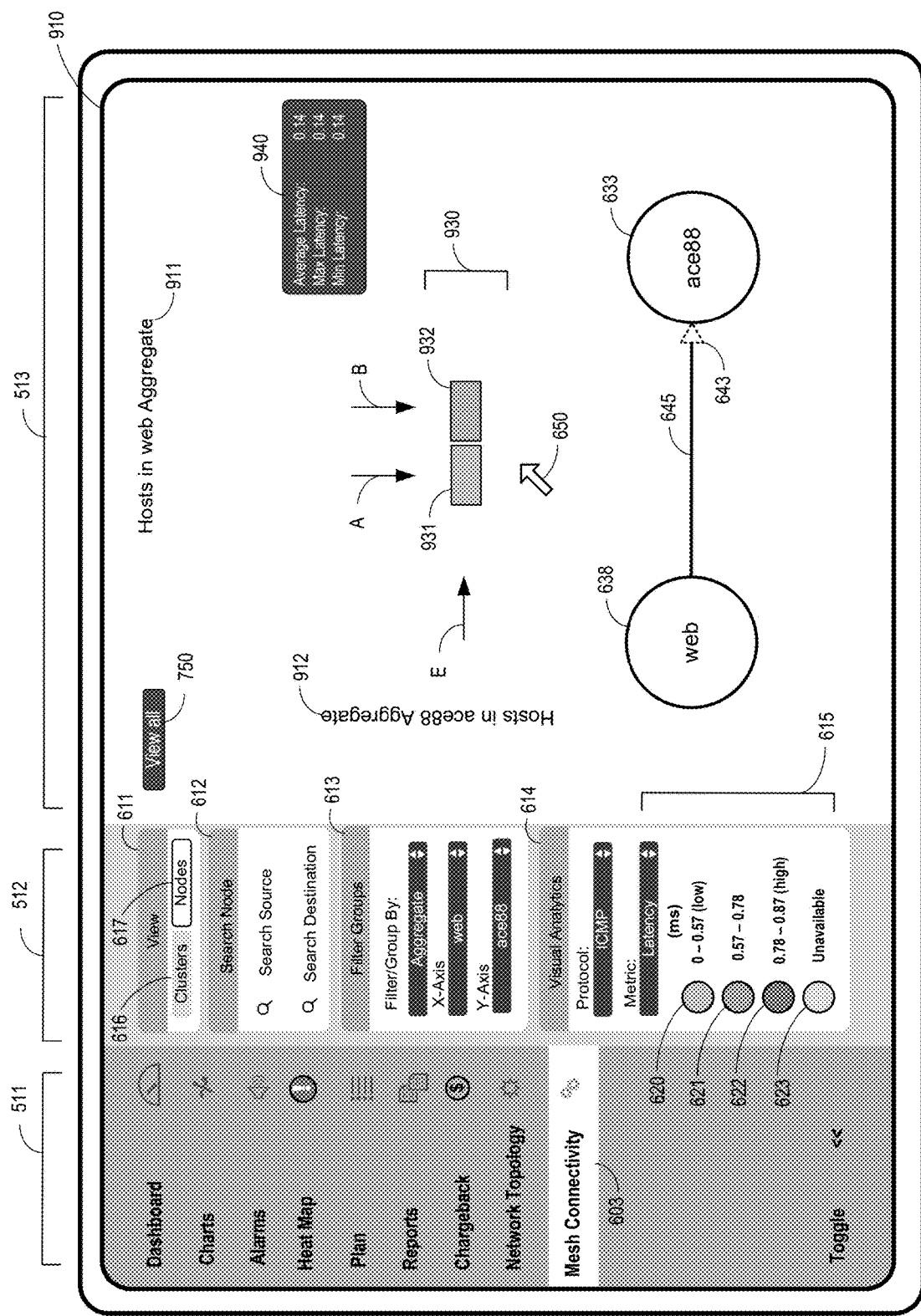
FIG. 9 illustrates an example graphical user interface output by a computing device that presents a detailed view of aggregates, in accordance with one or more aspects of the present disclosure.

FIG. 9 illustrates an example graphical user interface 910 output by a computing device that presents a detailed view of aggregates configured for a computer network in accordance with one or more aspects of the present disclosure. The illustration of user interface 910 includes features that remain the same as or similar to corresponding features illustrated and described with respect to user interface 510 in FIG. 5 and user interface 610 in FIG. 6. These corresponding features as shown in FIG. 9 in conjunction with user interface 910 retain the same reference numbers, and may provide the same or similar features and may perform the same or similar functions as were described above with respect to user interfaces 510 and 610. Such corresponding features may include application selection area 511, view control area 512, and main display area 513. Examples of differences between user interface 510 of FIG. 5, user interface 610 of FIG. 6, and user interface 910 as illustrated and described with respect to FIG. 9 are further described below. In addition, features such as the "View all" button 750 as illustrated and described with respect to user interface 710 and FIG. 7 may also be provided as part of user interface 910, and may provide the same or similar features and perform the same or similar functions in user interface 910 as described with respect to user interface 710.

User interface 910 as shown in FIG. 9 includes a "dumbbell" configuration in the lower portion of main display area 513 that includes a graphic depiction of a circle representing the "web" aggregate 638 coupled by line 645 to a circle representing the "ace88" aggregate 633. The graphical representation of aggregate 638 and aggregate 633 coupled by line 645 may be positioned across a lower portion, for example within a lower third of main display area 513, with line 645 extending in a horizontal orientation between the circles representing aggregates 638 and 633. As shown in FIG. 9, the circle representing the "web" aggregate 638 is positioned toward the lower left-hand side of the main display area 513, and represents the aggregate having the agents that are the source for the communication probes being graphically represented by user interface 910. The circle representing the "ace88" aggregate 633 is positioned toward the lower right-hand side of the main display area 513, and represents the aggregate having the agent (e.g., a single agent "E" in this example) that is the destination for the communication probes being graphically represented by user interface 910. The third graphical indicator 643 may be illustrated as part of user interface 910, and if illustrated, may be positioned at a first end of line 645 proximate to the circle representing "ace88" aggregate 633.

User interface 910 also includes a group of status blocks 931-932 positioned above the graphical depictions of aggregates 638, 633 and line 645, the status blocks generally indicated by bracket 930 (also referred to as "status blocks 930"). Status blocks 930 may be positioned approximately in the middle portion of main display area 513. The individual status blocks 931-932 may each comprise a rectangular shape, and having each rectangular shape arranged in a grid pattern including two columns and one row of status blocks. The number of columns included in the grid may correspond to the number of agents included in the source aggregate that is issuing communication probes to other (destination) agent(s), and the number of rows included in the grid may correspond to the number of destination agent(s) to which communication probes are being sent to and that are located in a different aggregate. Continuing with the example configuration where the "web" aggregate 638 includes two agents "A" and "B" and the "ace88" aggregate includes a single agent "E," status blocks 930 includes two columns indicated by arrow "A" and arrow "B," respectively, and a single row indicated by arrow "E."

In a similar manner to that describe above with respect to user interface 710, user interface 910 as shown in FIG. 9 may provide an indication of a status determined for each of status blocks 931 and 932. These status blocks may be rendered, respectively, in user interface 910 to depict the current status for the selected metric, for example latency, determined on an individual basis for each of status blocks 931 and 931. The indication of that determined status may for example be shown by the color used to render the status blocks in the display of user interface 910, and which color is keyed to the legend 615 provided in the view control area 512. For example, a current status related to latency may be determined for communication probe(s) issued by agent "A" to agent "E," at status block 931, which is positioned in column "A" and in row "E" may be rendered for example in a color indicative of the determined status for these particular probes. A current status related to latency may also be determined for communication probe(s) issued by agent "B" to agent "E," and status block 932, which is positioned in column "B" and row "E," may be rendered, for example in a color, which indicates the determined status for these particular probe(s). The determined statuses displayed by user interface 910 for each of the status blocks 930 may be based on the latest set of probes sent from the agents of the "web" aggregate 638, or may be based on some other calculated metric, such as an average value for a number of previously issued communication probes issued by 'web' aggregate 638 to the agent of the "ace88" aggregate.

Additional information may be provided in the main display area 513 of user interface 910. For example, a header 911 may be provide that names the aggregate that is the source for the communication probes, and thus determines the number of columns included in status blocks 930. Header 912 may provide the name of the aggregate where the destination agent or agents for the communication probes being depicted by user interface 910 are grouped. User interface 910 may include a general status box 940 similar to the general status box 740 described above with respect to user interface 710 and FIG. 7. General status box 940 of FIG. 9 may provide any of the types of information described above with respect to general status box 740, but with numerical values representing the measured or determined values for one or more metrics, such as latency, associated with the communication probes being issued by the source aggregate to the agents of the destination aggregate being represented in user interface 910. As shown in FIG. 9, general status box 940 includes a listing of text and associated numerical values, including text related to "Average latency," "Max Latency," and "Min Latency" for the communication probes issued by the "web" aggregate 638 to the agent of the "ace88" aggregate 633.

User interface 910 may be generated for example in response to an indication of the selection of the third graphical status indicator 643 from a "cluster view" such as provided by user interface 610 of FIG. 6. In other examples, user interface 910 as shown in FIG. 9 may be generated in response to inputs to the "Filter Groups" box 613 indicated that the "web" aggregate is to be displayed as the source aggregate and the "ace88" aggregate is to be displayed as the destination aggregate.

User interface 910 may also be configured to allow additional information related to the status associated with any of the status blocks included in the display of status blocks 930 in a manner similar to that described above with respect to FIG. 8 and user interfaces 710 and 810. Examples of these additional details being provided as part of a user interface are further illustrated and described below with respect to FIGS. 10 and 11.

Figure 10:
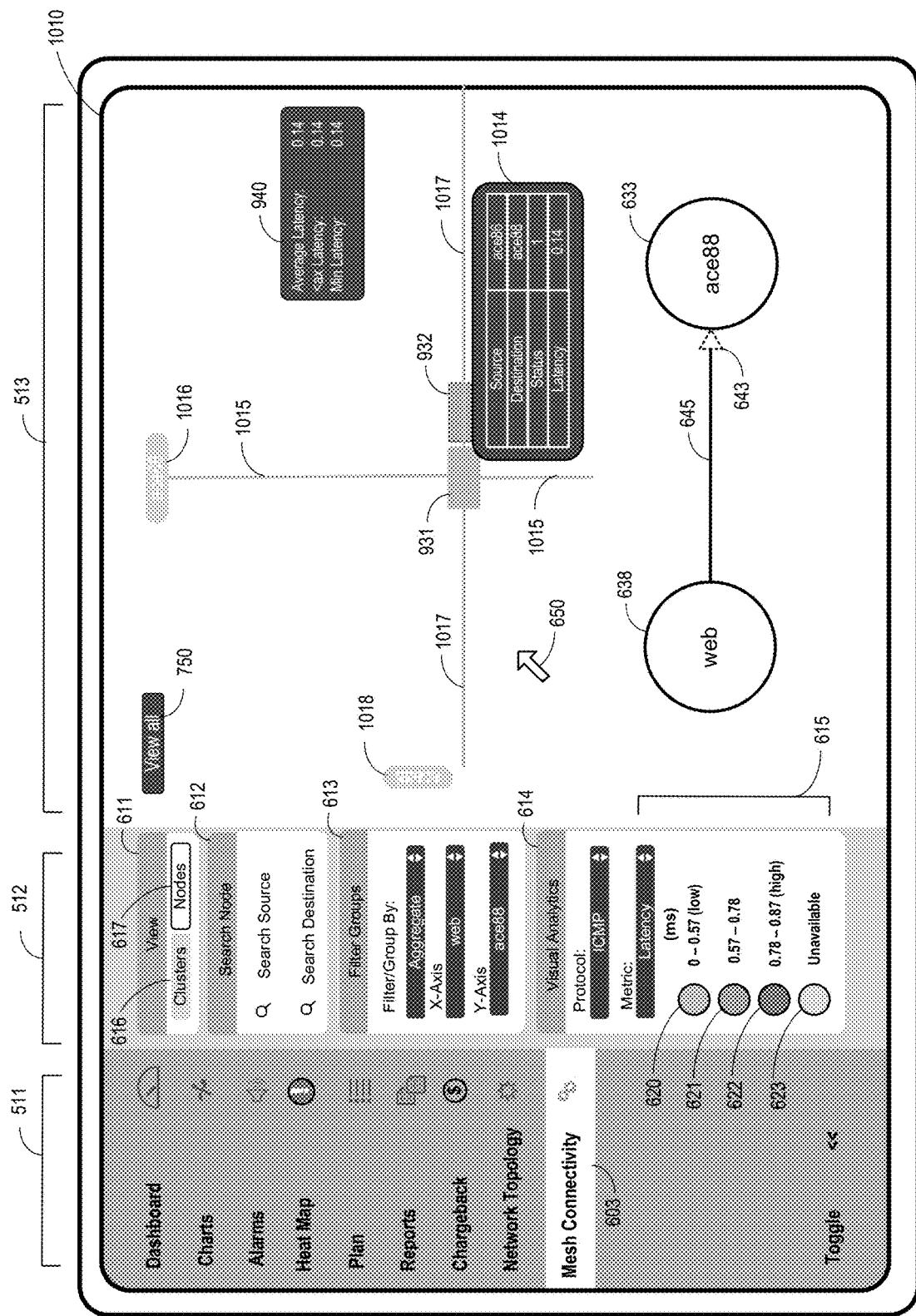
FIG. 10 illustrates an example graphical user interface output by a computing device that presents a detailed view of aggregates, in accordance with one or more aspects of the present disclosure.

FIG. 10 illustrates an example graphical user interface 1010 output by a computing device that presents a detailed view of aggregates configured for a computer network in accordance with one or more aspects of the present disclosure. User interface 1010 may be generated by dashboard 203 as a result of receiving an indication of the selection of status block 931 in user interface 910, for example based on user inputs provided through manipulation of cursor 650.

When status block 931 is selected, the status block may be highlighted in user interface 1010 for example by displaying a heavier and/or a different color line extending around the perimeter of the block. In addition or in the alternative, extension lines, such as extension lines 1015 and 1017, may be generated that extend in vertical and horizontal directions, respectively, from status block 931. The extension lines may be a particular color, such as a blue color, that further distinguish the extension lines 1015 and 1017 from the other objects being displayed in main display area 513 of user interface 1010.

Extension line 1015 may extend away from status block 931 in at least one direction and terminate in a text tag 1016. Text tag 1016 may include text displayed within the perimeter of a shape indicative of a name of the agent associated with the column where status block 931 is located, for example "ace86" as illustrated in FIG. 10. Similarly, extension line 1017 extends away from status block 931, but in a horizontal direction. Text tag 1018 is located near a termination point of extension line 1017, and may include text displayed within the perimeter of a shape indicative of the name of a policy agent associated with the row where status block 931 is located, for example "ace88" as illustrated in FIG. 10. The shapes, colors and format of the extension lines and text tags are not limited to the particular example illustrated for user interface 1010, and may be formed using other colors and/or other shapes for the extension lines and or text tags provide by examples of user interface 1010.

In addition to or instead of generating the extension lines and text tags, selection of block 931 may cause a pop-up box 1014 to also be displayed as part of user interface 1010. As shown in FIG. 10, pop-up box 1014 includes a display of a table with data enclosed within the boarder of the pop-up box. In this illustrative example, pop-up box 1014 may include a row labeled "Source," a row labeled "Destination," a row labeled "Status," and a row labeled "Latency." An associated entry for the "Source" row indicates that the source agent issuing probes used in determining a status being depicted for status block 931 as part of user interface 1010 is the agent named "ace86," and an associated entry for the "Destination" row indicates that the destination agent is "ace88," which corresponds to the labels displayed in text tag 1016 and 1018, respectively. The "status" row of pop-up box 1014 indicates a status rating or ranking having a value of "1."

The determined latency, which is the selected metric being used in user interface 1010 to determine a status associated with communication probes issued from agent "ace86" and directed to agent "ace88," has a value of 0.14 (milliseconds) as indicated in the "Latency" row of pop-up box 1014. Similar but corresponding information, including extension lines and a pop-up text block that includes information related to any selected one of status blocks 931-932 may be displayed with the respective status block selected within the main display area 513. As such, user interface 1010 is configured to quickly and efficiency display more detailed level information related to any of the status blocks being displayed within the main display area 513 for a selected metric and a selected pair of source/destination aggregates. User interface 1010, when generated by dashboard 203, provides additional details and information related to the one or more selected metrics associated with communitive probes issued from a source agent to a destination agent, in this example communication probe(s) issued by agent "ace86" and directed to agent "ace88," for example where the number of agents issuing the probes is different (e.g., larger than) the number of destination agent the probes are being directed to.

Figure 11:
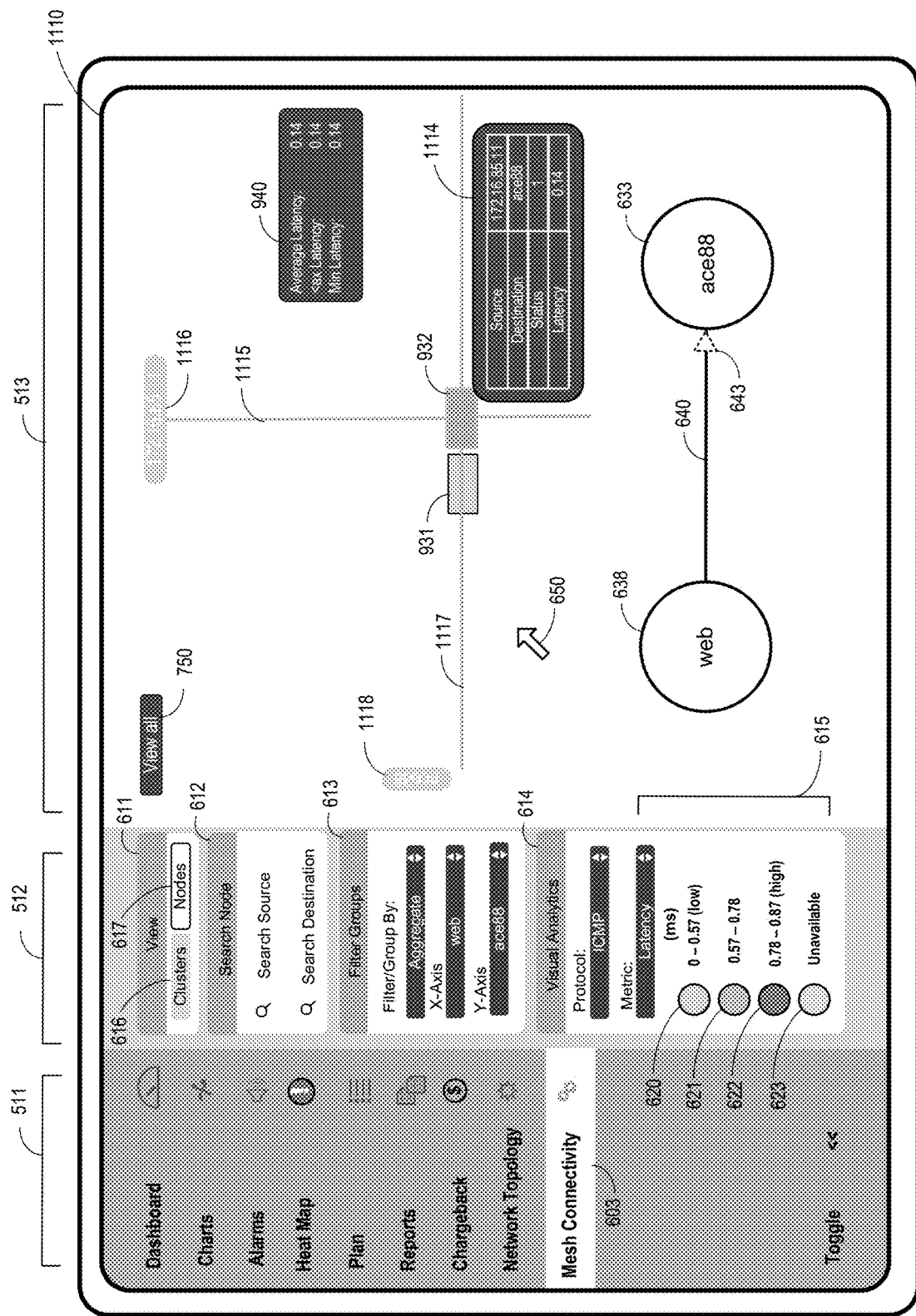
FIG. 11 illustrates another example graphical user interface output by a computing device that presents a detailed view of aggregates, in accordance with one or more aspects of the present disclosure.

FIG. 11 illustrates another example graphical user interface 1110 output by a computing device that presents a detailed view of aggregates configured for a computer network in accordance with one or more aspects of the present disclosure. User interface 1101 may be generated by dashboard 203 as a result of receiving an indication of the selection of status block 932 in user interface 910, for example based on user inputs provided through manipulation of cursor 650. In a manner similar to that describe above with respect to a selection of status block 931 as illustrated in user interface 1010 in FIG. 10, when status block 932 is selected, the status block may be highlighted as shown in user interface 1110 in FIG. 11. Highlighting may include any of the techniques described above for highlighting a selected status block for example by displaying a heavier and/or a different color line extending around the perimeter of the block. In addition or in the alternative, extension lines, such as extension lines 1115 and 1117, may be generated that extend in vertical and horizonal directions, respectively, from status block 932.

The extension lines may be a particular color, such as a blue color, that further distinguish the extension lines 1115 and 1117 from the other objects being displayed in main display area 513 of user interface 1110. The extension lines may terminate in text tags, 1116, 1118, respectively. Text tag 1116 may include text displayed within the perimeter of a shape indicative of a name of the agent associated with the column where status block 932 is located, for example "172.16.85.11" as illustrated in FIG. 11. Similarly, extension line 1117 extends away from block 932, but in a horizontal direction. Text tag 1118 may include text displayed within the perimeter of a shape indicative of the name of a policy agent associated with the row where status block 932 is located, for example "ace88" as illustrated in FIG. 11. The shapes, colors and format of the extension lines and text tags are not limited to the particular examples illustrated and described above for user interface 1110, and may be formed using other colors and/or other shapes for the extension lines and or text tags provide by examples of user interface 1110.

User interface 1110 may also include a display of pop-up box 1114. As shown in FIG. 11, pop-up box 1114 includes a display of a table with data enclosed within the boarder of the pop-up box. In this illustrative example, pop-up box 1114 may be formatted using any of the formats, or similar formats and may include any of the types of information described above with respect to pop-up box 1014 and user interface 101, but including information specifically related to the agents and the statuses associated with the communication probes being issues by and directed to the agents associated with status block 932. User interface 1110, when generated by dashboard 203, provides additional details and information to the one or more selected metrics associated with commutative probes issued from a source agent to a destination agent, in this example communication probe(s) issued by agent "172.16.85.11" and directed to agent "ace88."

Figure 12:
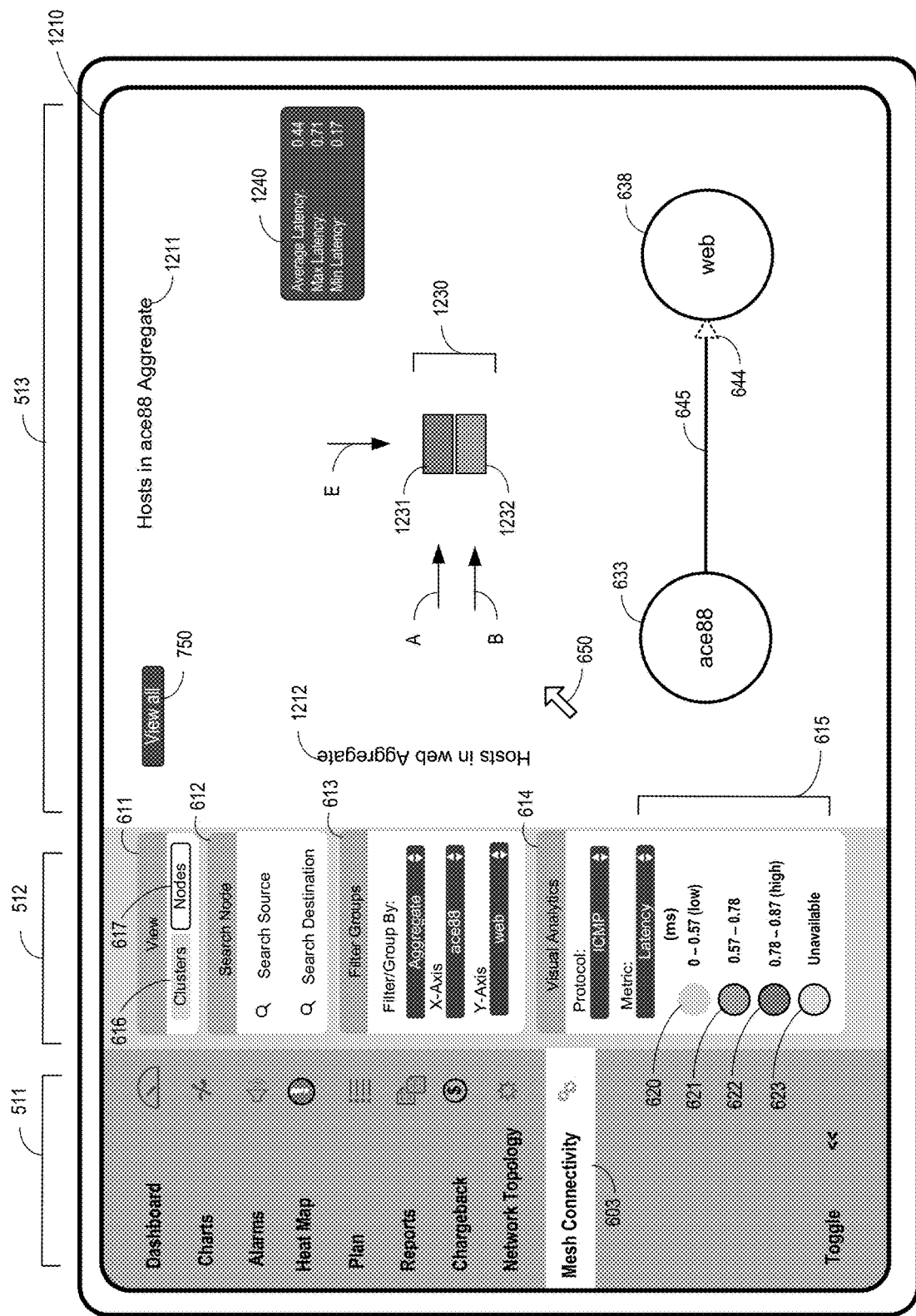
FIG. 12 illustrates an example graphical user interface output by a computing device that presents a detailed view of aggregates, in accordance with one or more aspects of the present disclosure.

FIG. 12 illustrates an example graphical user interface 1210 output by a computing device that presents a detailed view of aggregates configured for a computer network in accordance with one or more aspects of the present disclosure. The illustration of user interface 1210 includes features that remain the same as or similar to corresponding features illustrated and described with respect to user interface 510 in FIG. 5 and user interface 610 in FIG. 6. These corresponding features as shown in FIG. 12 in conjunction with user interface 1210 retain the same reference numbers, and may provide the same or similar features and may perform the same or similar functions as were described above with respect to user interfaces 510 and 610. Such corresponding features may include application selection area 511, view control area 512, and main display area 513. Examples of differences between user interface 510 of FIG. 5, user interface 610 of FIG. 6, and user interface 1210 as illustrated and described with respect to FIG. 12 are further described below. In addition, features such as the "View all" button 750 as illustrated and described with respect to user interface 710 and FIG. 7 may also be provided as part of user interface 1210, and may provide the same or similar features and perform the same or similar functions in user interface 1210 as described with respect to user interface 710.

User interface 1210 as shown in FIG. 12 includes a "dumbbell" configuration and a set of status blocks 1230 along with additional features arranged in a configuration similar to that illustrated and described above with respect to user interface 910 and FIG. 9. For example, user interface 1210 as shown in FIG. 12 includes a "dumbbell" configuration in the lower portion of main display area 513 that includes a graphic depiction of a circle representing the "ace88" aggregate 633 coupled by line 645 to a circle representing the "web" aggregate 638. However, in contrast to user interface 910, user interface 1210 has the "ace88" aggregate positioned at the left-hand side of the "dumbbell" configuration, and the "web" aggregate positioned at the right-hand side of the dumbbell" configuration. The fourth graphic indicator 644, if provided as part of user interface 1210, is position along line 645 and proximate to the circle representing the "web" aggregate 638. The layout depicted in user interface 1210 indicates the single agent of the "ace88" aggregate is the source agent for the communication probes for which the statuses are indicated through the rendering of the status indications for status blocks 1230, and the agents of the "web" aggregate 638 are the destination agents for these communication probes.

Because in the illustrative example shown in FIG. 12 for user interface 1210 the source aggregate "ace88" has only one agent (e.g., agent "E"), a single column is included in status blocks 1230, represented by arrow "E". The two rows, represented by arrows "A" and "B," represent the two agents "A" and "B," respectively, receiving communication probes from the single agent of the "ace88" aggregate. Status block 1231 may be rendered in user interface 1210 to represent a status, in some example using a color and in real-time or near real-time, determined for the communication probes issued by the agent "E" of the "ace88" aggregate and directed to agent "A" of the "web" aggregate. Status block 1232 may be located directly below status block 1231 in the same column where status block 1231 is located. Status block 1232 may be rendered in user interface 1210 to represent a status, in some examples using a color and in real-time or near real-time, determined for the communication probes issued by the agent "E" of the "ace88" aggregate and directed to agent "B" of the "web" aggregate.

Additional information may be provided in the main display area 513 of user interface 1210 in a same or similar manner as describe above with respect to user interface 910 and FIG. 9, but including information corresponding to the source/destination agents being represented by the depiction provide in main display area 513 as user interface 1210. For example, a header 1211 may be provided that names the aggregate that is the source for the communication probes, and thus determines the number of columns included in status blocks 1230. Header 1212 may provide the name of the aggregate where the destination agent or agents for the communication probes being depicted by user interface 1210 are grouped, and thus also corresponds to the number of rows included in status blocks 1230. User interface 1210 may include a general status box 1240 similar to the general status box 740 described above with respect to user interface 710 and FIG. 7. General status box 1240 of FIG. 12 may provide any of the types of information described above with respect to general status box 740, but with numerical values representing the measured or determined statuses for a one or more metrics, such as latency, associated with the communication probes being issued by the source aggregate and directed to the agents of the destination aggregate being represented in user interface 1210. As shown in FIG. 12, general status box 1240 includes a listing of text and associated numerical values, including text related to "Average Latency," "Max Latency," and "Min Latency" for the communication probes issued by the "ace88" aggregate 633 and directed to the agents of the "web" aggregate 638.

User interface 1210 may be generated for example in response to an indication of the selection of the fourth graphical status indicator 644 from a "cluster view," for example as provided by user interface 610 of FIG. 6. In other examples, user interface 1210 as shown in FIG. 12 may be generated in response to inputs to the "Filter Groups" box 613 indicated that the "ace88" aggregate is to be displayed as the source aggregate and the "web" aggregate is to be displayed as the destination aggregate. User interface 1210 may also be configured to allow additional information related to the statuses associate with any of the status blocks included in the display of status blocks 1230 in a manner similar to that described above with respect to FIG. 8 and user interfaces 710 and 810. An example of these additional details being provided as part of a user interface such as user interface 1210 are further illustrated and described below with respect to FIG. 13.

Figure 13:
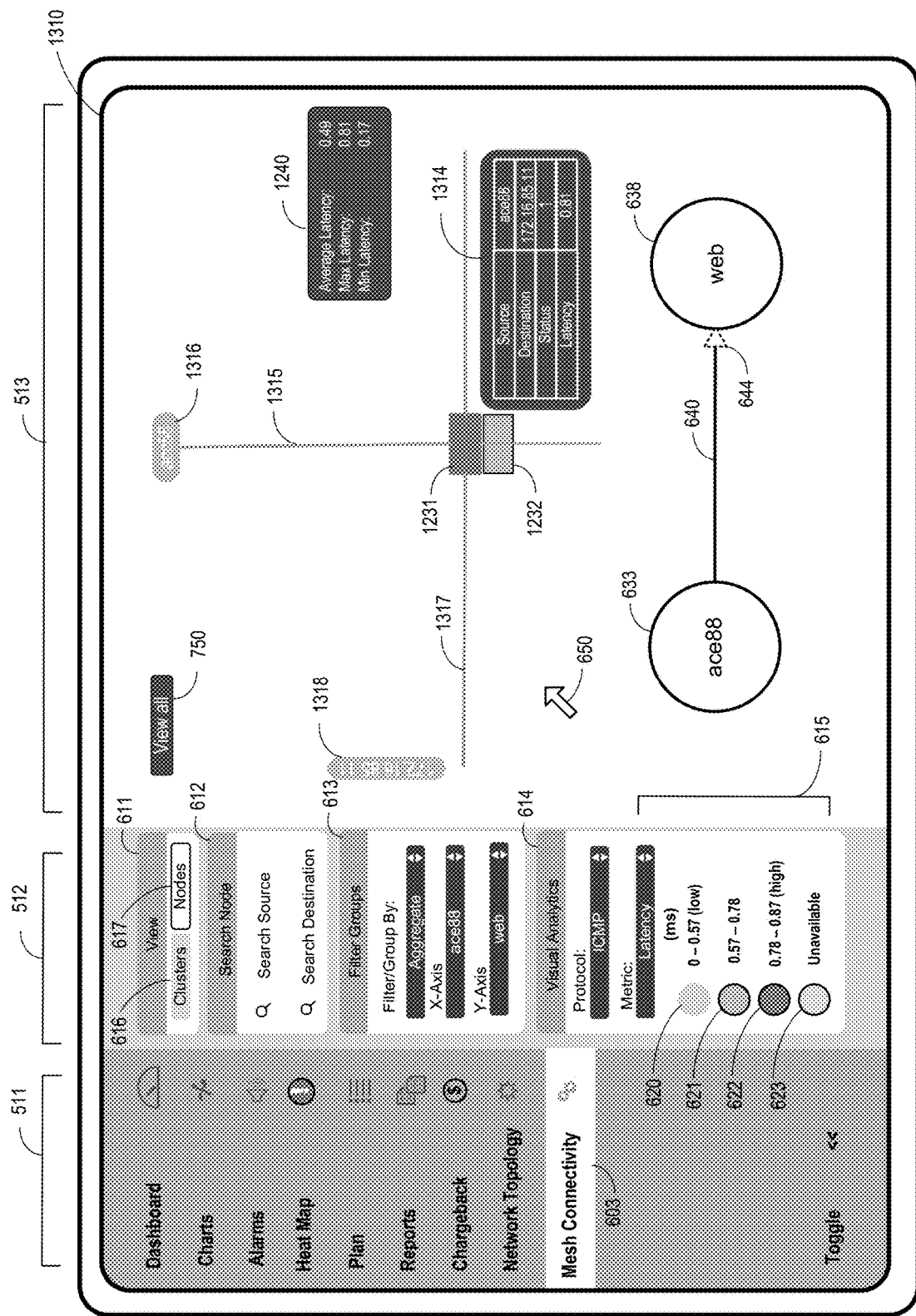
FIG. 13 illustrates an example graphical user interface output by a computing device that presents a detailed view of aggregates, in accordance with one or more aspects of the present disclosure.

FIG. 13 illustrates an example graphical user interface 1310 output by a computing device that presents a detailed view of aggregates configured for a computer network in accordance with one or more aspects of the present disclosure. User interface 1310 may be generated by dashboard 203 as a result of receiving an indication of the selection of status block 1231 in user interface 1210, for example based on user inputs provided through manipulation of cursor 650. When status block 1231 is selected, the status block may be highlighted in user interface 1310 for example by displaying a heavier and/or a different color line extending around the perimeter of the block. In addition or in the alternative, extension lines, such as extension lines 1315 and 1317, may be generated that extend in vertical and horizonal directions, respectively, from status block 1231. The extension lines may be a particular color, such as a blue color, that further distinguish the extension lines 1315 and 1317 from the other objects being displayed in main display area 513 of user interface 1310.

Extension line 1315 may extend away from status block 1231 in at least one direction and terminate in a text tag 1316. Text tag 1316 may include text displayed within the perimeter of a shape indicative of a name of the agent associated with the column where status block 1231 is located, for example "ace88" as illustrated in FIG. 13. Similarly, extension line 1317 extends away from status block 1231, but in a horizontal direction. Text tag 1318 is located near a termination point of extension line 1317, and may include text displayed within the perimeter of a shape indicative of the name of a policy agent associated with the row where status block 1231 is located, for example "172.16.85.11" as illustrated in FIG. 13. The shapes, colors and format of the extension lines and text tags are not limited to the particular example illustrated for user interface 1310, and may be formed using other colors and/or other shapes for the extension lines and or text tags provided by examples of user interface 1310.

In addition to or instead of generating the extension lines and text tags, selection of status block 1231 may cause a pop-up box 1314 to also be displayed as part of user interface 1310. As shown in FIG. 13, pop-up box 1314 includes a display of a table with data enclosed within the boarder of the pop-up box. In this illustrative example, pop-up box 1314 may include a row labeled "Source," a row labeled "Destination," a row labeled "Status," and a row labeled "Latency." An associated entry for the "Source" row indicates that the source agent issuing probes used in determining a status being depicted for status block 1231 as part of user interface 1310 is the agent named "ace88," and the associated entry for the "Destination" row indicates that the destination agent is "172.16.85.11," which corresponds to the labels displayed in text tag 1316 and 1318, respectively. The "status" row of pop-up box 1314 indicates a status rating or ranking having a value of "1." The determined latency, which is the selected metric being used in user interface 1310 to determine a statuses associated with communication probes issued from agent "ace88" and directed to agent "172.16.85.11" has a value of 0.81 (milliseconds) as indicated in the "Latency" row of pop-up box 1314. Similar but corresponding information, including extension lines and a pop-up text block that includes information related to any selected one of status blocks 1231 and 1232, may be displayed with the respective status block that is selected within the main display area 513. As such, user interface 1310 is configured to quickly and efficiency display more detailed level information related to any of the status blocks being displayed within the main display area 513 for a selected metric and a selected pair of source/destination aggregates. User interface 1310, when generated by dashboard 203, provides additional details and information related to the one or more selected metrics associated with communitive probes issued from a source agent to a destination agent, in this example communication probe(s) issued by agent "ace88" that are directed to agents of the "web" aggregate, for example where the number of agents issuing the probes is different (e.g., smaller than) the number of destination agents the probes are being directed to.

Figure 14:
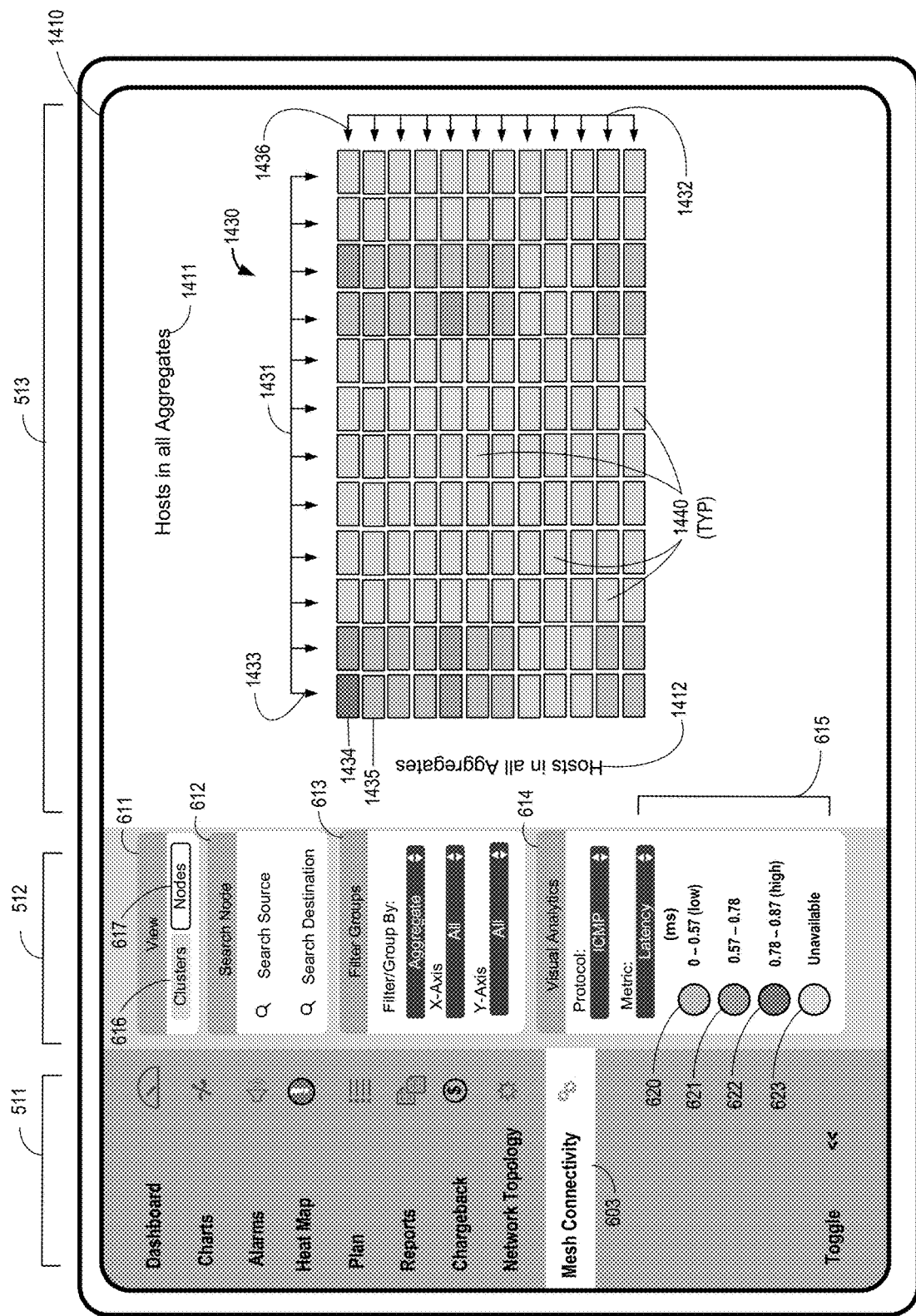
FIG. 14 illustrates an example graphical user interface output by a computing device that presents a detailed view of statuses for policy agents, in accordance with one or more aspects of the present disclosure.

FIG. 14 illustrates an example graphical user interface 1410 output by a computing device that presents a detailed view of statuses for policy agents configured for a computer network in accordance with one or more aspects of the present disclosure. The illustration of user interface 1410 includes features that remain the same as or are similar to corresponding features illustrated and described with respect to user interface 510 in FIG. 5 and user interface 610 in FIG. 6. These corresponding features as shown in FIG. 14 in conjunction with user interface 1410 retain the same reference numbers, and may provide the same or similar features and perform in a same or similar manner as were described above with respect to user interfaces 510 and 610. Such corresponding features may include application selection area 511, view control area 512, and main display area 513. Examples of differences between user interface 510 of FIG. 5, user interface 610 of FIG. 6, and user interface 1410 as illustrated and described with respect to FIG. 14 are further described below.

As shown in FIG. 14, main display area 513 includes a grid of status blocks 1430 (referred to as "status blocks 1430"), which includes individual status blocks (e.g., blocks 1440 (TYP)), which are arranged in rows and columns. The columns are generally indicated by arrows 1431, and the rows are generally indicated by arrows 1432. Each column in the grid represents a single agent acting as a source of communication probes issued to a plurality of destination agents that are represented by the rows of status blocks. For example, the left-hand most column (generally indicated by arrow 1433) of the grid includes status block 1434 in the upper-most row of the grid (generally indicated by arrow 1436), and includes a series of additional status blocks positioned below status block 1434 within the same column 1433. Each status block in column 1433 may provide a graphical indication of a status associated with the communication probes issued by a same source agents, for example agent "ace88," and directed to a set of destination agents, each destination agent represented by an individual status block in one row of the grid and located within column 1433.

In some examples, a color is used to individually and respectively render each of status blocks 1430 included in the grid. The color chosen to render a given status block may represent the latest status determined for the communication probe(s) associated with the particular source agent and the particular destination agent represented by the given status block. For example, status block 1434 may be rendered in user interface 1410 using a red color to fill in the status block. The red color may be representative of a determined latency for communication probe(s) issued by the agent associated with column 1433 and directed to the destination agent associated with the upper-most row in the grid (generally indicated by arrow 1436), e.g., as having a status value of between 0.78 to 0.87 milliseconds and assigned a red color based on the statuses depicted by legend 615 in the view control area 513. In another example, status block 1435, also associated with the same agent acting as the source of the communication probes providing communication probes associated with column 1433, may be rendered in a different color, such as green, indicative of the status determined for the communication probes issued by the source agent associated with column 1433 and directed to the destination agent associated with the row immediately below row 1436/(i.e., the second row for the top in the grid).

Thus, each status block 1440 (TYP) provided within status blocks 1430 may be rendered in a color that is keyed to legend 615 and that represents a determine status associated with the selected metric, e.g., "latency," for the particular source/destination agents associated with each individual status block. As such, the graphical depiction of status blocks 1430 provides a detail-level view of information related to a large number, or in some examples, all of the agents issuing communication probes to other agents in a computer network. The use of the color to render each status block provides a visual representation of the individual statuses that may allow a user viewing user interface 1410 to quickly determine which of the status blocks represent available and unavailable communication links between agents, and/or to quickly visualize a metric-related status determined for each of the "available" communication links between agents within the computer network being represented by user interface 1410.

The indication of a determined status associated with each of the status blocks 1430 is not limited to being depicted via a color, and other indications of statuses, such as different patterns used to fill the status blocks, forms of animation such as flashing the graphical shapes or symbols representing one or more of the status blocks 1430, and/or use of graphical symbols or text, for example within the perimeter of one or more of the status blocks 1430, may be used to indicate a status associated with at least one metric being depicted through the rendering of the status blocks as part of user interface 1410.

In some examples, the status indications, for example the colors used to render each of the status block 1430, may be updated in real or near real-time to indicate the status of a selected metric being measured or determined based on the most resent set of the communication probes issued from each of the source agents and directed to a destination agent. In other examples, the status indications provided by user interface 1410 may be updated on some periodic interval, or may be updated based on a running calculation, such as an averaging of an overall status determined for a set of communication probes associated with each pair of source/destination agents represented by the status blocks provide in user interface 1410. Further, the number of columns and rows shown in FIG. 14 is an illustrative and non-limiting example of a display including status blocks 1430.

The number of columns and/or rows provided in a grid of status blocks may vary based for example on the number of agents issuing communication probes and the number of agents these communication probes are being directed to. In addition, the number and/or arrangement of the columns and rows may be determined based on a policy or a set of rules operated on by dashboard 203 and used in generating user interface 1410. For example, the order of the agents assigned to the columns included in a grid of status blocks 1430 may be arranged in an alphabetical order sorted using the names assigned to the agents, respectively, and the order of the rows may similarly be arranged in an alphabetical order based on the names assigned to the destination agents. In some example, all of the source agents are also destination agents. In other examples, one or more of the source agents are not also destination agents, and one or more of the destination agents are not source agents depicted within an example of user interface 1410.

Additional information may be provided as part of user interface 1410. For example, a first header 1411 may extend across main display area 513 in a horizontal orientation above the grid of status blocks 1430, and may display text, for example "Host in all aggregates," indicating that the agents represented in the "X-axis" and thus by the columns in the grid of status blocks 1430, represents all of the agents in the aggregates of a computer network. A second header 1412 may extend across main display area 513 in a vertical orientation and positioned along the left-hand side of the grid of status blocks 1430, and may display text, for example "Host in all Aggregates," indicating that the agents represented in the "Y-axis," and thus by the rows in the grid of status blocks 1430, represent all of the destination agents in the aggregates of a computer network.

Examples of status blocks 1430 are not limited to having the individual blocks represented by a rectangular shape. Other shapes, such as circles, squares, triangle, ovals, and ellipses may be used to represent one or more of the status blocks included within status blocks 1430. Regardless of the shape of the status blocks including in status blocks 1430, the user interface 1410 may be configured to display a status indicator of some type associated with at least one selected metric for each of the status blocks included in status block 1430. User interface 1410 having a configuration of status blocks 1430 or similar in some examples is the default view provided as user interface 1410 when a user input indication selection of the "Nodes" button 617 is received by dashboard 203. In other examples, a user interface having a configuration of status blocks 1430 or similar may be provided as user interface 1410 when a value of "All" is selected or entered for both the "X-axis" and the "Y-axis" fields included within the "Filter Groups" box 613 of the view control area 512. In still other examples, a user interface having a configuration of status blocks 1430 or similar, may be provide as user interface 1410 when an input indicative of the selection of the "View all" button 750 as shown for example in FIGS. 7-13 is received.

In some examples, a user input indicating a selection of any one of the individual status blocks included in status blocks 1430 and being displayed as part of user interface 1410 may result in additional details being displayed with respect to the communication probes and/or metrics and status information associated with the selected status block.

Examples of these additional details being provided as part of a user interface are further illustrated and described below with respect to FIG. 15.

Figure 15:
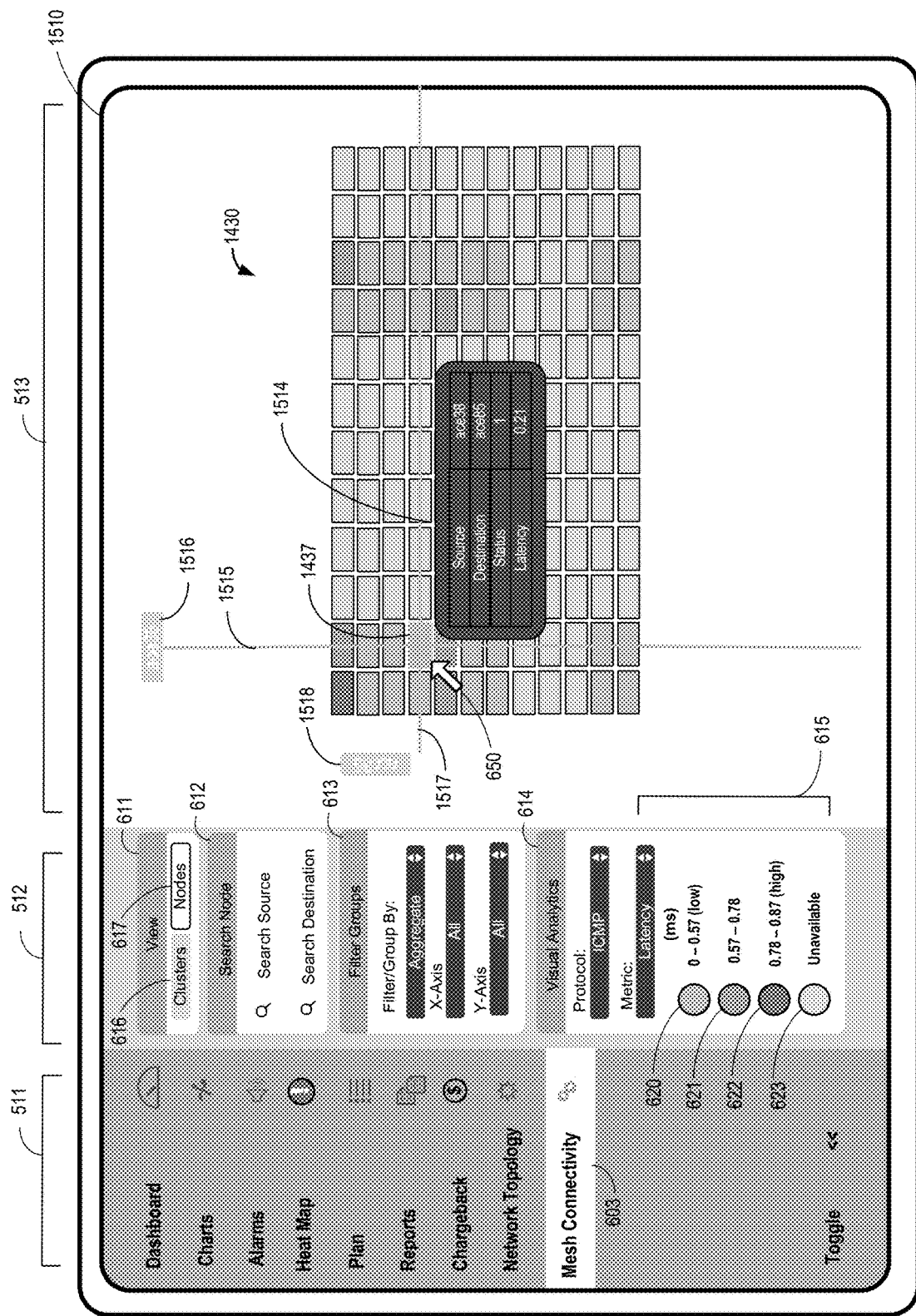
FIG. 15 illustrates an example graphical user interface output by a computing device that presents a detailed view of statuses for policy agents, in accordance with one or more aspects of the present disclosure.

FIG. 15 illustrates an example graphical user interface 1510 output by a computing device that presents a detailed view of aggregates configured for a computer network in accordance with one or more aspects of the present disclosure. The illustration of user interface 1510 includes features that remain the same as or are similar to corresponding features illustrated and described with respect to user interface 510 in FIG. 5 and user interface 610 in FIG. 6. These corresponding features as shown in FIG. 15 in conjunction with user interface 1510 retain the same reference numbers, and may provide the same or similar features as were described above with respect to user interfaces 510 and 610. Such corresponding features may include application selection area 511, view control area 512, and main display area 513. Examples of differences between user interface 510 of FIG. 5, user interface 610 of FIG. 6, and user interface 1510 as illustrated and described with respect to FIG. 15 are further described below. In addition, features such as the grid of status blocks 1430 as illustrated and described with respect to user interface 1410 and FIG. 14 may also be provided as part of user interface 1510, and may provide the same or similar features and perform the same or similar functions in user interface 1510 as described with respect to user interface 1410.

As shown in user interface 1510 in FIG. 15, status block 1437 of status blocks 1430 is highlighted within the user interface, for example after being selected based on user inputs. Status block 1437 may be selected based on user inputs made by positioning cursor 650 so that the cursor either hovers over status block 1437 for some amount of time, such as one second, or is positioned over status block 1437 within user interface 1510, and a selection input, such as a computer mouse button input, is received. Once selected, status block 1437 may be highlighted for example by displaying a heavier and/or a different color line extending around the perimeter of the status block. In addition or in the alternative, extension lines, such as extension lines 1515 and 1517, may be generated that extend in vertical and horizonal directions, respectively, from status block 1437. The extension lines may be a particular color, such as a blue color, that further distinguish the extension lines 1515 and 1517 from the other objects being displayed in main display area 513 of user interface 1510.

Extension line 1515 may extend away from block 1437 in at least one direction and terminate in a text tag 1516. Text tag 1516 may include text displayed within the perimeter of a shape, such as an oval as shown in user interface 1510. Text tag 1516 may display the name of an agent associated with the column where status block 1437 is located. For example, as shown in user interface 1510, text tag 1516 includes the text "ace38," indicating that the policy agent associated with the column where block 1437 is located is associated with the source agent "ace38" issuing the communication probes having a status being depicted by status block 1437. Similarly, extension line 1517 extends away from status block 1437, but in a horizontal direction. Text tag 1518 is located near one termination point of extension line 1517. Text tag 1518 may include text displayed within the perimeter of a shape, such as an oval as shown in user interface 1510. Text tag 1518 may display the name of a policy agent associated with the row where block 1437 is located. For example, as shown in user interface 1510, text tag 1518 includes the text "ace85," indicating that the policy agent associated with the destination agent to which the communication probes issued by the "ace38" agent and having a status being depicted by status block 1437 are directed to.

The shape used for text tags 1516 and 1518 are not limited to any particular shape or to including an oval shape, and may be other shapes such as rectangles, circles, triangles, or squares. Further the type of line and/or the color used to display extension lines 1515 and 1517 and the outlining used to highlight status block 1437 are not limited to a particular type of line or to a particular color of line, and may include other types of lines, such as dashed or centerline configuration, in one or more colors including black, that may be used to depict the extensions lines and text tags as depicted by user interface 1510.

In addition to or instead of generating the extension lines and text tags, selection of status block 1437 may cause a pop-up box 1514 to also be displayed as part of user interface 1510. As shown in FIG. 15, pop-up box 1514 displays a table with data enclosed within the boarder of the pop-up box. In this illustrative example, pop-up box 1514 may include a row labeled "Source," a row labeled "Destination," a row labeled "Status," and a row labeled "Latency." An associated entry for the "Source" row indicates that the source agent issuing probes used in determining a status for a metric that is being depicted for status block 1437 is the agent named "ace38," and the destination agent was "ace 85," which corresponds to the labels displayed in text tag 1516 and 1518, respectively. The "status" row of pop-up box 1514 indicates a status rating or ranking having a value of "1." The determined latency, which is the selected metric being used in user interface 1510 to determine a status associated with communication probes issued from agent "ace38" to agent "ace85," has a value of 0.21 (milliseconds) as indicated in the "Latency" row of pop-up box 1514. Similar but corresponding information, including extension lines and a pop-up text boxes that include information related to any selected one of the status blocks 1430 may be displayed when the respective status block is selected within the main display area 513. As such, user interface 1510 is configured to quickly and efficiency display more detailed information related to any of the status blocks being displayed within the main display area 513 for a selected metric and a selected pair of source/destination agents.

Figure 16:
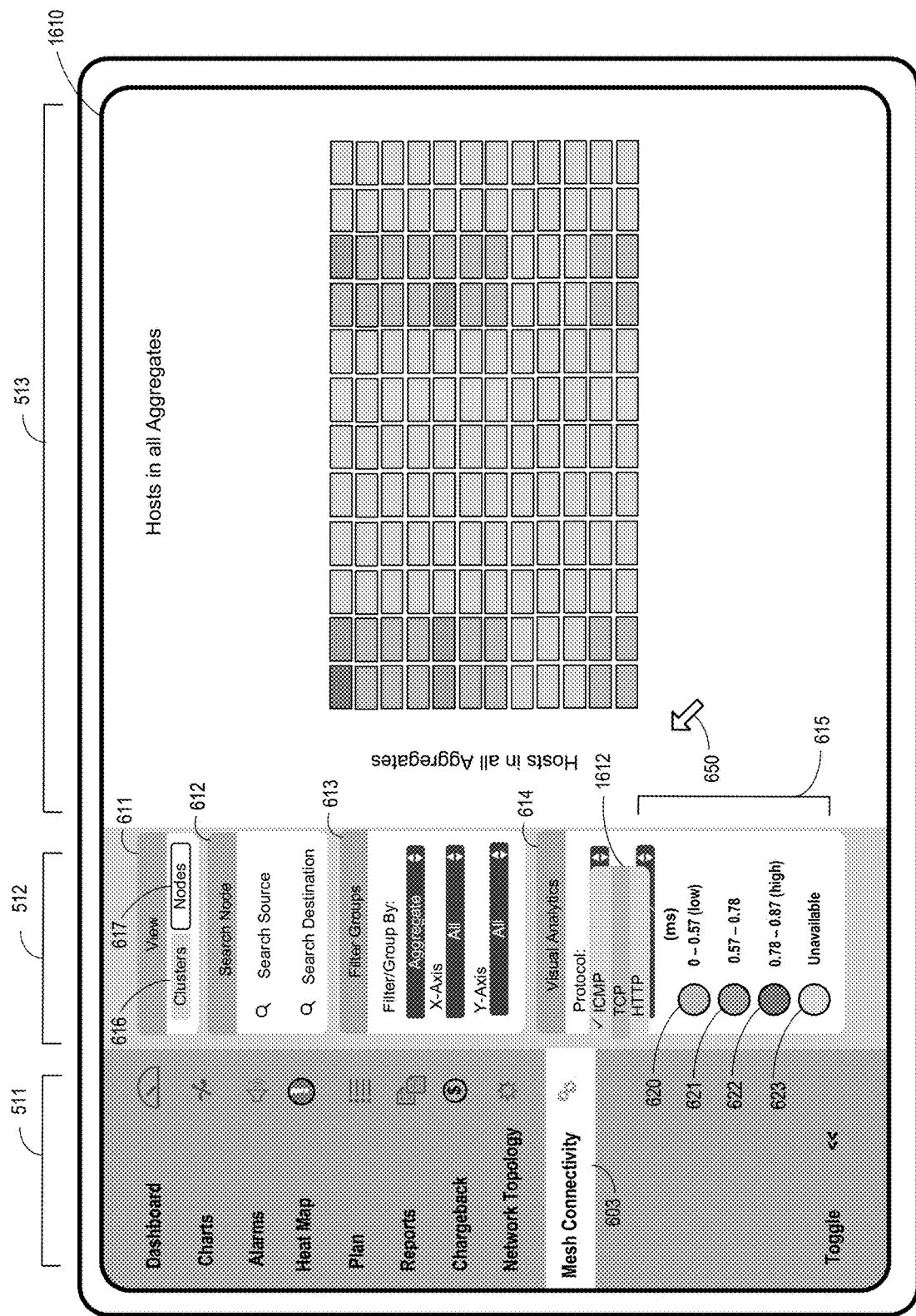
FIG. 16 illustrates an example graphical user interface output by a computing device that presents a detailed view of statuses for policy agents, in accordance with one or more aspects of the present disclosure.

FIG. 16 illustrates an example graphical user interface 1610 output by a computing device that presents a detailed view of statuses for policy agents configured for a computer network in accordance with one or more aspects of the present disclosure. User interface 1610 may be an example of user interface 1410 as illustrated and described above with respect to FIG. 14, and may include any of the features configured to perform any combination of the functions described with respect to user interface 1410. Examples of differences between user interface 1410 and user interface 1610 are further described below.

As shown in FIG. 16, user interface 1610 includes an example menu 1612. Menu 1612 may appear as a selection of different communication protocols that appear when a user input to the "Protocol" field within the "Visual Analytics" box 614 is received by dashboard 203 that is generating user interface 1610. Menu 1612 may include a listing of different communication protocols that may be selected as the communication protocol used to issue the communication probes issuing from the source agents having statuses depicted in the grid of status blocks 1430. Protocol selections available through menu 1612 are not limited to any particular protocols or to a particular number of protocols, and may include any type and/or number of different protocols available for use by the system controller the agents issuing the communication probes in a computer network, such as controller 23. In the example illustrated in FIG. 16, the available list of communication protocols includes (ICMP), (TCP), (HTTP). In some examples, the currently selected protocol may be indicated by a check-mark, as shown for the ICMP protocol in menu 1612. A selection of a new communication protocol may be indicated by highlighting the new protocol in a different color, such a blue, to show a user the new protocol that may then be selected for use in issuing the communication probes going forward. In the example shown in FIG. 16, the "TCP" protocol is highlighted, indicating that the "TCP" protocol may be selected as the new and next protocol to be used for formatting and transmitting the communication probes going forward.

Once an indication of a new protocol has been made, in some examples the controller (such as controller 23, FIG. 1) provides instructions to the agents to use the new communication protocol to format and transmit any communication probes directed to the destination agents, and further, that the responses provided by the destination agents to the issued probes are to also be formatted and transmitted using the new protocol. In addition, the status indications provided for example by the color rendered for each of the status blocks 1430 included in the display provided by user interface 1610 will now be based on at least one metric measured or determined in response to the issuance of the communication probes using the newly selected communication protocol.

Menu 1612 may also be displayed in any of the other user interfaces described thought this disclosure, including the "clusters view" illustrated and described with respect to user interface 610 and FIG. 6 and/or any of the "dumbbell" configurations illustrated and described with respect to any of the user interfaces of FIGS. 7-13. In a manner similar to that described above with respect to user interface 1610, selection of a new communication protocol through any of the user interfaces described throughout this disclosure, and any equivalents thereof, may cause the system monitoring the computer network to instruct the agents issuing the communication probes to use the newly selected protocol for formatting and transmission of any probes going forward, and any status indications provide as part of these user interfaces may be based on at least one metric measured or determined based on the communication probes issued using the newly selected communication protocol.

Figure 17:
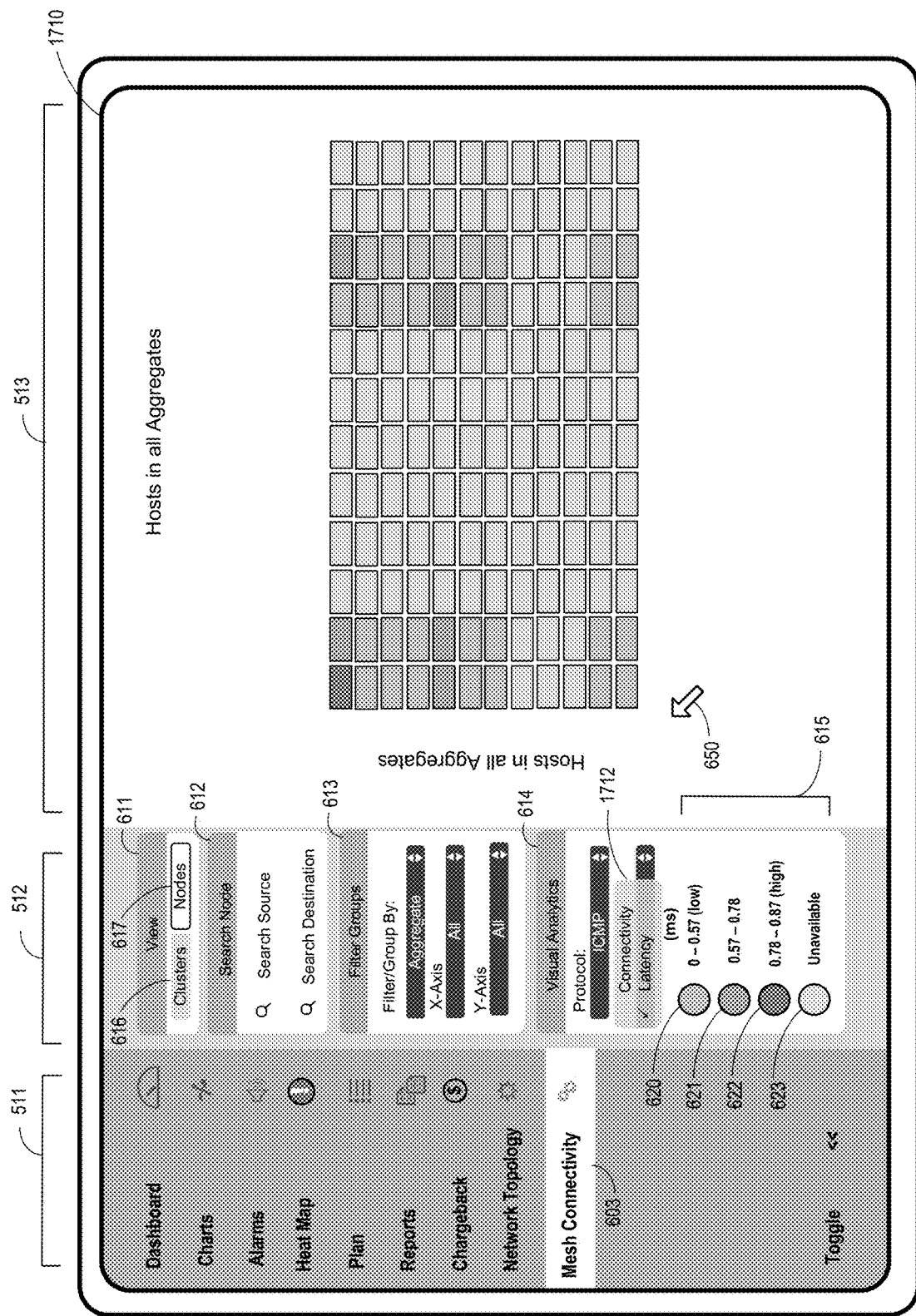
FIG. 17 illustrates an example graphical user interface output by a computing device that presents a detailed view of statuses for policy agents, in accordance with one or more aspects of the present disclosure.

FIG. 17 illustrates an example graphical user interface 1710 output by a computing device that presents a detailed view of statuses for policy agents configured for a computer network in accordance with one or more aspects of the present disclosure. User interface 1710 may be an example of user interface 1410 as illustrated and described above with respect to FIG. 14, and may include any of the features configured to perform any combination of the functions described with respect to user interface 1410. Examples of differences between user interface 1410 and user interface 1710 are further described below.

As shown in FIG. 17, user interface 1710 includes an example menu 1712. Menu 1712 may appear as a selection of different metrics that appears when a user input to the "Metric" field within the "Visual Analytics" box 614 is received by dashboard 203 that is generating user interface 1710. Menu 1712 may include a listing of different metrics that may be selected to be displayed, or to be used to display a status determined for a set of communication probes based on the selected metric. Metric selections available through menu 1712 are not limited to any particular metrics or to a particular number of metrics, and may include any type and/or number of different metrics available for use by the system controller and the agents issuing the communication probes in a computer network, such as controller 23. In the example illustrated in FIG. 17, the available list of metrics includes "Connectivity" and "Latency." In some examples, the currently selected protocol may be indicated by a check-mark, as shown for the "Latency" metric in menu 1712. A selection of a new metric may be indicated by highlighting the new metric in a different color, such a blue, to show a user the new metric that may then be selected for use determining a status associated with the communication probes rendered as part of the user interface 1710 going forward. In the example shown in FIG. 17, the "Latency" metric is highlighted, indicating that the "Latency" metric may be selected as the new and next metric to be used for formatting and transmitting the communication probes going forward.

Once an indication of a new metric has been made, in some examples the controller, such as controller 23, provides instructions to at least monitor and collect data or other information associated with the communication probes and the newly selected metric, and to report this data and/or information to the controller. In addition, the status indications provided for example by the colors used to render each of the status blocks 1430 included in the display provided by user interface 1710 will now be based on a status determined for the communication probes and for the newly selected metric.

Menu 1712 may also be displayed in any of the other user interfaces described thought this disclosure, including the "clusters view" illustrated and described with respect to user interface 610 and FIG. 6 and/or any of the "dumbbell" configurations illustrated and described with respect to any of the user interfaces of FIGS. 7-13. In a manner similar to that described above with respect to user interface 1710, selection of a new metric through any of the user interfaces described throughout this disclosure, and any equivalents thereof, may cause the controller gathering information from the agents to provide data and/or information related to the newly selected metric, and to render the user interface being provide by dashboard 203 to reflect status indications provide as part of these user interfaces based on the newly selected metric.

Figure 18:
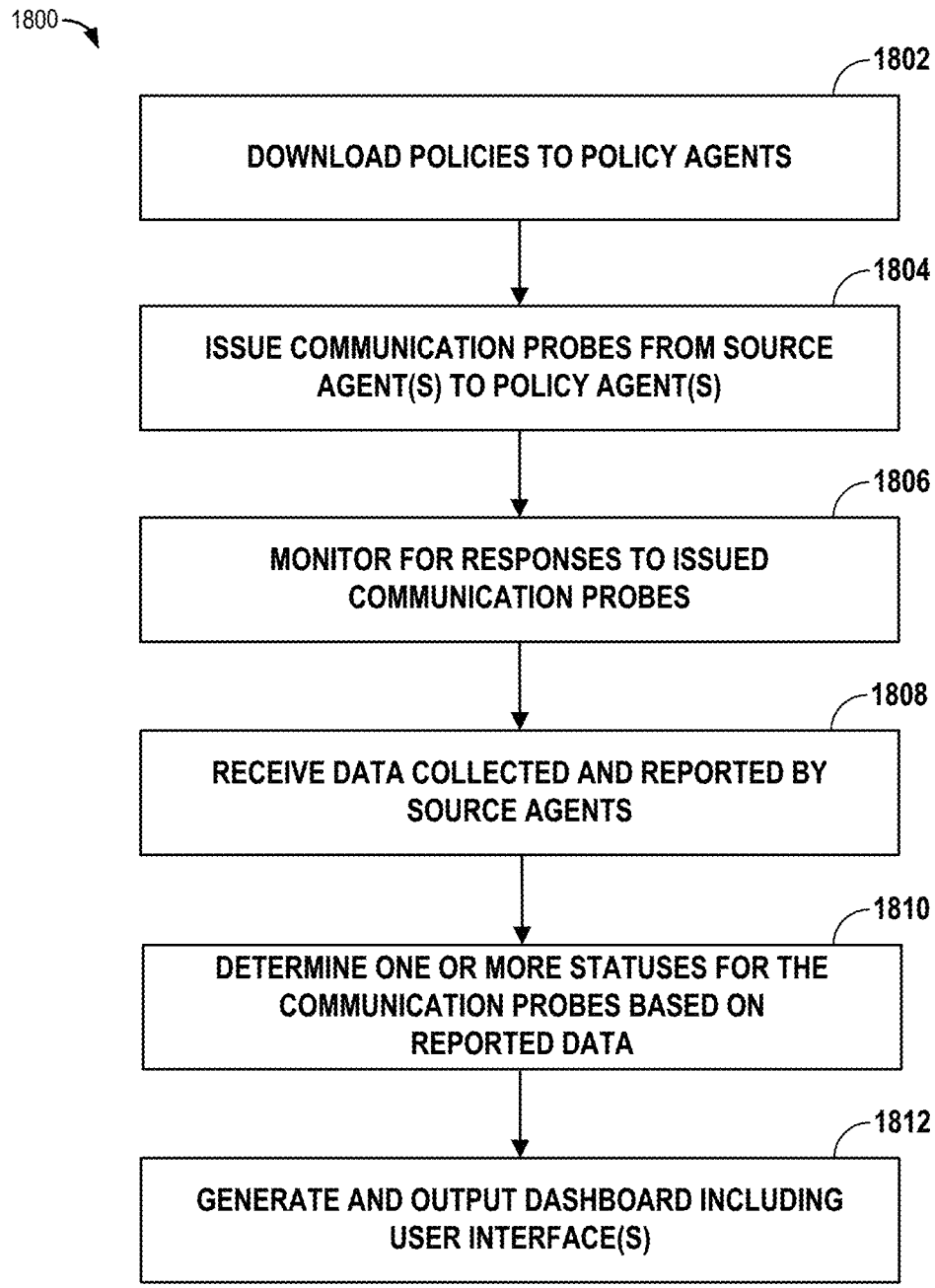
FIG. 18 illustrates a method for generating graphical user interfaces for displaying statuses associated with communication probes issued in a computer network in accordance with one or more aspects of the present disclosure.

FIG. 18 illustrates a method 1800 for generating graphical user interfaces for displaying statuses associated with communication probes issues in a computer network in accordance with one or more aspects of the present disclosure. Method 1800 is described as being performed, at least in part, by controller 23 and policy agents 35 as illustrated and described with respect to FIGS. 1-5. However, examples of method 1800 are not limited to being performed in whole or in part by controller 23 and/or by policy agents 35. Method 1800 may be performed by any processing circuitry of a computing device and/or by any processing and communication circuitry located in a plurality of servers coupled to a computer network system, such as computer network system 8 as illustrated and described with respect to FIG. 1.

Method 1800 is some examples includes downloading policies from controller 23 to a plurality of policy agents 35, which are deployed within at least some of the respective physical servers 12 (FIG. 1) of a computer network system (block 1802). The policies may include a set of rules that are to be used by the respective policy agents to format and transmit communication probes to one or more other policy agents within the computer network system. The policies may include instructions related to what type of communication format (e.g. ICMP, TCP, HTTP) the policy agent(s) is/are to use to format and transmit communication probes to other policy agents. The polices may include a list of destination agents that a given policy agent, or a group of policy agents grouped together in a common aggregate, are to transmit communication probes to. In some examples, the policies include instructions indicative of a time interval that is to be used by the policy agent for issuing subsequent sets of probes to other policy agents. In some examples, the policies include instructions on what parameter(s) the policy agent is/are to monitor for with respect to the issued probes. For example, the polices may instruct a policy agent to issue a communication probe to one or more other policy agents as destination agents, with a request that the destination agent respond back to the policy agent (source agent) issuing the communication probe upon receipt of the probe at the destination agent. The source agent is instructed by the policies to monitor and record whether a response was received in reply to an issued probe, and if so, the time interval between issuance of the probe and receipt of the acknowledgement back from the destination agent that the communication probe was received at the destination agent.

Method 1800 may include the policy agents 35 issuing communication probes from one or more source agents directed to one or more other policy agents in the computer network system 8 (block 1804). Issuing communication probes may include formatting and transmitting communication probes from each of a plurality of source agents to a list of destination agents for each respective source agent based on the polices downloaded to the source agents from controller 23. Issuing the communication probes may include formatting and transmitting communication probes directed to the destination agents using a communication protocol dictated by the policies downloaded to the source agents from controller 23. In various examples, the communication probes are configured to be transmitted through the same network devices, such network devices included in switch fabric 20, used by the servers 12 where the policy agents are deployed to provide communicates between the servers.

Method 1800 may include the policy agents monitoring for responses to issued probes (block 1806). Monitoring for responses to issued probes may include determining whether a response from a destination agent was received in reply to an issued probe directed from a source agent to the destination agent. Monitoring for responses to issued probes may include receiving, at the source agent, a response from a destination agent indicating that a communication probe issued by the source agent and directed to a particular destination agent was received at the particular destination agent, and determining a time value for the amount of time taken for the response to be received back at the source agent following issuance of the communication probe by the source agent.

Method 1800 may include controller 23 receiving data and/or other information reported by the source agents back to controller 23 (block 1808). The data and/or other information may be collected by the policy agents 35 as a result of issuing communication probes, and monitoring for response in reply to the issued probes. In some examples, the policy agents 35 report the data and/or other information to the controller 23 in real-time as the results from the issuance of the communication probes is collected.

Method 1800 may include control 23 determining one or more statuses for the communication probes based on the data and/or other information reported to the controller 23 by the policy agents 35 (block 1810). Determining a status for a given communication probe associated with a source agent may include determining that a response to an issued probe was not received back from the destination agent, and as a result assigning a status of "unavailable" to that communication probe. Determining a status for a given communication probe may include comparing a measured time between the issuance of a communication probe and the receipt of a response from the destination agent back at the source probe to one or more threshold values, and assigning a status to the communication probe based on a range of the one or more threshold values that the measured time falls into.

Method 1800 may include controller 23 generating a dashboard 203 including one or more user interfaces (block 1812). A user interface of the one or more user interfaces may be output for display on a display device, such as a display screen of user interface 129, for viewing for by a user, such as administrator 24. The formatting of the user interfaces may include any of the arrangements of a user interface described in this disclosure. For example, the user interface being displayed may include a "clusters view" similar to user interface 610 of FIG. 6, which includes a graphical display representing a set of aggregates that include the source agents issuing communication probes. The graphical display may include a set of graphic shapes, such as a set of circles, each circle representative of one of the aggregates, the circles coupled to one another in the user interface via a set of graphical lines, each graphical line including one or more graphical indicators providing a visual indication, for example by use of colors, indicative of a determined status associated with the agent or agents of the respective aggregates.

In other examples, the user interface being displayed may include a "dumbbell" configuration showing a pair of circles coupled by a line, one circle representing an aggregate of the computer network system that includes an agent or multiple agents issuing communication probes, and the second circle representing an aggregate of the computer network system that includes one or more destination agents for the communication probes being issue by the source agent(s). The user interface may include a set of status blocks (e.g., status blocks 730, FIG. 7) arranged in a grid of one or more columns and one or more rows, each status block being rendered in the user interface to represent a status, for example the current status in real-time or near real-time, determined for a selected metric, such as latency, for the communication probes being issue by the source agent(s).

In another example, the user interface includes a grid of status blocks only, (e.g., status blocks 1430, FIG. 14), without the "dumbbell" configuration. The grid of status blocks includes individual status blocks representing a status for one or more communication probes issued from a particular source agent to the particular destination agent, each status block being rendered, for example using a color of a plurality of colors, to indicate a status determined for the communication probe(s) associated with that status block. In some examples, the grid of status block represents status blocks associated with source agents grouped into at least two different aggregates, and may include a large number, such as one hundred or more, of individual status blocks.

Display of the user interfaces in method 1800 may include receiving inputs, for example by administration 24 provided to user interface device 129, to modify the user interface being displayed. User inputs may include any of the inputs to a user interface described throughout this disclosure, including user inputs to select what level of detail and/or which statuses for a particular source agents and destination agent are to be displayed, and a request for additional details, including details illustrated as a pop-up box (e.g., pop-up box 1514, FIG. 15) to be displayed for a particular status block. Other user inputs to a user interface being displayed as part of method 1800 may allow a user, such as administrator 24, to indicate a selection of the communication protocol to be used by the policy agents 35 for formatting and transmitting the communication probes transmitted between the policy agents. User inputs may also be used to dictate what metric, (e.g., latency, connectivity), which is the be used in determining the statuses associated with the communication probes being displayed as part of the user interface for one or more source/destination pairs of agents of the computer network system.

The techniques described herein may be implemented in hardware, software, firmware, or any combination thereof. Various features described as modules, engines, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A computing system comprising processing circuitry having access to a memory device, the processing circuitry configured to:

obtain one of:
respective latencies between pairs of respective servers represented by a corresponding pair of aggregates of a plurality of aggregates, wherein each of the plurality of aggregates represents a plurality of servers, or
respective round-trip times between the pairs of respective servers represented by the corresponding pair of aggregates;
generate a graphical user interface comprising:
respective graphical elements for the plurality of aggregates, , and
respective graphical indicators visually linking pairs of graphical elements, each of the pairs of graphical elements corresponding to a different pair of the aggregates,
wherein each of the graphical indicators indicates a performance metric for communications between the corresponding pair of the aggregates, wherein the performance metric is one of:
minimum latency, maximum latency, or average latency of the respective latencies between pairs of respective servers represented by the corresponding pair of aggregates, or
minimum round-trip time, maximum round-trip time, or average round-trip time of the respective round-trip times between the pairs of respective servers represented by the corresponding pair of aggregates; and
output the graphical user interface for display at a display device.

2. The system of claim 1, wherein each of the graphical indicators is at least partially rendered in a color indicating the performance metric for communications between the corresponding pair of aggregates.

3. The system of claim 1,
wherein the graphical user interface comprises a first graphical user interface,
wherein the processing circuitry is further configured to:
based on an indication of a user input at the first graphical user interface, the user input indicating selection of a graphical indicator of the graphical indicators, the selected graphical indicator visually linking a first graphical element for a first aggregate representing a first plurality of servers and a second graphical element for a second aggregate representing a second plurality of servers, generate a second graphical user interface comprising a plurality of status blocks for different pairs of servers from the first plurality of servers and the second plurality of servers, each of the different pairs of servers including a server of the first plurality of servers and a server of the second plurality of servers, wherein each status block of the plurality of status blocks indicates a performance metric for communications between the corresponding, different pair of servers; and
output the second graphical user interface for display at the display device.

4. The system of claim 3,
wherein the status blocks are arranged in a grid of rows and columns,
wherein each of the rows represents a different server from the first plurality of servers, and
wherein each of the columns represents a different server from the second plurality of servers.

5. The system of claim 3, wherein each status block of the plurality of status blocks is rendered in a color indicative of the performance metric for communications between the corresponding, different pair of servers.

6. The system of claim 1, wherein to obtain the one of respective latencies between pairs of respective servers or the respective round-trip times between the pairs of respective servers is based on result data for communication probes exchanged between agents executing on the pluralities of servers.

7. The system of claim 1, wherein the pluralities of servers represented by the plurality of aggregates are of a common compute cluster within a common data center.

8. A method comprising:
   obtaining, by a computing system, one of:
      respective latencies between pairs of respective servers represented by a corresponding pair of aggregates of a plurality of aggregates, wherein each of the plurality of aggregates represents a plurality of servers, or
      respective round-trip times between the pairs of respective servers represented by the corresponding pair of aggregates;
   generating, by the computing system, a graphical user interface comprising:
      respective graphical elements for the plurality of aggregates, , and
      respective graphical indicators visually linking pairs of graphical elements, each of the pairs of graphical elements corresponding to a different pair of the aggregates,
      wherein each of the graphical indicators indicates a performance metric for communications between the corresponding pair of the aggregates, wherein the performance metric comprises one of:
         minimum latency, maximum latency, or average latency of the respective latencies between the pairs of respective servers represented by the corresponding pair of aggregates, or
         minimum round-trip time, maximum round-trip time, or average round-trip time of the respective round-trip times between the pairs of respective servers represented by the corresponding pair of aggregates; and
   outputting, by the computing system, the graphical user interface for display at a display device.

9. The method of claim 8, wherein each of the graphical indicators is at least partially rendered in a color indicating the performance metric for communications between the corresponding pair of aggregates.

10. The method of claim 8, wherein the graphical user interface comprises a first graphical user interface, the method further comprising:
   based on an indication of a user input at the first graphical user interface, the user input indicating selection of a graphical indicator of the graphical indicators, the selected graphical indicator visually linking a first graphical element for a first aggregate representing a first plurality of servers and a second graphical element for a second aggregate representing a second plurality of servers, generating a second graphical user interface comprising a plurality of status blocks for different pairs of servers from the first plurality of servers and the second plurality of servers, each of the different pairs of servers including a server of the first plurality of servers and a server of the second plurality of servers, wherein each status block of the plurality of status blocks indicates a performance metric for communications between the corresponding, different pair of servers; and
   outputting the second graphical user interface for display at the display device.

11. The method of claim 10, wherein each status block of the plurality of status blocks is rendered in a color indicative of the performance metric for communications between the corresponding, different pair of servers.

12. The method of claim 8, wherein obtaining the one of respective latencies between pairs of respective servers or respective round-trip times between the pairs of respective servers is
   based on result data for communication probes exchanged between agents executing on the pluralities of servers.

13. The method of claim 8, wherein the pluralities of servers represented by the plurality of aggregates are of a common compute cluster within a common data center.

14. A non-transitory computer-readable medium comprising instructions that, when executed, cause one or more processors to:
   obtain one of:
      respective latencies between pairs of respective servers represented by a corresponding pair of aggregates of a plurality of aggregates, wherein each of the plurality of aggregates represents a plurality of servers, or
      respective round-trip times between the pairs of respective servers represented by the corresponding pair of aggregates;
   generate a graphical user interface comprising:
      respective graphical elements for the plurality of aggregates, and
      respective graphical indicators visually linking pairs of graphical elements, each of the pairs of graphical elements corresponding to a different pair of the aggregates,
      wherein each of the graphical indicators indicates a performance metric for communications between the corresponding pair of the aggregates, wherein the performance metric comprises one of:
         minimum latency, maximum latency, or average latency of the respective latencies between pairs of respective servers represented by the corresponding pair of aggregates, or
         minimum round-trip time, maximum round-trip time, or average round-trip time of the respective round-trip times between the pairs of respective servers represented by the corresponding pair of aggregates; and
   output the graphical user interface for display at a display device.

* * * * *